United States Patent
Imai et al.

(10) Patent No.: US 10,023,737 B2
(45) Date of Patent: Jul. 17, 2018

(54) MOLDING MATERIAL, MOLDING METHOD USING SAME, METHOD FOR PRODUCING MOLDING MATERIAL, AND METHOD FOR PRODUCING FIBER-REINFORCED COMPOSITE MATERIAL

(75) Inventors: Naokichi Imai, Ehime (JP); Atsuki Tsuchiya, Ehime (JP); Masato Honma, Ehime (JP); Kohei Yamashita, Nagoya (JP); Shunsuke Horiuchi, Nagoya (JP); Koji Yamauchi, Nagoya (JP)

(73) Assignee: TORAY INDUSTRIES, INC., Tokyo (JP)

(*) Notice: Subject to any disclaimer, the term of this patent is extended or adjusted under 35 U.S.C. 154(b) by 949 days.

(21) Appl. No.: 14/128,868

(22) PCT Filed: Jun. 20, 2012

(86) PCT No.: PCT/JP2012/065701
§ 371 (c)(1),
(2), (4) Date: Dec. 23, 2013

(87) PCT Pub. No.: WO2012/176788
PCT Pub. Date: Dec. 27, 2012

(65) Prior Publication Data
US 2014/0155540 A1 Jun. 5, 2014

(30) Foreign Application Priority Data

Jun. 24, 2011 (JP) .................................. 2011-140689
Jun. 24, 2011 (JP) .................................. 2011-140690
(Continued)

(51) Int. Cl.
*C08L 71/08* (2006.01)
*C08J 5/04* (2006.01)
(Continued)

(52) U.S. Cl.
CPC .............. *C08L 71/08* (2013.01); *B29B 15/12* (2013.01); *B29B 15/127* (2013.01); *B29C 70/30* (2013.01);
(Continued)

(58) Field of Classification Search
None
See application file for complete search history.

(56) References Cited

U.S. PATENT DOCUMENTS 4,360,630 A * 11/1982 Smith ...................... C08K 7/04
524/592
4,624,997 A * 11/1986 Robeson ................. C08L 65/00
525/471
(Continued)

FOREIGN PATENT DOCUMENTS

JP H 03-88828 A 4/1991
JP H 05-39371 A 2/1993
(Continued)

OTHER PUBLICATIONS

English translation of International Search Report dated Sep. 25, 2012 for International Application No. PCT/JP2012/065701.

Primary Examiner — Ling Siu Choi
Assistant Examiner — Thuy-Ai N Nguyen
(74) Attorney, Agent, or Firm — RatnerPrestia

(57) ABSTRACT

Provided is a molding material comprising a composite of 1 to 50 wt % of a continuous reinforcing fiber bundle (A) and 0.1 to 20 wt % of a poly (phenylene ether ether ketone) oligomer (B); and 30 to 98.9 wt % of a thermoplastic resin (C) adhering to the composite, wherein the component (B) has a melting point of not higher than 270° C. Also provided are a method for molding the molding material, a method for producing the molding material, and a method for producing a fiber-reinforced composite material.

(Continued)

1 (Black parts)
2 (White parts)

A molded article having high heat resistance and dynamic properties can be easily produced without impairing the economic efficiency and productivity during the process for producing a molding material. In addition, a fiber-reinforced composite material can be produced with more ease and high productivity.

10 Claims, 5 Drawing Sheets

(30) Foreign Application Priority Data

Jun. 24, 2011 (JP) ................................ 2011-140691
Jun. 24, 2011 (JP) ................................ 2011-140692
Jun. 24, 2011 (JP) ................................ 2011-140693

(51) Int. Cl.
  *B29C 70/40* (2006.01)
  *B29C 70/30* (2006.01)
  *B29C 70/52* (2006.01)
  *B29B 15/12* (2006.01)
  *B29C 70/48* (2006.01)

(52) U.S. Cl.
  CPC .............. *B29C 70/40* (2013.01); *B29C 70/48* (2013.01); *B29C 70/521* (2013.01); *C08J 5/04* (2013.01); *C08J 5/042* (2013.01); *C08J 2371/12* (2013.01); *C08J 2377/00* (2013.01); *C08J 2379/08* (2013.01); *C08J 2381/04* (2013.01); *C08J 2471/12* (2013.01)

(56) References Cited

U.S. PATENT DOCUMENTS

| | | | | |
|---|---|---|---|---|
| 4,942,216 | A * | 7/1990 | Heinz | ................. C08G 61/127 525/390 |
| 2007/0197739 | A1* | 8/2007 | Aneja | ..................... C08L 71/10 525/437 |
| 2012/0259086 | A1 | 10/2012 | Yamashita et al. | |
| 2013/0261229 | A1 | 10/2013 | Sano et al. | |

FOREIGN PATENT DOCUMENTS

| | | |
|---|---|---|
| JP | 6-320536 A | 11/1994 |
| JP | H 08-118489 A | 5/1996 |
| JP | H 09-25346 A | 1/1997 |
| JP | H 10-138379 A | 5/1998 |
| JP | 3598510 | 12/2004 |
| JP | 2007-506833 A | 3/2007 |
| JP | 2008-231236 A | 10/2008 |
| JP | 2008-231237 A | 10/2008 |
| JP | 2008-231289 A | 10/2008 |
| JP | 2008-231291 A | 10/2008 |
| JP | 2008-231292 A | 10/2008 |
| JP | 2010-95613 A | 4/2010 |
| WO | WO 2005/030836 A1 | 4/2005 |
| WO | WO 2011/081080 A1 | 7/2011 |
| WO | WO 2012/081455 A1 | 6/2012 |

* cited by examiner

[Figure 1]
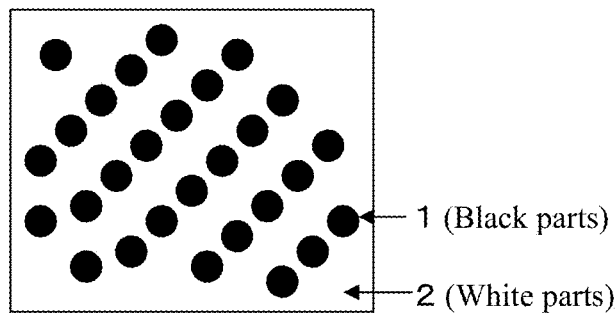
1 (Black parts)
2 (White parts)
[Figure 2]
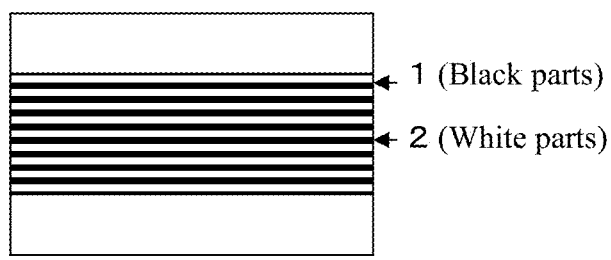
1 (Black parts)
2 (White parts)
[Figure 3]
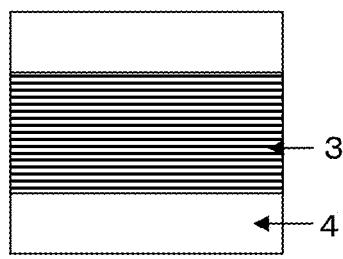
3
4
[Figure 4]
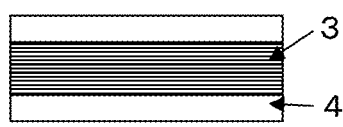
3
4

[Figure 5]
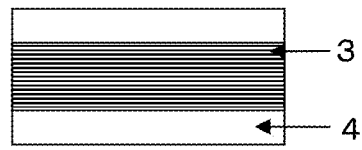
[Figure 6]
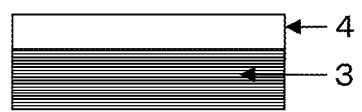
[Figure 7]
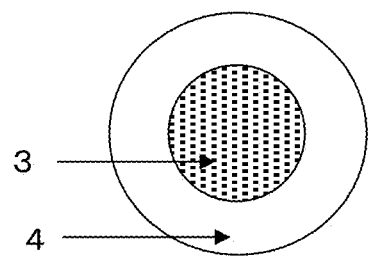
[Figure 8]
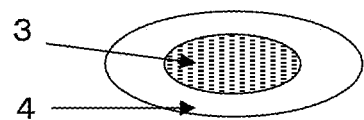
[Figure 9]
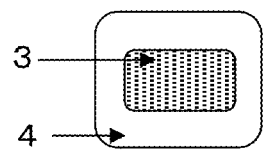

[Figure 10]
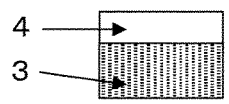
[Figure 11]
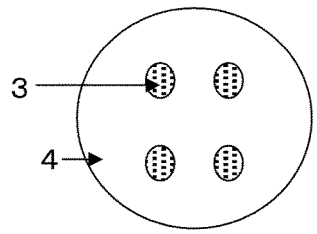
[Figure 12]
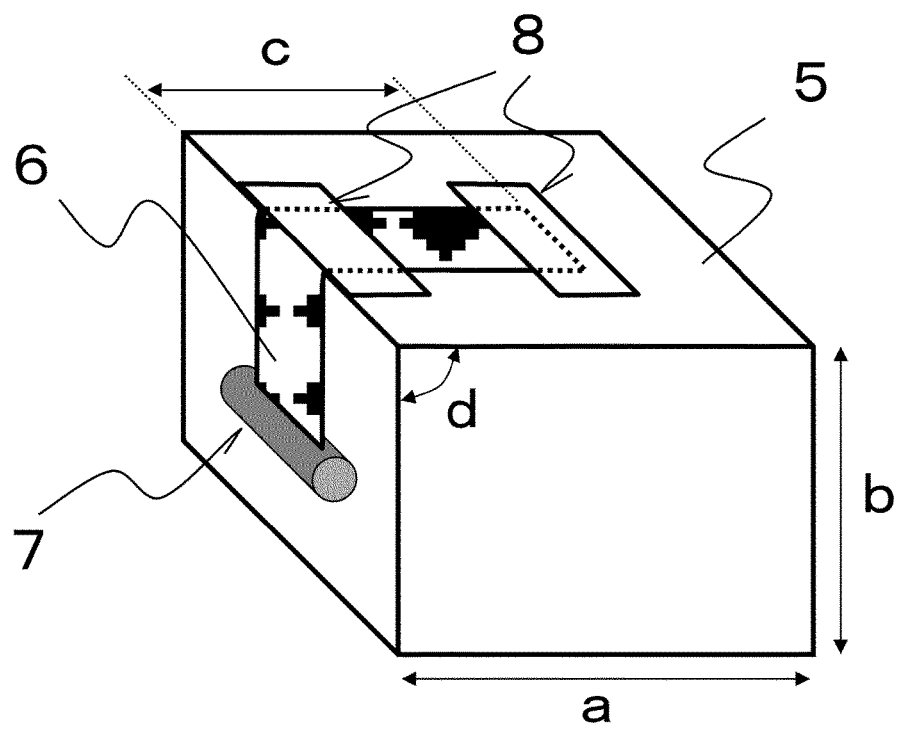

[Figure 13]
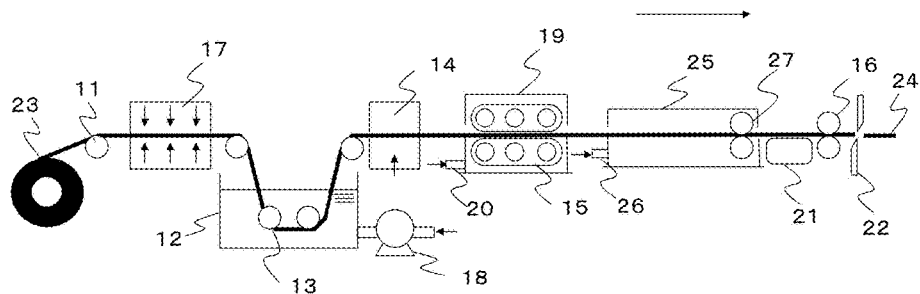
[Figure 14]
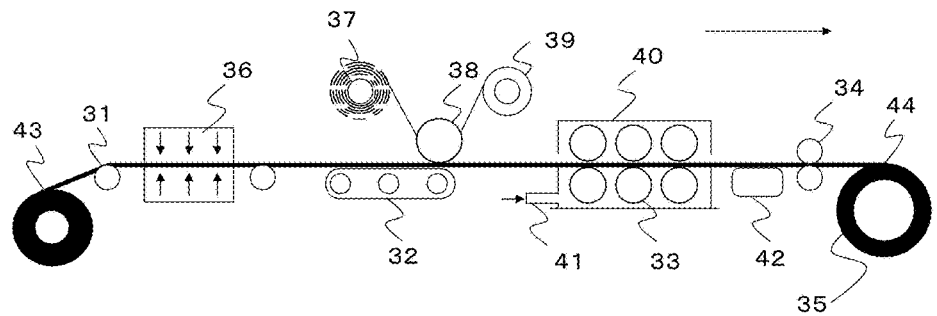
[Figure 15]
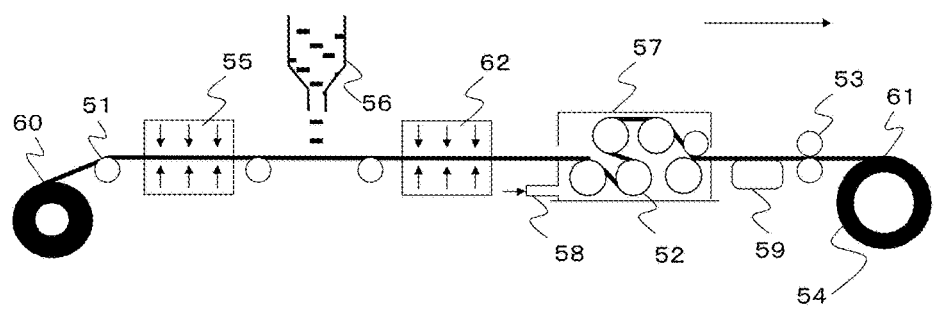

[Figure 16]
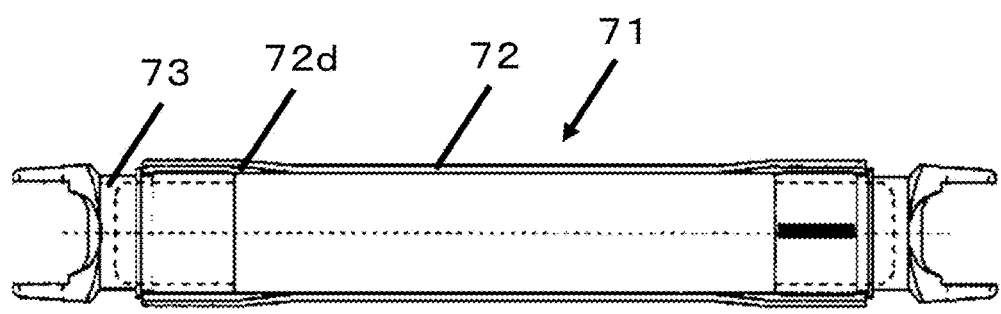
[Figure 17]
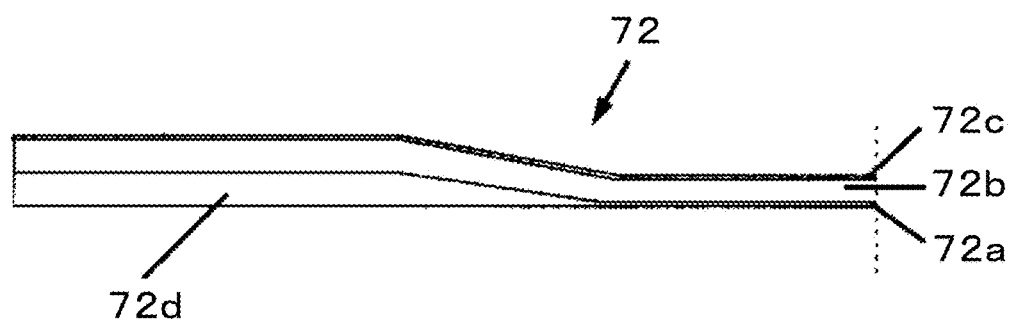

MOLDING MATERIAL, MOLDING METHOD USING SAME, METHOD FOR PRODUCING MOLDING MATERIAL, AND METHOD FOR PRODUCING FIBER-REINFORCED COMPOSITE MATERIAL

CROSS-REFERENCE TO RELATED APPLICATIONS

This application is the U.S. National Phase application of PCT/JP2012/065701, filed Jun. 20, 2012, and claims priority to Japanese Patent Application No. 2011-140689, filed Jun. 24, 2011, Japanese Patent Application No. 2011-140690, filed Jun. 24, 2011, Japanese Patent Application No. 2011-140691, filed Jun. 24, 2011, Japanese Patent Application No. 2011-140692, filed Jun. 24, 2011, Japanese Patent Application No. 2011-140693, filed Jun. 24, 2011, the disclosures of each of these applications being incorporated herein by reference in their entireties for all purposes.

FIELD OF THE INVENTION

The present invention relates to a molding material that is excellent in productivity, handleability, and moldability and provides a molded article having excellent dynamic properties, a molding method using the same, a method for producing the same, and a method for producing a fiber-reinforced composite material excellent in economic efficiency and productivity.

BACKGROUND OF THE INVENTION

Various forms of molding materials comprising a continuous reinforcing fiber bundle and a thermoplastic resin as a matrix are known; for example, thermoplastic prepregs, yarn, and glass mats (GMT). Such molding materials are characterized in that they are easy to mold because of the properties of thermoplastic resin; they are free from the burden of storage unlike thermosetting resins; and the resulting molded article have high toughness, so that it is excellent in recyclability. In particular, pelleted molding materials can be applied to molding methods that are excellent in economic efficiency and productivity such as injection molding and stamping molding, and are useful as industrial materials.

However, for impregnating a thermoplastic resin into a continuous reinforcing fiber bundle during the process for producing a molding material, such molding materials are disadvantageous in terms of economic efficiency and productivity, and therefore are not so widely used at present. For example, it is well known that impregnation of a resin into a reinforcing fiber bundle becomes difficult as the melt viscosity of the resin increases. In particular, thermoplastic resins having excellent dynamic properties such as toughness and ductility are high-molecular-weight, have a high viscosity compared to those of thermosetting resins, and require a higher process temperature. Thus, such thermoplastic resins have been unsuitable for producing a molding material easily with high productivity.

When a low-molecular-weight, i.e., low-viscosity thermoplastic resin is used as a matrix resin because of ease of impregnation, there is a problem in that the resulting molded article will have significantly decreased dynamic properties.

Further, as fiber-reinforced composite materials come to be used in harsher environments, higher heat resistance have been required for a matrix resin.

Under such circumstances, the presence of a low-melting-point and low-molecular-weight thermoplastic resin was not preferred because it caused deformation of a molded article under high-temperature conditions. Consequently, molding materials comprising a thermoplastic resin excellent in impregnation properties and heat resistance have been demanded.

Fiber-reinforced composite materials comprising a reinforcing fiber and a matrix resin are lightweight, can provide excellent strength properties, and can be designed to have any strength by controlling their fiber orientation. Therefore, such fiber-reinforced composite materials are widely used, for example, in sports applications such as golf shafts and fishing rods, aerospace applications such as aircraft parts and artificial satellite parts, and general industrial applications such as automobiles, marine vessels, electrical and electronic equipment housings, robot parts, windmills, tanks, bathtubs, and helmets. In producing a fiber-reinforced composite material, production methods in which prepregs used as intermediate substrates are laminated to form a laminate, the prepregs being obtained by impregnating reinforcing fibers with a matrix resin, are widely used because, in general, high fiber content is easily achieved and handling is relatively easy. As a matrix resin to be impregnated into reinforcing fibers in a prepreg, thermosetting resins such as unsaturated polyester resins, vinyl ester resins, and epoxy resins are often used because of the ease of impregnation into a fiber bundle, but the thermosetting resins become an insoluble and infusible polymer having a three-dimensional network structure via curing. Such a polymer is difficult to recycle, and a disposal problem becomes more serious.

As a thermoplastic matrix resin used for a prepreg, various resins such as polyethylene, polyester, polyamide, and polycarbonate are used. In applications that require high performance, such as aerospace applications, polyether ether ketone, polyetherimide, polyphenylene sulfide, and the like that are excellent in heat resistance, chemical resistance, and mechanical properties are suitably used.

However, such a thermoplastic resin prepreg has problems in that, in a production process for impregnating a fiber bundle with a matrix resin, a high temperature and a high pressure are required because of its high molecular weight compared to those of thermosetting resins; it is difficult to produce a prepreg having high fiber content; and a prepreg produced has so many unimpregnated parts that sufficient mechanical properties cannot be provided.

Fiber-reinforced composite materials comprising a continuous reinforcing fiber substrate and a matrix resin are lightweight and have excellent dynamic properties, and they are widely used in sports equipment applications, aerospace applications, general industrial applications, and the like. In particular, composite materials comprising a carbon fiber as a reinforcing fiber (CFRP) have a specific strength and specific rigidity that are superior to those of metal materials, and the amount thereof used is increasing mainly in aerospace applications. As a matrix resin, thermosetting resins have hitherto been preferably used because of their satisfactory impregnation into a reinforcing fiber substrate. Thermoplastic resins have been unsuitable for producing a molding material easily with high productivity because they are high-molecular-weight, have a high viscosity compared to those of thermosetting resins, and require a higher process temperature.

However, composite materials comprising a thermoplastic resin as a matrix resin have received attention in recent years for reasons that such composite materials can be molded in a short time; the resulting molded article is recyclable; and they are excellent in post-processability such as thermal adhesion and thermal reformation.

Further, fiber-reinforced composite materials comprising a reinforcing fiber and a matrix resin allows material design taking advantages of the reinforcing fiber and the matrix resin, and, consequently, their use is expanding to the aerospace field, transport equipment/industrial machine field, civil engineering and construction field, sports/leisure field, and the like.

As a reinforcing fiber, glass fiber, aramid fiber, carbon fiber, boron fiber, and the like are used. As a matrix resin, both thermosetting resin and thermoplastic resin are used, but thermosetting resin, which readily impregnates into a reinforcing fiber, is often used. However, fiber-reinforced composite materials comprising a thermosetting resin have problems in that the productivity is low because a long time is required for heat curing and that the pot life of a prepreg is restricted.

In contrast, fiber-reinforced composite materials comprising a thermoplastic resin as a matrix have been put to practical use for reasons that the productivity is high because such fiber-reinforced composite materials do not need curing reaction and that they are easily welded, repaired, and recycled.

PATENT DOCUMENTS

Patent Document 1 discloses a method for producing a molding material in which in order to easily impregnate a thermoplastic resin into a continuous reinforcing fiber bundle, a low-molecular-weight thermoplastic resin is impregnated, and then the resultant is integrated with a high-molecular-weight thermoplastic resin.

Patent Document 2 discloses a molding material comprising a high-molecular-weight thermoplastic resin and a composite of polyarylene sulfide prepolymer and continuous reinforcing fibers, the high-molecular-weight thermoplastic resin being configured to be in contact with the composite. Polyarylene sulfide prepolymer is an excellent material because it easily impregnates into a reinforcing fiber bundle and, therefore, increases the productivity of a molding material, and, in addition, it is readily dispersed or dissolved in a matrix resin in a molding process to enhance the dispersion of reinforcing fibers into a molded article.

Patent Document 3 discloses a molding material comprising a high-molecular-weight thermoplastic resin and a composite of high-molecular-weight polyarylene sulfide and continuous reinforcing fibers, the high-molecular-weight thermoplastic resin being configured to be in contact with the composite. This document describes a method for producing a molding material with high productivity in which a polyarylene sulfide prepolymer having a low melt viscosity is impregnated into reinforcing fibers and then polymerized into high-molecular-weight polyarylene sulfide. In addition, since the polyarylene sulfide in the molding material is high-molecular-weight, the molding material provides a molded article with excellent heat resistance.

Patent Document 4 discloses a cyclic poly (aryl ether) oligomer, a method for producing the same, and a method for polymerizing the cyclic poly (aryl ether) oligomer.

Patent Document 5 discloses a method for producing a prepreg comprising slurrying polyarylene sulfide in a dispersion medium to facilitate the impregnation into a glass fiber mat. Patent Document 6 discloses a method for producing a laminate not through a prepreg, the method comprising laminating relatively low-molecular-weight polyarylene sulfide in the form of a sheet together with fiber substrates.

Patent Document 7 discloses a prepreg obtained by impregnating reinforcing fibers with low-molecular-weight cyclic polyarylene sulfide. This method produces a prepreg with high productivity because the cyclic polyarylene sulfide has excellent impregnation properties. This method also provides a laminate having excellent mechanical properties by thermally polymerizing the cyclic polyarylene sulfide during molding.

Patent Document 8 proposes a method comprising placing crystalline thermoplastic resin films on both surfaces of a sheet-like substrate made of continuous reinforcing fibers, applying a pressure of 5 to 30 kg/cm$^2$ (about 0.5 to 3 MPa) at a temperature 150° C. higher than the melting point of the resin, and impregnating the thermoplastic resin into the reinforcing fiber bundle.

Patent Document 9 discloses a method for producing a fiber-reinforced molding substrate comprising combining a continuous reinforcing fiber bundle with low-molecular-weight cyclic polyarylene sulfide, and heating the composite at 200 to 450° C. to polymerize the cyclic polyarylene sulfide into high-molecular-weight polyarylene sulfide.

Patent Document 10 discloses a method for producing a fiber-reinforced composite material comprising preliminarily forming polyarylene sulfide having a melt viscosity of 300 to 2,000 Pa·s and a tensile elongation at break of 10% or more into a sheet, laminating the sheet and reinforcing fiber substrates alternately, and compressing the laminate at a pressure of 0.98 to 9.8 MPa at a temperature of 300 to 350° C. to impregnate the polyarylene sulfide into the reinforcing fiber substrate.

Patent Document 11 discloses a method for producing a fiber-reinforced composite material comprising heat-melting a polyarylene sulfide prepolymer at 200 to 300° C. to form a melt solution having a melt viscosity of 10 Pa·s or lower, impregnating the melt solution into a reinforcing fiber substrate, and then heating the resultant at 300 to 400° C. to polymerize the polyarylene sulfide prepolymer. This is an excellent production method that is able to produce a fiber-reinforced composite material comprising a reinforcing fiber substrate and high-molecular-weight polyarylene sulfide easily with high productivity.

Patent Document 1: JP H 10-138379 A
Patent Document 2: JP 2008-231291 A
Patent Document 3: JP 2008-231292 A
Patent Document 4: JP H 03-88828 A
Patent Document 5: JP H 05-39371 A
Patent Document 6: JP H 09-25346 A
Patent Document 7: JP 2008-231237 A
Patent Document 8: JP H 08-118489 A
Patent Document 9: JP 2008-231289 A
Patent Document 10: Japanese Patent No. 3598510
Patent Document 11: JP 2008-231236 A

SUMMARY OF THE INVENTION

The method disclosed in Patent Document 1 satisfies impregnation properties when a low-molecular-weight thermoplastic resin is used, but, on the other hand, presents problems of poor handleability of a molding material and difficulty in sufficiently enhancing the properties of a molded article.

The molding material disclosed in Patent Document 2 has excellent heat resistance because polyarylene sulfide prepolymer is used. However, in situations where various thermoplastic resins are selected for a matrix resin according to diversified needs for a fiber-reinforced composite material, in addition to the polyarylene sulfide prepolymer, highly heat-resistant impregnation/dispersion aids have been demanded from the standpoint of compatibility with the matrix resin.

The molding material disclosed in Patent Document 3 has excellent heat resistance and dynamic properties because high-molecular-weight polyarylene sulfide is used. However, in situations where various thermoplastic resins are selected for a matrix resin according to diversified needs for a fiber-reinforced composite material, in addition to polyarylene sulfide, molding materials comprising a highly heat-resistant thermoplastic resin have been demanded from the standpoint of compatibility with the matrix resin.

The method disclosed in Patent Document 4 has a problem in that the melting point of the resulting cyclic poly (aryl ether) oligomer is as high as 340° C. or higher, and a heating process at a high temperature is necessary for production of a molding material. Accordingly, molding materials that can be easily produced at a lower temperature have been demanded from the standpoint of industrial economic efficiency and productivity.

The method disclosed in Patent Document 5 has a problem in that equipment and time are required for drying the dispersion medium, and besides it is difficult to completely remove the dispersion medium, so that sufficient mechanical properties cannot be provided due to voids formed by volatilization of the dispersion medium during lamination molding. The method disclosed in Patent Document 6 has a problem in that high-temperature/high-pressure molding conditions are required, and defects such as non-impregnation result in poor mechanical properties.

The prepreg disclosed in Patent Document 7 has excellent heat resistance because polyarylene sulfide prepolymer is used. However, as needs for a fiber-reinforced composite material are diversified, in addition to polyarylene sulfide, molding materials comprising a highly heat-resistant thermoplastic resin, for example, poly (phenylene ether ether ketone) have been demanded.

In the method disclosed in Patent Document 8, since a harsh temperature is required for impregnation of a thermoplastic resin, thermal decomposition of the resin is caused; consequently, the properties of a molded article cannot be enhanced sufficiently, and it is difficult to produce a molding material economically with high productivity.

The method disclosed in Patent Document 9 is an excellent production method that is able to produce a molding material comprising a continuous reinforcing fiber bundle and high-molecular-weight polyarylene sulfide easily with high productivity. However, as needs for a fiber-reinforced composite material comprising a thermoplastic resin are diversified, in addition to polyarylene sulfide, molding materials comprising a highly heat-resistant thermoplastic resin, for example, polyether ether ketone have been demanded.

The method disclosed in Patent Document 10 has problems. For example, the reinforcing fiber substrate is poorly impregnated because the melt viscosity of the polyarylene sulfide used is more than 10 Pa·s, and due to voids formed in the resulting fiber-reinforced composite material, high mechanical strength cannot be provided; and a high pressure is necessary in impregnation into the reinforcing fiber, and accordingly, a high cost is required for an injection apparatus and a mold.

The method disclosed in Patent Document 11 has excellent heat resistance because polyarylene sulfide prepolymer is used. However, as needs for a fiber-reinforced composite material are diversified, in addition to polyarylene sulfide, fiber-reinforced composite materials comprising a highly heat-resistant thermoplastic resin, for example, poly (phenylene ether ether ketone) have been demanded.

The present invention aims to overcome the problems of the prior art and provide, by using a poly (phenylene ether ether ketone) oligomer with improved melting properties in a molding material comprising a continuous reinforcing fiber bundle and a thermoplastic resin, a molding material that is excellent in productivity, handleability, and moldability and provides a molded article having excellent dynamic properties, and a molding method excellent in productivity and moldability using the molding material.

The present invention aims to solve the problems mentioned above and provide a method for producing a molding material and fiber-reinforced composite material comprising a reinforcing fiber substrate and poly (phenylene ether ether ketone) with more ease and high productivity.

To solve these problems, the molding material of embodiments of the present invention has the following constitution.

A molding material comprising:
a composite of 1 to 50 wt % of a continuous reinforcing fiber bundle (A) and 0.1 to 20 wt % of a poly (phenylene ether ether ketone) oligomer (B);
and 30 to 98.9 wt % of a thermoplastic resin (C) adhering to the composite, wherein the component (B) has a melting point of not higher than 270° C.

The molding method of embodiments of the present invention has the following constitution; i.e.,
a molding method, comprising press-molding the molding material described above using a mold.

The method for producing a molding material of the present invention can have the following constitution; i.e.,
A method for producing a molding material, comprising the steps of:
(I) drawing and continuously feeding a reinforcing fiber substrate (A');
(II) combining the component (A') with a poly (phenylene ether ether ketone) oligomer (B) to form a composite;
(III) polymerizing the component (B) into a poly (phenylene ether ether ketone) (B'); and
(IV) cooling and taking up the composite of the component (A') and the component (B'), wherein the component (B) has a melting point of not higher than 270° C.

The method for producing a fiber-reinforced composite material of the present invention may have any one of the constitutions (1) to (3) below: i.e.,
(1) A method for producing a fiber-reinforced composite material, comprising the steps of:
(I-1) placing a reinforcing fiber substrate (A') in a mold;
(II-1) heat-melting a poly (phenylene ether ether ketone) oligomer (B) to form a melt solution;
(III-1) injecting the melt solution obtained in the step (II-1) into the mold of the step (I-1) to impregnate the component (B) into the component (A'); and
(IV-1) thermally polymerizing the component (B) into a poly (phenylene ether ether ketone) (B'),
wherein the component (B) used in the step (II-1) has a melting point of not higher than 270° C., or
(2) A method for producing a fiber-reinforced composite material, comprising the steps of:
(I-2) drawing and continuously feeding a reinforcing fiber substrate (A');
(II-2) heat-melting a poly (phenylene ether ether ketone) oligomer (B) in an impregnation bath to form a melt solution;
(III-2) passing the component (A') continuously through the impregnation bath of the step (II-2) to impregnate the component (B) into the component (A') and winding the resulting composite around a mandrel;

and (IV-2) thermally polymerizing the component (B) into a poly (phenylene ether ether ketone) (B'), wherein the component (B) used in the step (II-2) has a melting point of not higher than 270° C., or (3) A method for producing a fiber-reinforced composite material, comprising the steps of:

(I-3) drawing and continuously feeding a reinforcing fiber substrate (A');

(II-3) heat-melting a poly (phenylene ether ether ketone) oligomer (B) in an impregnation bath to form a melt solution;

(III-3) passing the component (A') continuously through the impregnation bath of the step (II-3) to form a composite of the component (B) and the component (A') impregnated therewith; and (IV-3) pultruding the composite obtained continuously through a mold to thermally polymerize the component (B) into a poly (phenylene ether ether ketone) (B'), wherein the component (B) used in the step (II-3) has a melting point of not higher than 270° C.

In the molding material of the present invention, the component (B) preferably comprises a cyclic poly (phenylene ether ether ketone) in an amount of 60 wt % or more.

In the molding material of the present invention, the component (B) is preferably a mixture of cyclic poly (phenylene ether ether ketone)s having different numbers of repeating units (m).

In the molding material of the present invention, the composite preferably further comprises 0.001 to 20 mol % of a polymerization catalyst (D) per 1 mol of ether ether ketone structural unit in the component (B).

The molding material of the present invention is preferably a molding material comprising a composite of 1 to 50 wt % of a continuous reinforcing fiber bundle (A) and 0.1 to 30 wt % of a poly (phenylene ether ether ketone) (B'), and 20 to 98.9 wt % of a thermoplastic resin (C) adhering to the composite, wherein the component (B') is a poly (phenylene ether ether ketone) obtained by polymerizing a poly (phenylene ether ether ketone) oligomer (B) having a melting point of not higher than 270° C. using a polymerization catalyst (D).

In the molding material of the present invention, the component (B') preferably has a crystal melting enthalpy ΔH determined by DSC of not less than 40 J/g.

In the molding material of the present invention, the component (A) preferably contains at least 10,000 carbon fiber monofilaments.

In the molding material of the present invention, the component (C) is preferably at least one selected from polyamide resin, polyetherimide resin, polyamide-imide resin, polyether ether ketone resin, and polyphenylene sulfide resin.

In the molding material of the present invention, the component (D) is preferably an alkali metal salt.

In the molding material of the present invention, it is preferred that the component (A) be arranged substantially parallel to the direction of the shaft center, and the length of the component (A) be substantially the same as the length of the molding material.

In the molding material of the present invention, it is preferred that the composite forms a core structure, and the component (C) surround the composite to form a core-sheath structure.

In the molding material of the present invention, the form of the molding material is preferably a long-fiber pellet.

The molding material of the present invention is preferably a molding material comprising a reinforcing fiber substrate (A'), a poly (phenylene ether ether ketone) oligomer (B), and a polymerization catalyst (D), wherein the component (B) has a melting point of not higher than 270° C.

In the molding material of the present invention, the component (B) preferably comprises a cyclic poly (phenylene ether ether ketone) in an amount of 60 wt % or more.

In the molding material of the present invention, the component (B) is preferably a mixture of cyclic poly (phenylene ether ether ketone)s having different numbers of repeating units (m).

In the molding material of the present invention, the component (A') is preferably a carbon fiber.

In the molding material of the present invention, the content of the component (A') is preferably 30 wt % or more.

In the molding material of the present invention, the content of the component (D) is preferably 0.001 to 20 mol % per 1 mol of ether ether ketone structural unit in the component (B).

In the molding method of the present invention, the component (B) is preferably polymerized into a poly (phenylene ether ether ketone) (B') in the mold.

In the molding method of the present invention, the surface temperature of the mold during polymerization of the component (B) into the component (B') is preferably not higher than the melting point of the component (B').

In the molding method of the present invention, after the component (B) is polymerized into the component (B') in the mold, the mold is preferably opened without cooling to take out a molded article.

In the method for producing a molding material of the present invention, the component (B) preferably comprises a cyclic poly (phenylene ether ether ketone) in an amount of 60 wt % or more.

In the method for producing a molding material of the present invention, the component (B) is preferably a mixture of cyclic poly (phenylene ether ether ketone)s having different numbers of repeating units (m).

In the method for producing a molding material of the present invention, it is preferable to further combining a polymerization catalyst (D) with the other components in the step (II).

In the method for producing a molding material of the present invention, the steps (I) to (IV) are preferably performed on-line.

In the method for producing a molding material of the present invention, the take-up speed in the step (IV) is preferably 1 to 100 m/min.

In the method for producing a molding material of the present invention, it is preferred that in the step (II), the heat-melted component (B) be applied to the component (A') to form a composite.

In the method for producing a molding material of the present invention, it is preferred that in the step (II), the component (B) in at least one form selected from the group consisting of particles, fibers, and flakes be applied to the component (A') to form a composite.

In the method for producing a molding material of the present invention, it is preferred that in the step (II), the component (B) in at least one form selected from the group consisting of a film, a sheet, and a nonwoven fabric be applied to the component (A') to form a composite.

In the method for producing a fiber-reinforced composite material of the present invention, the component (B) preferably comprises a cyclic poly (phenylene ether ether ketone) in an amount of 60 wt % or more.

In the method for producing a fiber-reinforced composite material of the present invention, the component (B) is preferably a mixture of cyclic poly (phenylene ether ether ketone)s having different numbers of repeating units (m).

In the method for producing a fiber-reinforced composite material of the present invention, it is preferable to further add a polymerization catalyst (D) to a melt solution of the component (B).

In the method for producing a fiber-reinforced composite material of the present invention, in the step (II-1), (II-2), or (II-3), the melt viscosity of the melt solution of the component (B) is preferably adjusted to 10 Pa·s or lower.

In the method for producing a fiber-reinforced composite material of the present invention, in the step (IV-1), (IV-2), or (IV-3), the thermal polymerization is preferably performed at a temperature of 160° C. to 330° C.

By using the molding material comprising a poly (phenylene ether ether ketone) oligomer (B) or poly (phenylene ether ether ketone) (B') according to the present invention, a molded article having excellent dynamic properties can be easily produced through the use of the molding material excellent in economic efficiency and productivity.

The molding material comprising a reinforcing fiber substrate (A') according to the present invention is excellent in handleability and moldability and also can achieve high fiber content, thereby providing a molded article having excellent mechanical properties. Further, the molding material is excellent in economic efficiency, productivity, and handleability because it can be molded into a fiber-reinforced composite material by heating the molding material at a low temperature for a short time.

According to the method for producing a molding material of the present invention, a reinforcing fiber substrate can be easily combined with a poly (phenylene ether ether ketone), which enables improved productivity such as increased take-up speed and improved economic efficiency such as lowered process temperature. Thus the method is suitably used for producing a molding material such as a prepreg, semipreg, and fabric.

According to the method for producing a fiber-reinforced composite material of the present invention, a reinforcing fiber substrate can be easily combined with a poly (phenylene ether ether ketone), which enables improved productivity due to improved impregnation properties and improved economic efficiency such as lowered process temperature. Thus the method is suitably used for producing a fiber-reinforced composite material.

BRIEF DESCRIPTION OF THE DRAWINGS

FIG. 1 is a schematic view showing an example of a configuration of a composite of a reinforcing fiber bundle (A) and a poly (phenylene ether ether ketone) oligomer (B) or poly (phenylene ether ether ketone) (B');

FIG. 2 is a schematic view showing an example of a preferred aspect of the molding material of the present invention;

FIG. 3 is a schematic view showing an example of a configuration of a cross-section in the direction of the shaft center according to a preferred aspect of the molding material of the present invention;

FIG. 4 is a schematic view showing an example of a configuration of a cross-section in the direction of the shaft center according to a preferred aspect of the molding material of the present invention;

FIG. 5 is a schematic view showing an example of a configuration of a cross-section in the direction of the shaft center according to a preferred aspect of the molding material of the present invention;

FIG. 6 is a schematic view showing an example of a configuration of a cross-section in the direction of the shaft center according to a preferred aspect of the molding material of the present invention;

FIG. 7 is a schematic view showing an example of a configuration of a cross-section in the orthogonal direction according to a preferred aspect of the molding material of the present invention;

FIG. 8 is a schematic view showing an example of a configuration of a cross-section in the orthogonal direction according to a preferred aspect of the molding material of the present invention;

FIG. 9 is a schematic view showing an example of a configuration of a cross-section in the orthogonal direction according to a preferred aspect of the molding material of the present invention;

FIG. 10 is a schematic view showing an example of a configuration of a cross-section in the orthogonal direction according to a preferred aspect of the molding material of the present invention;

FIG. 11 is a schematic view showing an example of a configuration of a cross-section in the orthogonal direction according to a preferred aspect of the molding material of the present invention;

FIG. 12 is a perspective view of a fixture for evaluating drape property;

FIG. 13 is an example of a production apparatus used in the method for producing a molding material according to the present invention. The arrow represents the take-up direction of a fiber-reinforced molding substrate;

FIG. 14 is an example of a production apparatus used in the method for producing a molding material according to the present invention. The arrow represents the take-up direction of a fiber-reinforced molding substrate;

FIG. 15 is an example of a production apparatus used in the method for producing a molding material according to the present invention. The arrow represents the take-up direction of a fiber-reinforced molding substrate;

FIG. 16 is a schematic cross-sectional view showing an example of a propeller shaft obtained by the present invention; and FIG. 17 is a schematic cross-sectional view showing an example of a configuration of a cylindrical body made of a fiber-reinforced composite material obtained by the present invention.

DETAILED DESCRIPTION OF EMBODIMENTS OF THE INVENTION

The molding material of the present invention preferably comprises a continuous reinforcing fiber bundle (A) or reinforcing fiber substrate (A'), a poly (phenylene ether ether ketone) oligomer (B), and a thermoplastic resin (C). Further, the molding material of the present invention may further comprise a polymerization catalyst (D) in a composite, and the poly (phenylene ether ether ketone) oligomer (B) can be converted into a poly (phenylene ether ether ketone) (B') by thermal polymerization in the presence of the polymerization catalyst (D). First, each component will be described.

<Reinforcing Fiber>

Examples of reinforcing fibers that can be used for the continuous reinforcing fiber bundle (A) or reinforcing fiber substrate (A') of the present invention include, but are not limited to, carbon fibers, glass fibers, aramid fibers, boron fibers, alumina fibers, mineral fibers, and silicon carbide fibers, and two or more of such fibers can be used in combination.

In particular, carbon fibers are preferred because they have excellent specific strength and specific rigidity and improve the dynamic properties of a molded article. Among them, to obtain a molded article having a light weight, high strength, and high elastic modulus, carbon fibers are preferably used, and, in particular, carbon fibers with a tensile modulus of 200 to 700 GPa are preferably used. Further, carbon fibers and metal-coated reinforcing fibers have an effect of improving the conductivity of a molded article because of having high conductivity, and thus are particularly preferred, for example, for a housing of electronic equipment that requires electromagnetic shielding properties.

In a more preferred embodiment of carbon fibers, the amount of surface functional groups (O/C), which is the atomic ratio of oxygen (O) to carbon (C) on the fiber surface, measured by X-ray photoelectron spectroscopy is in the range of 0.05 to 0.4. The higher the O/C, the larger the amount of functional groups on the carbon fiber surface, and this increases adhesion to a matrix resin. However, if the O/C is too high, the crystal structure on the carbon fiber surface may be destroyed. When the O/C is within the preferred range, a molded article having excellently balanced dynamic properties can be obtained.

The amount of surface functional groups (O/C) is determined by X-ray photoelectron spectroscopy according to the following procedure. First, carbon fibers from which a sizing agent and the like have been removed with a solvent are cut and spread on a sample support made of copper. Thereafter, the photoelectron take-off angle is set at 90°, and using $MgK_{\alpha 1,2}$ as an X-ray source, the inside of a sample chamber is kept at $1 \times 10^{-8}$ Torr. As a correction of a peak associated with electrification during the measurement, the kinetic energy value (K.E.) of the main peak of C 1s is set at 969 eV. The C 1s peak area is determined by drawing a straight baseline in the K.E. range of 958 to 972 eV. The O 1s peak area is determined by drawing a straight baseline in the K.E. range of 714 to 726 eV. The amount of surface functional groups (O/C) is calculated as an atomic ratio from the ratio of the O 1S peak area to the C 1S peak area described above using an apparatus-specific sensitivity correction value.

The continuous reinforcing fiber bundle (A) used for the molding material of the present invention means that a reinforcing fiber bundle comprising unidirectionally arranged monofilaments is continuous in the longitudinal direction. However, all the monofilaments in the reinforcing fiber bundle need not necessarily be continuous throughout the whole length, and some of the monofilaments may be broken halfway. Examples of such continuous reinforcing fiber bundles include a unidirectional fiber bundle, a bidirectional fiber bundle, and a multidirectional fiber bundle, and a unidirectional fiber bundle can be more preferably used from the standpoint of productivity during the process for producing a molding material.

The reinforcing fiber bundle (A) in the present invention becomes more economically advantageous as the number of reinforcing fiber monofilaments increases, and thus the number of monofilaments is preferably 10,000 or more. However, the larger number of reinforcing fiber monofilaments tends to be disadvantageous to impregnation properties of a matrix resin, and, therefore, when a carbon fiber bundle is used as the reinforcing fiber bundle (A), the number of monofilaments is more preferably 15,000 to 100,000, and particularly preferably 20,000 to 50,000, in order to achieve the balance between economic efficiency and impregnation properties. In particular, excellent impregnation properties of thermoplastic resin during the process for producing a molding material and satisfactory dispersion of reinforcing fibers into a molded article at the time of injection molding, which are the effects of the present invention, are suitable for a reinforcing fiber bundle having a larger number of fibers.

Further, to bundle monofilaments into a reinforcing fiber bundle, a sizing agent may be used in addition to the poly (phenylene ether ether ketone) oligomer (B) of the present invention. This is for the purpose of improving handleability during transfer of reinforcing fibers and processability during the process for producing a molding material by applying the sizing agent to the reinforcing fiber bundle. Sizing agents such as epoxy resin, urethane resin, acrylic resin, and various thermoplastic resins can be used alone or in combination of two or more thereof as long as the object of the present invention is achieved.

Examples of the form and arrangement of the reinforcing fiber substrate (A') used in the present invention include, but are not limited to, substrates comprising unidirectionally arranged continuous reinforcing fibers (hereinafter also referred to simply as "unidirectionally arranged substrate"), fabrics (cloths), nonwoven fabrics, mats, knits, braids, yarns, and tows. Among them, unidirectionally arranged substrates are preferably used because strength properties can be easily designed depending on the lamination structure; fabrics are preferred because they can be easily shaped into a curved shape; and nonwoven fabrics and mats are preferably used because they can be easily molded in the thickness direction. "Unidirectionally arranged substrate" as used herein refers to a substrate comprising a plurality of reinforcing fibers arranged in parallel. Such a unidirectionally arranged substrate can be obtained, for example, by the method in which a plurality of the reinforcing fiber bundles (A) mentioned above is unidirectionally aligned and formed into a sheet.

When the reinforcing fiber substrate (A') is a unidirectionally arranged substrate, a fabric, a nonwoven fabric, or a mat, the number of reinforcing fiber monofilaments is not particularly restricted.

Further, to the reinforcing fiber substrate (A'), a binder may be added in addition to the component (B) in the present invention in order to prevent separation of monofilaments. This is for the purpose of improving handleability during transfer of the reinforcing fiber substrate (A') and processability during the process for producing a molding material by applying the binder to the reinforcing fiber substrate (A'). Binders such as epoxy resin, urethane resin, acrylic resin, and various thermoplastic resins can be used alone or in combination of two or more thereof as long as the object of the present invention is achieved.

<Poly (Phenylene Ether Ether Ketone) Oligomer (B)>

The poly (phenylene ether ether ketone) oligomer (B) used in the present invention preferably has a melting point of not higher than 270° C., preferably not higher than 250° C., more preferably not higher than 230° C., still more preferably not higher than 200° C., and particularly preferably not higher than 180° C., for example. The lower the melting point of the poly (phenylene ether ether ketone) oligomer (B) is, the lower the processing temperature can be, and the lower the process temperature can be set. This is advantageous because the energy required for processing can be reduced. Further, the lower the melting point of the poly (phenylene ether ether ketone) oligomer (B) is, the lower the molding temperature can be; consequently, the energy required for a molding process can be reduced, and thermal degradation of components can be reduced. Further, since the process temperature can be set low, for example, the melt-kneading temperature can be set sufficiently lower than the polymerization temperature in the step of melting and mixing the polymerization catalyst (D) mentioned below and the poly (phenylene ether ether ketone) oligomer (B). These effects inhibit such an unfavorable reaction that in the process for producing a molding material, the polymerization of the poly (phenylene ether ether ketone) oligomer (B) proceeds during storage or before impregnation into the reinforcing fiber bundle (A) or reinforcing fiber substrate (A'), resulting in increased melt viscosity. The melting point of the poly (phenylene ether ether ketone) oligomer (B) can be measured by observing an endothermic peak temperature using a differential scanning calorimeter.

The poly (phenylene ether ether ketone) oligomer (B) in the present invention is preferably a poly (phenylene ether ether ketone) composition comprising a cyclic poly (phenylene ether ether ketone) in an amount of 60 wt % or more, more preferably 65 wt % or more, still more preferably 70 wt % or more, and yet more preferably 75 wt % or more.

The cyclic poly (phenylene ether ether ketone) in the present invention is a cyclic compound having p-phenylene ketone and p-phenylene ether in a repeating structural unit, represented by Formula (a) below.

[Chemical formula 1]

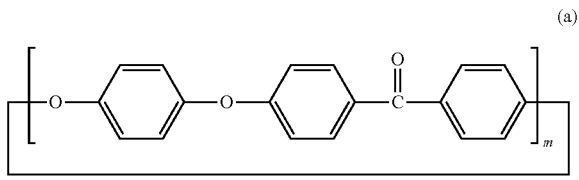

(a)

In Formula (a), the number of repeating units (m) is in the range of 2 to 40, more preferably 2 to 20, still more preferably 2 to 15, and particularly preferably 2 to 10, for example. The melting point of the poly (phenylene ether ether ketone) oligomer (B) tends to increase with increasing number of repeating units (m), and, therefore, the number of repeating units (m) is preferably in the above range in order to melt the poly (phenylene ether ether ketone) oligomer (B) at a low temperature.

Further, the poly (phenylene ether ether ketone) oligomer (B) is preferably a mixture of cyclic poly (phenylene ether ether ketone)s having different numbers of repeating units (m), more preferably at least three different numbers of repeating units (m), still more preferably at least four numbers of repeating units (m), and particularly preferably at least five numbers of repeating units (m). Furthermore, it is particularly preferred that the number of repeating units (m) be consecutive. As compared to a single compound having a single number of repeating units (m), a mixture of cyclic poly (phenylene ether ether ketone)s having different numbers of repeating units (m) tends to have a low melting point. Further, as compared to a cyclic poly (phenylene ether ether ketone) mixture of cyclic poly (phenylene ether ether ketone)s having two different numbers of repeating units (m), a mixture of cyclic poly (phenylene ether ether ketone)s having three or more numbers of repeating units (m) tends to have an even lower melting point. Furthermore, as compared to a mixture of cyclic poly (phenylene ether ether ketone)s having nonconsecutive numbers of repeating units (m), a mixture of cyclic poly (phenylene ether ether ketone)s having consecutive numbers of repeating units (m) tends to have an even lower melting point. The cyclic poly (phenylene ether ether ketone)s having different numbers of repeating units (m) can be analyzed by fractionation by high-performance liquid chromatography. Further, composition of the poly (phenylene ether ether ketone) oligomer (B), i.e., the weight fraction of each cyclic poly (phenylene ether ether ketone) having different numbers of repeating units (m) contained in the poly (phenylene ether ether ketone) oligomer (B) can be calculated from the peak area ratio of each cyclic poly (phenylene ether ether ketone) by high-performance liquid chromatography.

The main example of impurity components in the poly (phenylene ether ether ketone) oligomer (B), i.e., components other than the cyclic poly (phenylene ether ether ketone) is a linear poly (phenylene ether ether ketone). Since the linear poly (phenylene ether ether ketone) has a high melting point, the melting point of the poly (phenylene ether ether ketone) oligomer (B) tends to increase as the weight fraction of the linear poly (phenylene ether ether ketone) increases. Therefore, when the weight fraction of the cyclic poly (phenylene ether ether ketone)s in the poly (phenylene ether ether ketone) oligomer (B) is within the range described above, the poly (phenylene ether ether ketone) oligomer (B) tends to have a low melting point.

The poly (phenylene ether ether ketone) oligomer (B) in the present invention having characteristics described above preferably has a reduced viscosity (η) of 0.1 dL/g or less, for example, more preferably 0.09 dL/g or less, and still more preferably 0.08 dL/g or less, for example. "Reduced viscosity" as used herein, unless otherwise specified, refers to the value obtained by measuring a solution of concentrated sulfuric acid with a concentration of 0.1 g/dL (the weight of the poly (phenylene ether ether ketone) oligomer (B)/the volume of 98 wt % concentrated sulfuric acid) at 25° C. using an Ostwald viscosimeter immediately after completion of dissolution in order to minimize the influence of sulfonation. The reduced viscosity was calculated by the following equation.

$$\eta=\{(t/t_0)-1\}/C$$

(wherein t represents the transit time of a sample solution in seconds; $t_0$ represents the transit time of a solvent (98 wt % concentrated sulfuric acid) in seconds; and C represents the concentration of a solution.)

Examples of methods for obtaining the poly (phenylene ether ether ketone) oligomer (B) used in the present invention include the methods [B1] to [B3] below.

[B1] The production method in which a mixture containing at least a dihalogenated aromatic ketone compound, dihydroxy aromatic compound, base, and organic polar solvent is heated and allowed to react;

[B2] The production method in which a mixture containing at least a linear poly (phenylene ether ether ketone), dihalogenated aromatic ketone compound, dihydroxy aromatic compound, base, and organic polar solvent is heated and allowed to react; or

[B3] The production method in which a mixture containing at least a linear poly (phenylene ether ether ketone), basic compound, and organic polar solvent is heated and allowed to react is strongly desired to be used.

Representative reaction formulas of the above-mentioned methods [B1] to [B3] for producing a poly (phenylene ether ether ketone) oligomer (B) are shown below.

[Chemical formula 2]

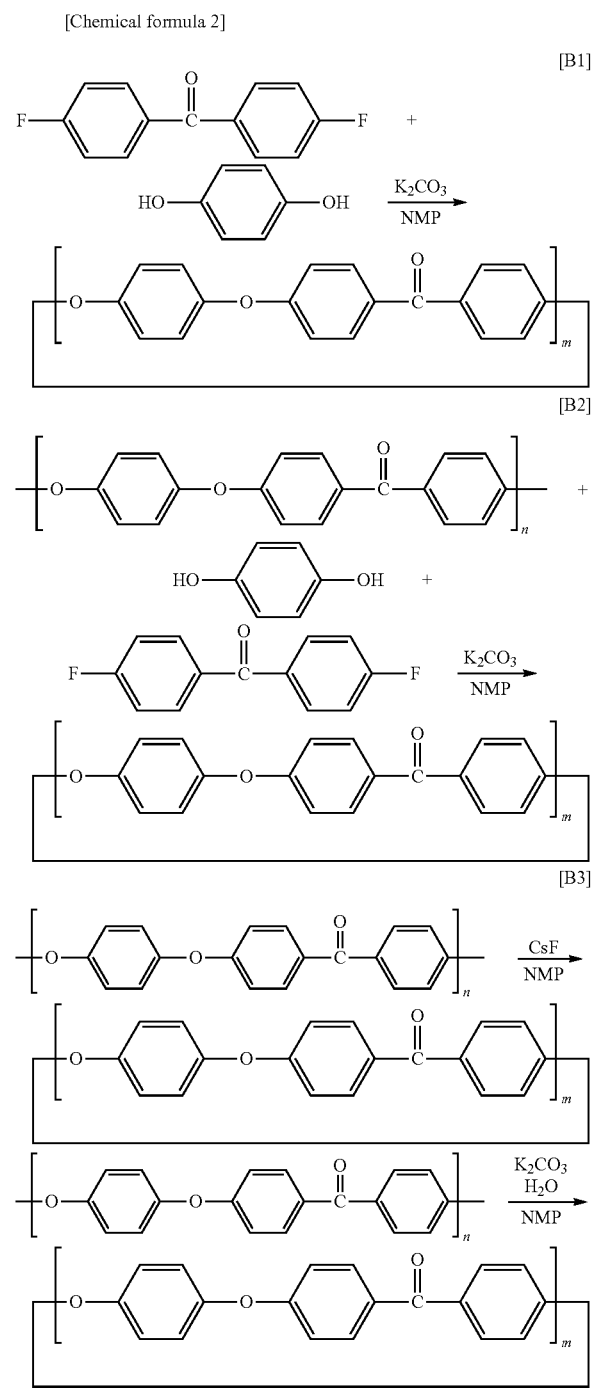

<Polymerization Catalyst (D)>

In the present invention, the polymerization catalyst (D) is not particularly restricted as long as it is a compound having an effect of accelerating thermal polymerization of a poly (phenylene ether ether ketone) oligomer (B) into a poly (phenylene ether ether ketone) (B'). Known catalysts such as photopolymerization initiators, radical polymerization initiators, cationic polymerization initiators, anionic polymerization initiators, and transition metal catalysts can be used, and, in particular, anionic polymerization initiators are preferred. Examples of anionic polymerization initiators include alkali metal salts such as inorganic alkali metal salts and organic alkali metal salts. Examples of inorganic alkali metal salts include alkali metal halides such as sodium fluoride, potassium fluoride, cesium fluoride, and lithium chloride. Examples of organic alkali metal salts include alkali metal alkoxides such as sodium methoxide, potassium methoxide, sodium ethoxide, potassium ethoxide, sodium tert-butoxide, and potassium tert-butoxide; alkali metal phenoxides such as sodium phenoxide, potassium phenoxide, sodium-4-phenoxyphenoxide, and potassium-4-phenoxyphenoxide; and alkali metal acetates such as lithium acetate, sodium acetate, and potassium acetate. It is presumed that these anionic polymerization initiators exhibit catalytic action by nucleophilically attacking the poly (phenylene ether ether ketone) oligomer (B). Therefore, compounds having a nucleophilic attack capability comparable to that of these anionic polymerization initiators can also be used as the catalyst, and examples of such compounds having a nucleophilic attack capability include polymers having an anionically polymerizable terminal. These anionic polymerization initiators may be used alone or in combination of two or more thereof. When thermal polymerization of the poly (phenylene ether ether ketone) oligomer (B) is carried out in the presence of such a preferred catalyst(s), a poly (phenylene ether ether ketone) (B') is likely to be obtained in a short time, and, specifically, the heating time in the thermal polymerization is not longer than 2 hours, not longer than 1 hour, and not longer 0.5 hour, for example.

The amount of catalyst used varies depending on the molecular weight of the poly (phenylene ether ether ketone) (B') of interest and the type of catalyst, but it is generally 0.001 to 20 mol %, preferably 0.005 to 15 mol %, and more preferably 0.01 to 10 mol %, based on 1 mol of the repeating unit represented by the following formula, which is a main structural unit of the poly (phenylene ether ether ketone) (B'). When the catalyst(s) is/are added in an amount in this preferred range, the thermal polymerization of the poly (phenylene ether ether ketone) oligomer (B) is likely to proceed in a short time.

[Chemical formula 3]

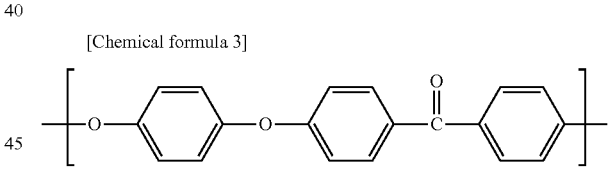

Examples of the method of adding a polymerization catalyst (D) include, but are not limited to, the method in which a mixture of a poly (phenylene ether ether ketone) oligomer (B) and a polymerization catalyst (D) is preliminarily prepared, and the mixture is combined with reinforcing fibers.

The mixture of a poly (phenylene ether ether ketone) oligomer (B) and a polymerization catalyst (D) may be obtained by any method, but it is preferable to add the polymerization catalyst (D) to the poly (phenylene ether ether ketone) oligomer (B) and then disperse the polymerization catalyst (D) uniformly. Examples of the method for uniform dispersion include mechanical dispersion and dispersion using a solvent. Specific examples of the mechanical dispersion include methods using a grinder, stirrer, mixer, shaker, or mortar. Specific examples of the dispersion using a solvent include a method comprising dissolving or dispersing the poly (phenylene ether ether ketone) oligomer (B) in an appropriate solvent; adding the polymerization catalyst (D) thereto; and then removing the solvent. When the polymerization catalyst (D) is solid in dispersing the polymerization catalyst (D), the polymerization catalyst (D) preferably has an average particle size of 1 mm or smaller to allow more uniform dispersion.

<Poly (Phenylene Ether Ether Ketone) (B')>

The poly (phenylene ether ether ketone) (B') in the present invention is preferably obtained by conversion of a poly (phenylene ether ether ketone) oligomer (B) through thermal polymerization in the presence of a polymerization catalyst (D). The poly (phenylene ether ether ketone) (B') as described herein is a linear compound having p-phenylene ketone and p-phenylene ether in a repeating structural unit, represented by Formula (b) below.

[Chemical formula 4]

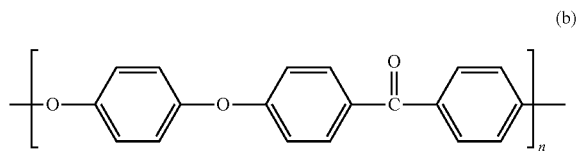

(b)

The reduced viscosity (η) of the poly (phenylene ether ether ketone) (B') in the present invention is not critical, but it is preferably in the range of 0.1 to 2.5 dL/g, more preferably 0.2 to 2.0 dL/g, and still more preferably 0.3 to 1.8 dL/g, for example. When the viscosity is controlled to be in such a preferred range, a molding material that has excellent moldability and provides a molded article with excellent dynamic properties can be obtained.

The melting point of the poly (phenylene ether ether ketone) (B') in the present invention cannot be uniquely determined because it varies depending on the composition and molecular weight of the poly (phenylene ether ether ketone) oligomer (B), the weight fraction of cyclic poly (phenylene ether ether ketone)s contained in the poly (phenylene ether ether ketone) oligomer (B), and the conditions of heating, but it is preferably in the range of 270 to 450° C., more preferably 280 to 400° C., and still more preferably 300 to 350° C., for example. When the melting point is controlled to be in such a preferred temperature range, a molding material having excellent moldability and heat resistance can be obtained. The melting point of the poly (phenylene ether ether ketone) (B') can be measured in such a manner that the part of the poly (phenylene ether ether ketone) (B') is taken out physically from the molding material of the present invention, and the endothermic peak temperature of this sample is observed using a differential scanning calorimeter.

When the poly (phenylene ether ether ketone) oligomer (B) is converted into a poly (phenylene ether ether ketone) (B') by thermal polymerization, the heating temperature is preferably not lower than the melting point of the poly (phenylene ether ether ketone) oligomer (B), and such temperature conditions can be used without any restriction. When the heating temperature is lower than the melting point of the poly (phenylene ether ether ketone) oligomer (B), it is likely that it will take a long time to obtain a poly (phenylene ether ether ketone) (B') by thermal polymerization or that the thermal polymerization will not proceed, so that a poly (phenylene ether ether ketone) (B') cannot be obtained. The lower limit of the heating temperature is, for example, not lower than 160° C., preferably not lower than 200° C., more preferably not lower than 230° C., and still more preferably not lower than 270° C. In this temperature range, it is likely that the poly (phenylene ether ether ketone) oligomer (B) will melt and a poly (phenylene ether ether ketone) (B') can be obtained in a short time.

When the temperature in thermal polymerization is too high, undesirable side reactions as represented by cross-linking reaction and decomposition reaction are likely to occur, for example, between the poly (phenylene ether ether ketone) oligomers (B), between the poly (phenylene ether ether ketone)s (B') formed by heating, and between the poly (phenylene ether ether ketone) (B') and the poly (phenylene ether ether ketone) oligomer (B), and the resulting poly (phenylene ether ether ketone) (B') may have degraded properties. Thus, it is desirable to avoid temperatures at which such undesirable side reactions significantly occur. The upper limit of the heating temperature is, for example, not higher than 450° C., preferably not higher than 400° C., more preferably not higher than 350° C., and still more preferably not higher than 300° C. When the heating temperature is not higher than this temperature range, it is likely that adverse effects of the undesirable side reactions on the properties of the resulting poly (phenylene ether ether ketone) (B') can be prevented. In cases where a known poly (phenylene ether ether ketone) oligomer is used, because of its high melting point, when the heating temperature is in the preferred temperature range described above, it is likely that it will take a long time for thermal polymerization or that the thermal polymerization will not proceed, so that a poly (phenylene ether ether ketone) (B') cannot be obtained; whereas in the case of the poly (phenylene ether ether ketone) oligomer (B) in the present invention characterized by having a melting point of not higher than 270° C., thermal polymerization proceeds efficiently in the preferred temperature range described above, and a poly (phenylene ether ether ketone) (B') can be obtained.

The poly (phenylene ether ether ketone) oligomer (B) in the present invention can also be thermally polymerized at a temperature not higher than the melting point of the resulting poly (phenylene ether ether ketone) (B'). The poly (phenylene ether ether ketone) (B') obtained under such polymerization conditions, as compared to known poly (phenylene ether ether ketone)s, tends to have a high melting enthalpy, which results in increased crystallinity. This is probably because a phenomenon in which thermal polymerization of the poly (phenylene ether ether ketone) oligomer (B) and crystallization of the poly (phenylene ether ether ketone) (B') obtained by the polymerization proceed simultaneously, i.e., so-called crystallization polymerization is proceeding. The lower limit of the melting enthalpy of the poly (phenylene ether ether ketone) (B') obtained by crystallization polymerization is, for example, not less than 40 J/g, preferably not less than 45 J/g, and more preferably not less than 50 J/g. The melting enthalpy of the poly (phenylene ether ether ketone) (B') can be measured in such a manner that the part of the poly (phenylene ether ether ketone) (B') is taken out physically from the molding material of the present invention, and the endothermic peak area of this sample is observed using a differential scanning calorimeter The heating temperature range where such crystallization polymerization occurs cannot be uniquely defined because it varies depending on the conditions such as weight fraction and composition ratio of cyclic poly (phenylene ether ether ketone)s in the poly (phenylene ether ether ketone) oligomer (B) used, and thermal polymerization method, but it is, for example, in the range of 160 to 330° C., preferably 200 to 300° C.

The reaction time cannot be uniquely defined because it varies depending on the conditions such as weight fraction and composition ratio of cyclic poly (phenylene ether ether ketone)s in the poly (phenylene ether ether ketone) oligomer (B) used, heating temperature, and thermal polymerization method, but it is preferably set such that the above-described undesirable side reactions such as cross-linking reaction will not occur, for example, in the range of 0.001 to 100 hours, preferably 0.005 to 20 hours, and more preferably 0.005 to 10 hours. When the reaction time is such a preferred reaction time, it is likely that adverse effects of the progress of undesirable side reactions such as cross-linking reaction on the properties of the resulting poly (phenylene ether ether ketone) can be prevented.

<Thermoplastic Resin (C)>

The thermoplastic resin (C) used in the present invention may be, but are not limited to, polyester resins such as polyethylene terephthalate (PET) resin, polybutylene terephthalate (PBT) resin, polytrimethylene terephthalate (PTT) resin, polyethylene naphthalate (PENp) resin, and liquid crystal polyester; polyolefin resins such as polyethylene (PE) resin, polypropylene (PP) resin, and polybutylene resin; styrene resins; urethane resins; further, polyoxymethylene (POM) resin, polyamide (PA) resin, polycarbonate (PC) resin, polymethyl methacrylate (PMMA) resin, polyvinyl chloride (PVC) resin, polyphenylene sulfide (PPS) resin, polyphenylene ether (PPE) resin, modified PPE resin, polyimide (PI) resin, polyamide-imide (PAI) resin, polyetherimide (PEI) resin, polysulfone (PSU) resin, modified PSU resin, polyethersulfone (PES) resin, polyketone (PK) resin, polyether ketone (PEK) resin, polyether ether ketone (PEEK) resin, polyether ketone ketone (PEKK) resin, polyarylate (PAR) resin, polyether nitrile (PEN) resin, phenol resin, phenoxy resin, fluorine resins such as polytetrafluoroethylene; and copolymers, modifications, and resin blends of two or more thereof Among them, engineering plastics or super engineering plastics such as polyamide resin, polyetherimide resin, polyamide-imide resin, polyether ether ketone resin, and polyphenylene sulfide resin are preferably used, and polyether ether ketone resin is particularly preferably used because it shows excellent compatibility with a poly (phenylene ether ether ketone) oligomer (B), has good fiber dispersibility, and provides a molded article having excellent appearance.

Through the use of such a thermoplastic resin (C), the effect of improving the dynamic properties of a molded article in the present invention can be better brought out.

From the standpoint of dynamic properties of a molded article obtained by molding a molding material, the molecular weight of the thermoplastic resin (C) used in the present invention is preferably 10,000 or more, more preferably 20,000 or more, and particularly preferably 30,000 or more, in terms of weight average molecular weight. A larger weight average molecular weight is advantageous because it enhances the strength and ductility of a matrix resin. The upper limit of the weight average molecular weight is not particularly limited, but from the standpoint of fluidity during molding, it is preferably not more than 1,000,000, and more preferably not more than 500,000, for example. The weight average molecular weight can be determined using common GPC (gel-permeation chromatography) such as SEC (size-exclusion chromatography).

The thermoplastic resin (C) exemplified above may contain fiber-reinforcing agents, impact-resistance improvers such as elastomers or rubber components, and other fillers and additives as long as the object of the present invention is achieved. Examples thereof include inorganic fillers, flame retardants, conductivity-imparting agents, crystal nucleating agents, UV absorbers, antioxidants, vibration dampers, antimicrobial agents, insect repellents, deodorizers, stain inhibitors, heat stabilizers, mold releasing agents, antistatic agents, plasticizers, lubricants, coloring agents, pigments, dyes, foaming agents, foam suppressors, and coupling agents.

<Molding Material>

In a first preferred embodiment, the molding material of the present invention comprises a reinforcing fiber bundle (A), a poly (phenylene ether ether ketone) oligomer (B), and a thermoplastic resin (C).

Among the components, the amount of the reinforcing fiber bundle (A) is 1 to 50 wt %, preferably 5 to 45 wt %, and more preferably 10 to 40 wt %, based on 100 wt % of the total components (A), (B), and (C). When the amount of the reinforcing fiber bundle (A) is less than 1 wt %, the resulting molded article may have poor dynamic properties, and when it is more than 50 wt %, fluidity may decrease during injection molding.

The amount of the poly (phenylene ether ether ketone) oligomer (B) is 0.1 to 20 wt %, preferably 1 to 18 wt %, and more preferably 5 to 15 wt %, based on 100 wt % of the total components (A), (B), and (C). When the poly (phenylene ether ether ketone) oligomer (B) is used in this range, a molding material having excellent moldability and handleability can be obtained.

The amount of the thermoplastic resin (C) is 30 to 98.9 wt %, preferably 37 to 94 wt %, and more preferably 45 to 85 wt %, based on 100 wt % of the total components (A), (B), and (C). When the thermoplastic resin (C) is used in this range, a molding material having excellent moldability and handleability can be obtained.

In a second preferred embodiment, the molding material of the present invention comprises a reinforcing fiber bundle (A), a poly (phenylene ether ether ketone) (B'), a thermoplastic resin (C), and a polymerization catalyst (D).

Among the components, the amount of the reinforcing fiber bundle (A) is 1 to 50 wt %, preferably 5 to 45 wt %, and more preferably 10 to 40 wt %, based on 100 wt % of the total components (A), (B'), and (C). When the amount of the reinforcing fiber bundle (A) is less than 1 wt %, the resulting molded article may have poor dynamic properties, and when it is more than 50 wt %, fluidity may decrease during injection molding.

The amount of the poly (phenylene ether ether ketone) (B') is 0.1 to 30 wt %, preferably 1 to 18 wt %, and more preferably 5 to 15 wt %, based on 100 wt % of the total components (A), (B'), and (C). When the poly (phenylene ether ether ketone) (B') is used in this range, a molding material having excellent moldability and handleability can be obtained.

The amount of the thermoplastic resin (C) is 20 to 98.9 wt %, preferably 37 to 94 wt %, and more preferably 45 to 85 wt %, based on 100 wt % of the total components (A), (B'), and (C). When the thermoplastic resin (C) is used in this range, a molding material having excellent moldability and handleability can be obtained.

Further, the amount of the polymerization catalyst (D) is 0.001 to 20 mol %, preferably 0.005 to 15 mol %, and more preferably 0.01 to 10 mol %, based on 1 mol of the repeating unit represented by the following formula, which is a main structural unit of the poly (phenylene ether ether ketone) oligomer (B).

[Chemical formula 5]

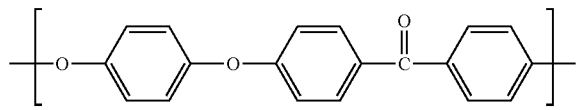

The molding material of the present invention is a molding material comprising a composite of a continuous reinforcing fiber bundle (A) and a poly (phenylene ether ether ketone) oligomer (B) or poly (phenylene ether ether ketone) (B'), and a thermoplastic resin (C) configured to adhere to the composite.

The reinforcing fiber bundle (A) and the poly (phenylene ether ether ketone) oligomer (B) or poly (phenylene ether ether ketone) (B') together form a composite. The configuration of the composite is as shown in FIG. 1; the space between monofilaments of the reinforcing fiber bundle (A) is filled with the poly (phenylene ether ether ketone) oligomer (B) or poly (phenylene ether ether ketone) (B'). In other words, the reinforcing fibers (A) are dispersed like islands in the sea of the poly (phenylene ether ether ketone) oligomer (B) or poly (phenylene ether ether ketone) (B'). Further, the polymerization catalyst (D), in order to perform its function, is preferably located in the sea of the poly (phenylene ether ether ketone) oligomer (B) or poly (phenylene ether ether ketone) (B') and/or at the interface between the reinforcing fiber bundle (A) and the poly (phenylene ether ether ketone) oligomer (B) or poly (phenylene ether ether ketone) (B').

In the molding material of the present invention, by using a composite of a poly (phenylene ether ether ketone) oligomer (B) or poly (phenylene ether ether ketone) (B') with excellent heat resistance and a reinforcing fiber bundle (A) satisfactorily impregnated therewith, even if the composite is adhered to a thermoplastic resin (C), for example when the molding material of the present invention is injection molded, the poly (phenylene ether ether ketone) oligomer (B) or poly (phenylene ether ether ketone) (B') melt-kneaded in a cylinder of an injection molding machine spreads into the thermoplastic resin (C), which helps the reinforcing fiber bundle (A) disperse into the thermoplastic resin (C). Further, the poly (phenylene ether ether ketone) oligomer (B) or poly (phenylene ether ether ketone) (B') is readily replaced with the thermoplastic resin (C), which allows the reinforcing fiber bundle (A) to be more readily dispersed. In view of such an effect, the poly (phenylene ether ether ketone) oligomer (B) or poly (phenylene ether ether ketone) (B') acts as a so-called impregnation aid/dispersion aid.

In the first and second preferred embodiments of the molding material of the present invention, as shown in FIG. 2, the reinforcing fiber bundle (A) is arranged substantially parallel to the direction of the shaft center of the molding material, and the length of the reinforcing fiber bundle (A) is substantially the same as the length of the molding material.

The phrase "arranged substantially parallel" as used herein refers to a state in which the major axis of the reinforcing fiber bundle and the major axis of the molding material are oriented in the same direction. The angular difference between the axes is preferably 20° or less, more preferably 10° or less, and still more preferably 5° or less. The phrase "substantially the same length" means that, for example, in a pelleted molding material, a reinforcing fiber bundle is not broken halfway inside the pellet, or the molding material is substantially free of reinforcing fiber bundles that are significantly shorter than the full-length of the pellet. The amount of the reinforcing fiber bundle that are shorter than the full-length of the pellet is not particularly defined, but when the content of the reinforcing fiber having a length that is 50% or less of the full-length of the pellet is not more than 30 wt %, the molding material is evaluated to be substantially free of reinforcing fiber bundles that are significantly shorter than the full-length of the pellet. Further, the content of the reinforcing fiber having a length that is 50% or less of the full-length of the pellet is preferably not more than 20 wt %. "Full-length of the pellet" refers to the length in the orientation direction of the reinforcing fiber in the pellet. When the reinforcing fiber bundle (A) has a length equivalent to that of the molding material, the reinforcing fiber length in the molded article can be long, and, consequently, excellent dynamic properties can be provided.

FIGS. 3 to 6 schematically show examples of configurations of cross-sections of the molding material of the present invention in the direction of the shaft center, and FIGS. 7 to 10 schematically show examples of configurations of cross-sections of the molding material of the present invention in the orthogonal direction.

The configuration of the cross-section of the molding material is not limited to those shown in the figures as long as a thermoplastic resin (C) is configured to adhere to a composite of a reinforcing fiber bundle (A) and a poly (phenylene ether ether ketone) oligomer (B) or poly (phenylene ether ether ketone) (B'). Preferably, as shown in FIGS. 3 to 5 showing cross-sections in the direction of the shaft center, configurations in which a composite serving as a core is sandwiched between thermoplastic resins (C) in layers are preferred.

Also, as shown in FIGS. 7 to 9 showing cross-sections in the orthogonal direction, configurations in which such a core-sheath structure is formed that a composite serving as a core is surrounded by a thermoplastic resin (C) are preferred. In the case of a configuration in which a thermoplastic resin (C) covers a plurality of composites as shown in FIG. 11, the number of composites is preferably about 2 to 6.

Alternatively, in the vicinity of an adhered boundary between a composite and a thermoplastic resin (C), the thermoplastic resin (C) may partially penetrate into part of the composite to be compatible with the poly (phenylene ether ether ketone) oligomer (B) or poly (phenylene ether ether ketone) (B') in the composite or to impregnate into reinforcing fibers.

In the direction of the shaft center of the molding material, it is only required that the cross-sectional shape be maintained substantially the same and continuous. Depending on the molding method, such a continuous molding material may be cut to a certain length.

The molding material of the present invention can be formed into a final molded article by blending a composite of a reinforcing fiber bundle (A) and a poly (phenylene ether ether ketone) oligomer (B) or poly (phenylene ether ether ketone) (B') with a thermoplastic resin (C) using a method, e.g., injection molding or press molding. In view of handleability of the molding material, it is important that until molding, the composite and the thermoplastic resin (C) not be separated and the configuration as mentioned above be maintained. The poly (phenylene ether ether ketone) oligomer (B) has a low molecular weight, and therefore, in most cases, it is generally a solid that is relatively fragile and easily broken at normal temperature. Accordingly, the thermoplastic resin (C) is preferably configured to protect the composite so that the poly (phenylene ether ether ketone)

oligomer (B) is not broken and scattered, for example, by material transportation before molding, impact of handling, and abrasion. Further, the composite and the thermoplastic resin (C) have a different configuration (size, aspect ratio), specific gravity, and weight, and, therefore, may be separated during material transportation before molding, handling, or material transfer in a molding process, which can cause variation in dynamic properties of molded articles, or decrease the fluidity to cause mold clogging or blocking in the molding process.

Thus, it is preferred that, as shown in FIGS. 7 to 9, the thermoplastic resin (C) be configured to surround the composite of a reinforcing fiber bundle (A), which is reinforcing fibers, and a poly (phenylene ether ether ketone) oligomer (B) or poly (phenylene ether ether ketone) (B'). In other words, it is preferred that the composite of a reinforcing fiber bundle (A), which is reinforcing fibers, and a poly (phenylene ether ether ketone) oligomer (B) or poly (phenylene ether ether ketone) (B') forms a core structure, and the thermoplastic resin (C) surround the composite to form a core-sheath structure.

In such a configuration, a high-molecular-weight thermoplastic resin (C) wraps around the poly (phenylene ether ether ketone) oligomer (B) that is easily broken, or the thermoplastic resin (C) is disposed on a surface that is easily abraded; therefore, the molding material is likely to maintain its shape, and the composite and the thermoplastic resin (C) can be firmly combined. Regarding which configuration is advantageous, i.e., the configuration in which the thermoplastic resin (C) is configured to surround the composite of a reinforcing fiber bundle (A) and a poly (phenylene ether ether ketone) oligomer (B) or poly (phenylene ether ether ketone) (B') or the configuration in which the composite and the thermoplastic resin (C) are arranged in layers, the configuration in which the thermoplastic resin (C) is configured to surround the composite is more preferred in terms of the ease of production and handleability of materials.

As mentioned above, it is desired that the reinforcing fiber bundle (A) be completely impregnated with the poly (phenylene ether ether ketone) oligomer (B) or poly (phenylene ether ether ketone) (B'). However, that is practically difficult, and some voids are present in the composite of the reinforcing fiber bundle (A) and the poly (phenylene ether ether ketone) oligomer (B) or poly (phenylene ether ether ketone) (B'). The number of voids increases particularly when the content of the reinforcing fiber bundle (A) is large, but the impregnation/fiber dispersion-promoting effect according to the present invention is exhibited even when some voids are present. However, the impregnation/fiber dispersion-promoting effect significantly decreases when a void fraction is more than 40%. Thus, the void fraction is preferably in the range of 0 to 40%, and more preferably in the range of 20% or less. The void fraction is determined by measuring a composite part according to ASTM D2734 test method (1997).

The molding material of the present invention is preferably cut to a length in the range of 1 to 50 mm when used. By adjusting the length within such a range, fluidity and handleability during molding can be sufficiently improved. Examples of particularly preferred forms of the molding material cut to such an appropriate length include a long-fiber pellet for injection molding.

The molding material of the present invention can also be used in a continuous or long form depending on the molding method. For example, the molding material in the form of a thermoplastic yarn prepreg can be wound around a mandrel with heating to obtain roll molded article. Examples of such molded articles include a liquefied natural gas tank. Also, a plurality of the molding materials of the present invention can be unidirectionally aligned and heat-fused to produce a unidirectional thermoplastic prepreg. Such a prepreg is applicable in fields that require high strength, elastic modulus, and impact resistance, for example, to aircraft members.

<Method for Producing Molding Material>

In the second preferred embodiment, the molding material of the present invention comprises a reinforcing fiber bundle (A), a poly (phenylene ether ether ketone) (B'), a thermoplastic resin (C), and a polymerization catalyst (D), and the molding material is preferably produced via the steps [i] to [iii] below because the configurations mentioned above can be easily formed.

Step [i]: Producing a mixture of a poly (phenylene ether ether ketone) oligomer (B) and a polymerization catalyst (D).

Step [ii]: Forming a composite of the mixture and a continuous reinforcing fiber bundle (A) impregnated therewith.

Step [iii]: Adhering the composite to a thermoplastic resin (C).

<Step [i]>

In the step [i], an apparatus for producing a mixture may be any apparatus that is equipped with a mechanism for mixing the poly (phenylene ether ether ketone) oligomer (B) and the polymerization catalyst (D) loaded, but the apparatus is preferably equipped with a heating source for heat-melting the poly (phenylene ether ether ketone) oligomer (B) in order to uniformly mix the poly (phenylene ether ether ketone) oligomer (B) and the polymerization catalyst (D). Further, to quickly proceed to the step [ii] after producing a molten mixture, the apparatus is preferably equipped with a delivery mechanism. Examples of drive systems for delivery include gravity-feed system, pressure-feed system, screw system, and pump system.

In the step [i], when producing a molten mixture, it is preferable to set the temperature and time such that thermal polymerization of the poly (phenylene ether ether ketone) oligomer (B) occurs as little as possible. The temperature for producing a molten mixture is 160 to 340° C., preferably 180 to 320° C., more preferably 200 to 300° C., and particularly preferably 230 to 270° C. When a molten mixture is produced in this preferred temperature range, the poly (phenylene ether ether ketone) oligomer (B) can be melted in a short time, and at the same time, viscosity increase due to formation of poly (phenylene ether ether ketone)s (B') is unlikely to occur because thermal polymerization of the poly (phenylene ether ether ketone) oligomer (B) can be reduced.

In the step [i], the time for producing a molten mixture is not critical, but to avoid thickening due to the progress of polymerization of the poly (phenylene ether ether ketone) oligomer (B), it is preferable to proceed to the step [ii] as quickly as possible after heating the poly (phenylene ether ether ketone) oligomer (B) and the polymerization catalyst (D). The time is in the range of 0.01 to 300 minutes, preferably 0.1 to 60 minutes, more preferably 0.3 to 30 minutes, and still more preferably 0.5 to 10 minutes. When the heating time is in this preferred range, dispersion of the polymerization catalyst (D) in the poly (phenylene ether ether ketone) oligomer (B) is sufficient, and at the same time, thermal polymerization of the poly (phenylene ether ether ketone) oligomer (B) can be reduced.

The heating is preferably performed in a non-oxidizing atmosphere or under reduced-pressure conditions. Here, "non-oxidizing atmosphere" refers to an atmosphere of inert gas such as nitrogen, helium, and argon. "Under reduced-pressure conditions" means that the pressure in the system is lower than atmospheric pressure, and, for example, the range of 0.1 kPa to 50 kPa is a preferred range. Such conditions tend to inhibit the occurrence of undesirable side reactions such as cross-linking reaction and decomposition reaction, for example, between the poly (phenylene ether ether ketone) oligomers (B), between the poly (phenylene ether ether ketone)s (B') formed by heating, and between the poly (phenylene ether ether ketone) (B') and the poly (phenylene ether ether ketone) oligomer (B).

<Step [ii]>

In the step [ii], any apparatus may be used which is equipped with a mechanism for impregnating the mixture obtained in the step [i] into a continuous reinforcing fiber bundle (A), and examples thereof include an apparatus for feeding a molten mixture to a mold die such as a T-die or a slit die while passing a reinforcing fiber bundle through the mold die, an apparatus for feeding a molten mixture to a molten bath with a gear pump and passing a reinforcing fiber bundle (A) with drawing through the molten bath, an apparatus for feeding a molten mixture to a kiss coater with a plunger pump to apply to a reinforcing fiber bundle (A), and the method of feeding a molten mixture onto a heated rotating roll and passing a reinforcing fiber bundle (A) over the roll surface. These apparatuses may be used in combination in order to improve impregnation properties, and the composite obtained may be passed through the same apparatus more than once in loops.

In the step [ii], the temperature during impregnation of a melt-kneaded product is 160 to 450° C., preferably 200 to 400° C., more preferably 230 to 350° C., and particularly preferably 270 to 300° C. When the temperature during impregnation of a melt-kneaded product in this preferred range, the poly (phenylene ether ether ketone) oligomer (B) is not readily coagulated, thickened, or solidified, providing excellent impregnation properties, and at the same time, undesirable side reactions such as cross-linking reaction and decomposition reaction are unlikely to occur, for example, between the poly (phenylene ether ether ketone) oligomers (B), between the poly (phenylene ether ether ketone)s (B') formed by heating, and between the poly (phenylene ether ether ketone) oligomer (B) and the poly (phenylene ether ether ketone) (B').

In the step [ii], the time for impregnation of a melt-kneaded product is not critical, but it is preferable to secure the time enough for the melt-kneaded product to sufficiently impregnate into a reinforcing fiber bundle (A). The time is in the range of 0.001 to 1,000 minutes, preferably 0.01 to 300 minutes, more preferably 0.1 to 60 minutes, still more preferably 0.3 to 30 minutes, and particularly preferably 0.5 to 10 minutes. When the impregnation time is in this preferred range, impregnation of a melt-kneaded product into a reinforcing fiber bundle (A) is sufficient, and at the same time, the molding material can be produced efficiently.

<Step [iii]>

In the step [iii], any apparatus may be used which is equipped with a mechanism for adhering a thermoplastic resin (C) to the composite obtained in the step [ii], and examples thereof include an apparatus for feeding a molten thermoplastic resin (C) to a mold die such as a T-die or a slit die while passing the composite through the mold die, an apparatus for feeding a molten thermoplastic resin (C) to a molten bath with a gear pump and passing the composite through the molten bath, an apparatus for feeding a molten thermoplastic resin (C) to a kiss coater with a plunger pump to apply to the composite, and the method of feeding a molten thermoplastic resin (C) onto a heated rotating roll and passing the composite over the roll surface.

In the step [iii], the temperature for adhering the composite to a thermoplastic resin (C) cannot be generalized because it varies depending on the properties of the thermoplastic resin (C) used, such as molecular structure, molecular weight, and composition, but the lower limit is, for example, the melting point of the thermoplastic resin (C) used. The upper limit is, for example, the melting point described above, further, 80° C., preferably 50° C., more preferably 30° C., and still more preferably 20° C. In such a temperature range, the thermoplastic resin (C) can be easily adhered to the composite, and phenomena that are undesirable for production can be prevented, such as thermal decomposition of the thermoplastic resin (C). The melting point of the thermoplastic resin (C) can be measured by observing an endothermic peak temperature using a differential scanning calorimeter.

In the step [iii], the time over which the composite passes through an apparatus for adhering the composite to a thermoplastic resin is not critical, but it is, for example, 0.0001 to 120 minutes, preferably 0.001 to 60 minutes, and more preferably 0.01 to 10 minutes. When the time over which the composite passes through the adhesion apparatus is in this preferred range, the composite easily adheres to a thermoplastic resin, and at the same time, the molding material can be produced efficiently.

In the production process of the molding material of the present invention, conversion of a poly (phenylene ether ether ketone) oligomer (B) into a poly (phenylene ether ether ketone) (B') may be carried out in any of the steps [i] to [iii], but to efficiently carry out the impregnation of the poly (phenylene ether ether ketone) oligomer (B) into a reinforcing fiber bundle (A), it is preferable to selectively polymerize the poly (phenylene ether ether ketone) oligomer (B) simultaneously with and after the step [ii]. Also to satisfy such requirements, the above-described conditions such as apparatus, temperature, and time in the steps [i] to [iii] are preferred.

Further, it is also significant to further perform a heat treatment at 160 to 450° C., preferably 200 to 400° C., more preferably 230 to 350° C., and particularly preferably at 270 to 300° C. after the steps [i] to [iii] to thermally polymerize the poly (phenylene ether ether ketone) oligomer (B) remaining in the molding material. When the heat treatment is carried out at a temperature lower than 160° C., the polymerization of the poly (phenylene ether ether ketone) oligomer (B) does not proceed well and a long time may be required. When the heat treatment is carried out at a temperature higher than 450° C., the thermoplastic resin (C) can melt in a short time, which results in loss of configuration of the molding material.

<Method for Producing Molded Article>

In the first preferred embodiment, the molding material of the present invention comprises a reinforcing fiber bundle (A), a poly (phenylene ether ether ketone) oligomer (B), and a thermoplastic resin (C). Since the poly (phenylene ether ether ketone) oligomer (B) has a low melting point, it has excellent processability in impregnation into the reinforcing fiber bundle (A), and a composite of the reinforcing fiber bundle (A) and the poly (phenylene ether ether ketone) oligomer (B) can be easily produced, which is effective in improving the productivity of the molding material. Further, since the poly (phenylene ether ether ketone) oligomer (B) also has excellent fluidity, when the molding material of the present invention is injection molded, for example, the poly (phenylene ether ether ketone) oligomer (B) having excellent fluidity melt-kneaded in a cylinder of an injection molding machine spreads into the thermoplastic resin (C), which helps the reinforcing fiber bundle (A) disperse into the thermoplastic resin (C). Further, the poly (phenylene ether ether ketone) oligomer (B) is readily replaced with the thermoplastic resin (C), which allows the reinforcing fiber bundle (A) to be more readily dispersed. In view of such an effect, the poly (phenylene ether ether ketone) oligomer (B) acts as a so-called impregnation aid/dispersion aid.

Further, in the present invention, the polymerization catalyst (D) serves as a so-called polymerization catalyst which promotes thermal conversion of the poly (phenylene ether ether ketone) oligomer (B) into a poly (phenylene ether ether ketone) (B'). In producing a molded article by molding the molding material of the present invention comprising a reinforcing fiber bundle (A), a poly (phenylene ether ether ketone) oligomer (B), a thermoplastic resin (C), and a polymerization catalyst (D), the poly (phenylene ether ether ketone) oligomer (B) can be thermally polymerized in the presence of the polymerization catalyst (D) to convert into a poly (phenylene ether ether ketone) (B'). Due to such an effect of the polymerization catalyst (D), for example, when the molding material of the present invention comprising the polymerization catalyst (D) is injection molded, polymerization of the poly (phenylene ether ether ketone) oligomer (B) into a poly (phenylene ether ether ketone) (B') proceeds in a cylinder and a mold in an injection molding process, and a molded article having excellent dynamic properties can be obtained.

The molding material of the present invention can be formed into a predetermined shape by melting by heat. The temperature for melting the molding material varies depending on the raw materials selected, but it is preferably in the range of 160° C. to 450° C., more preferably 230° C. to 430° C., and still more preferably 270° C. to 400° C., for example. When the temperature is lower than 160° C., the poly (phenylene ether ether ketone) oligomer (B) or poly (phenylene ether ether ketone) (B') and/or the thermoplastic resin (C) may not melt, causing a problem in moldability. When the temperature is higher than 450° C., the thermoplastic resin (C) may undergo thermal decomposition, leading to reduction in physical properties of a molded article or causing voids.

The molding material of the present invention can be preheated before molding. The temperature for preheating the molding material varies depending on the raw materials selected, but it is, for example, 160° C. to 450° C., more preferably 230° C. to 400° C., and still more preferably 270° C. to 400° C. When the preheating is performed in such a temperature range, thermal polymerization of the poly (phenylene ether ether ketone) oligomer (B) into a poly (phenylene ether ether ketone) (B') proceeds, which can be effective in improving the dynamic properties of a molded article. From the standpoint of productivity, the molding material subjected to such a preheating process may be loaded directly into a molding machine.

The molding material of the present invention may be subjected to a pretreatment in addition to the preheating process as long as the object of the present invention is achieved. Examples of pretreatments include drying, degreasing, degassing, cutting, shaping, lamination, arrangement, and adhesion.

The molding material of the present invention can be processed into a molded article of final shape by various molding methods. Examples of the molding method include press molding, stampable molding, transfer molding, injection molding, and combinations thereof.

The molding material of the present invention can be formed into various shapes: e.g., molded articles of complex shape, such as rib, boss, and gear; and molded articles with a broad width, such as flat plate, square plate, and round plate. In the case of molded articles of complex shape, injection molding and transfer molding are preferably used, and injection molding is more preferably used in terms of productivity. In the case of molded articles with a broad width, press molding and stamping molding are preferably used.

When the molding material of the present invention is used for injection molding, it is preferable to use the molding material in the form of pellets. In injection molding, temperature, pressure, and kneading are applied when the pelleted molding material is plasticized; therefore, according to the present invention, the poly (phenylene ether ether ketone) oligomer (B) or poly (phenylene ether ether ketone) (B') exerts a significant effect as an impregnation/dispersion aid. In this case, a conventional in-line screw injection molding machine can be used. Even if the kneading effect of a screw is small because, for example, a screw having a shape that provides a low compression ratio is used or the back pressure during plasticization of the material is set low, reinforcing fibers are satisfactorily dispersed in a matrix resin, and a molded article in which fibers are satisfactorily impregnated with resin can be obtained.

Further, a molded article obtained by molding the molding material of the present invention can be heat treated. The temperature at which the molded article is heated varies depending on the raw materials used for the molding material, but it is, for example, 160° C. to 450° C., more preferably 230° C. to 430° C., and still more preferably 270° C. to 400° C. When the heat treatment is performed in such a temperature range, thermal polymerization of the poly (phenylene ether ether ketone) oligomer (B) into a poly (phenylene ether ether ketone) (B') proceeds, which can be effective in improving the dynamic properties of the molded article.

The molded article obtained by the present invention may be subjected to a post-treatment in addition to the heating process as long as the object of the present invention is achieved. Examples of post-treatments include annealing, polishing, cutting, grinding, adhesion, and painting.

<Prepreg>

In a third preferred embodiment, the molding material of the present invention comprises a reinforcing fiber substrate (A'), a poly (phenylene ether ether ketone) oligomer (B), and a polymerization catalyst (D). The form of the molding material of the present invention is not critical, but from the standpoint of productivity and handleability, for example, the form of a prepreg obtained by impregnating a substrate comprising the reinforcing fiber substrate (A') with the poly (phenylene ether ether ketone) oligomer (B) and the polymerization catalyst (D) is preferred.

The content of the reinforcing fiber substrate (A') is preferably 30 wt % or more, more preferably 50 wt % or more, still more preferably 60 wt % or more, and particularly preferably 70 wt % or more, based on 100 wt % of the total of the reinforcing fiber substrate (A') and the poly (phenylene ether ether ketone) oligomer (B). When the content of the reinforcing fiber substrate (A') is less than 30 wt %, the resulting molded article may have poor dynamic properties. The upper limit of the content of the reinforcing fiber substrate (A') is not limited, but it is preferably not more than 90 wt %, more preferably not more than 80 wt %, and still more preferably not more than 70 wt %. When the content of the reinforcing fiber substrate (A') is more than 90 wt %, it can be difficult to impregnate the poly (phenylene ether ether ketone) oligomer (B) into the reinforcing fiber substrate (A'). The content of the reinforcing fiber substrate (A') in the molding material of the present invention can be adjusted by controlling the supply of the reinforcing fiber substrate (A') and the poly (phenylene ether ether ketone) oligomer (B).

Further, the content of the polymerization catalyst (D) is 0.001 to 20 mol %, preferably 0.005 to 15 mol %, and more preferably 0.01 to 10 mol %, based on 1 mol of the repeating unit represented by the following formula, which is a main structural unit of the poly (phenylene ether ether ketone) oligomer (B).

[Chemical formula 6]

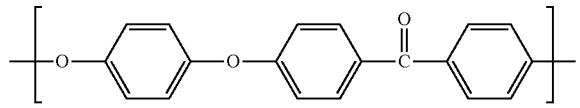

Further, for the molding material of the present invention, molding materials having different impregnation rates of the poly (phenylene ether ether ketone) oligomer (B) can be produced depending on the application and purpose. Examples thereof include a prepreg with higher impregnation properties, a semi-impregnated semipreg, and a fabric with low impregnation properties. In general, a molding material with higher impregnation properties tends to provide a molded article having excellent dynamic properties by molding in a shorter time. In contrast, a molding material with relatively low impregnation properties tends to be excellent in drape property and shaping into, for example, a curved shape.

Thus, in the molding material of the present invention, a first preferred aspect of the impregnation rate of the poly (phenylene ether ether ketone) oligomer (B) is a molding material having an impregnation rate of 80% to 100%. This is advantageous in terms of production of a molded article of simpler planar shape with high productivity.

Further, in the molding material of the present invention, a second preferred aspect of the impregnation rate of the poly (phenylene ether ether ketone) oligomer (B) is a molding material having an impregnation rate of 20% to less than 80%. This is a molding material having excellent drape property, and the molding material can be shaped in advance to a mold, which is advantageous in terms of production of a molded article of relatively complex shape such as curved shape with high productivity.

"Impregnation rate of the poly (phenylene ether ether ketone) oligomer (B)" as used herein is expressed as a percentage (%) obtained by observing a cross-section of the molding material using a light microscope and dividing the area of impregnation of the poly (phenylene ether ether ketone) oligomer (B) by the total of the area of impregnation and the area of voids.

Examples of means for controlling the impregnation rate include temperature and pressure in combining the poly (phenylene ether ether ketone) oligomer (B) with the reinforcing fiber substrate (A'). In general, the higher the temperature and the pressure are, the greater the effect of increasing the impregnation rate is. The lower the melt viscosity of the poly (phenylene ether ether ketone) oligomer (B) is, the more the impregnation properties can be enhanced.

To the poly (phenylene ether ether ketone) oligomer (B) in the third preferred embodiment of the molding material of the present invention, polymers or oligomers of various thermoplastic resins, various thermosetting resins, impact-resistance improvers such as elastomers or rubber components, inorganic fillers, flame retardants, conductivity-imparting agents, crystal nucleating agents, UV absorbers, antioxidants, vibration dampers, antimicrobial agents, insect repellents, deodorizers, stain inhibitors, heat stabilizers, mold releasing agents, antistatic agents, plasticizers, lubricants, coloring agents, pigments, dyes, foaming agents, foam suppressors, coupling agents, or the like may be added as long as the object of the present invention is achieved.

Specific examples of thermoplastic resins include polyester resins such as polyethylene terephthalate (PET) resin, polybutylene terephthalate (PBT) resin, polytrimethylene terephthalate (PTT) resin, polyethylene naphthalate (PENp) resin, and liquid crystal polyester; polyolefin resins such as polyethylene (PE) resin, polypropylene (PP) resin, and polybutylene resin; styrene resins; urethane resins; further, polyoxymethylene (POM) resin, polyamide (PA) resin, polycarbonate (PC) resin, polymethyl methacrylate (PMMA) resin, polyvinyl chloride (PVC) resin, polyphenylene sulfide (PPS) resin, polyphenylene ether (PPE) resin, modified PPE resin, polyimide (PI) resin, polyamide-imide (PAI) resin, polyetherimide (PEI) resin, polysulfone (PSU) resin, modified PSU resin, polyethersulfone (PES) resin, polyketone (PK) resin, polyether ketone (PEK) resin, polyether ether ketone (PEEK) resin, polyether ketone ketone (PEKK) resin, polyarylate (PAR) resin, polyether nitrile (PEN) resin, phenol resin, phenoxy resin, fluorine resins such as polytetrafluoroethylene; and copolymers, modifications, and resin blends of two or more thereof.

Specific examples thermosetting resins include unsaturated polyester resins, vinyl ester resins, epoxy resins, and phenol resins.

To facilitate the lamination of the molding material, it is also preferable to add a tackifier. As a tackifier, a compound with a softening temperature of 150° C. or lower having a polar group in its molecule is suitably used. "Softening temperature" refers to a Vicat softening temperature defined in JIS K 7206-1999. Compounds with a softening temperature of 150° C. or lower are preferred because they have a relatively small molecular weight and good fluidity to improve the stickiness in lamination of the molding material; and compounds having a polar group in their molecules are also preferred because they induce weak bonding such as hydrogen bonding to improve the stickiness in lamination of the molding material. Specifically, ethylene-ethyl acrylate copolymer, ethylene-vinyl acrylate copolymer, terpene polymer, terpene phenol copolymer, polyurethane elastomer, acrylonitrile-butadiene rubber (NBR), and the like are suitably used.

<Method for Producing Prepreg>

The molding material of the present invention in the third preferred embodiment can be produced, for example, by the wet method in which a poly (phenylene ether ether ketone) oligomer (B) and a polymerization catalyst (D) are dissolved or dispersed in a solvent to reduce the viscosity and impregnated into a reinforcing fiber substrate (A'), or the hot-melt method in which a mixture of a poly (phenylene ether ether ketone) oligomer (B) and a polymerization catalyst (D) is heated to reduce the viscosity and impregnated into a reinforcing fiber substrate (A').

The wet method is a method for obtaining a molding material comprising immersing a reinforcing fiber substrate (A') in a solution or dispersion of a poly (phenylene ether ether ketone) oligomer (B) and a polymerization catalyst (D), pulling it up, and evaporating the solvent using an oven or the like.

The hot-melt method is a method for obtaining a molding material, for example, by applying a molten mixture of a poly (phenylene ether ether ketone) oligomer (B) and a polymerization catalyst (D), the viscosity of which mixture is reduced by heating, directly to a reinforcing fiber substrate (A') and performing hot-pressing for impregnation, or by coating release paper or the like with a molten mixture of a poly (phenylene ether ether ketone) oligomer (B) and a polymerization catalyst (D) to prepare a resin film, laminating the film(s) on both sides or one side of a reinforcing fiber substrate (A'), and performing hot-pressing for impregnation. The hot-melt method does not use a solvent; therefore, resin viscosity needs to be reduced to some extent in the process of impregnation into a reinforcing fiber substrate (A'), but that is preferred because substantially no solvent remains in the molding material.

When the molding material of the present invention is produced by the hot-melt method, in the step of producing a molten mixture of a poly (phenylene ether ether ketone) oligomer (B) and a polymerization catalyst (D) and the step of impregnating the molten mixture into a reinforcing fibers (A), it is preferable to set the temperature and time such that thermal polymerization of the poly (phenylene ether ether ketone) oligomer (B) occurs as little as possible. The temperature in the step of producing a molten mixture and the step of impregnating the molten mixture is 160 to 340° C., preferably 180 to 320° C., more preferably 200 to 300° C., and particularly preferably 230 to 270° C. When the temperature is in this preferred range, the poly (phenylene ether ether ketone) oligomer (B) can be melted in a short time, and at the same time, viscosity increase due to formation of poly (phenylene ether ether ketone)s (B') is unlikely to occur.

The time spent on the step of producing a molten mixture and the step of impregnating the molten mixture is not critical, but to avoid thickening due to the progress of polymerization of the poly (phenylene ether ether ketone) oligomer (B), it is preferable to proceed to the next step as quickly as possible after heating the poly (phenylene ether ether ketone) oligomer (B) and the polymerization catalyst (D). The time is in the range of 0.01 to 300 minutes, preferably 0.1 to 60 minutes, more preferably 0.3 to 30 minutes, and still more preferably 0.5 to 10 minutes. When the heating time in this preferred range, dispersion of the polymerization catalyst (D) in the poly (phenylene ether ether ketone) oligomer (B) is sufficient, and at the same time, viscosity increase due to formation of poly (phenylene ether ether ketone)s (B') is unlikely to occur.

The heating is preferably performed in a non-oxidizing atmosphere or under reduced-pressure conditions. Here, "non-oxidizing atmosphere" refers to an atmosphere of inert gas such as nitrogen, helium, and argon. "Under reduced-pressure conditions" means that the pressure in the system is lower than atmospheric pressure, and, for example, the range of 0.1 kPa to 50 kPa is a preferred range. Such conditions tend to inhibit the occurrence of undesirable side reactions such as cross-linking reaction and decomposition reaction, for example, between the poly (phenylene ether ether ketone) oligomers (B), between the poly (phenylene ether ether ketone)s (B') formed by heating, and between the poly (phenylene ether ether ketone) (B') and the poly (phenylene ether ether ketone) oligomer (B).

In the molding material of the present invention, to obtain a molding material that has a high impregnation rate of the poly (phenylene ether ether ketone) oligomer (B) and provides a molded article with high dynamic properties, it is preferable to apply pressure in the step of impregnating a molten mixture. Such pressure is preferably in the range of 0.1 to 10 MPa, and more preferably in the range of 0.2 to 5 MPa, for example.

In the molding material of the present invention, to obtain a molding material having a relatively reduced impregnation rate of the poly (phenylene ether ether ketone) oligomer (B) and excellent moldability, it is preferable to apply almost no pressure in the step of impregnating a molten mixture. Such pressure is preferably in the range of 0 to 0.1 MPa, and more preferably in the range of 0.01 to 0.05 MPa, for example. Alternatively, it is also preferable to use the method comprising once applying pressure and then removing the pressure before the poly (phenylene ether ether ketone) oligomer (B) is cooled and solidified. Examples of the pressure device used to apply pressure include, but are not limited to, pressing machines and rollers.

<Method for Molding Prepreg>

In the third preferred embodiment of the molding material of the present invention, at least one layer of the molding material is laminated in any configuration, and then the poly (phenylene ether ether ketone) oligomer (B) is polymerized while applying heat and pressure to obtain a molded article comprising a poly (phenylene ether ether ketone) (B') as a matrix resin.

Examples of methods of applying heat and pressure that can be used include the press molding method in which the molding material laminated in any configuration is placed in a mold or on a pressing plate, and then the mold or the pressing plate is closed and pressurized; the autoclave molding method in which the molding material laminated in any configuration is charged into an autoclave, and pressurized and heated; the bag-molding method in which the molding material laminated in any configuration is wrapped with a film or the like and, with the internal pressure reduced, heated in an oven while being pressurized at atmospheric pressure; the wrapping tape method in which the molding material laminated in any configuration is wrapped with tape under tension and heated in an oven; and the internal pressure molding method in which the molding material laminated in any configuration is placed in a mold, and a core that is also placed in the mold is charged with gas or liquid and pressurized. In particular, molding methods in which pressing is performed using a mold are preferred because a molded article with low void and excellent appearance quality can be obtained.

The lower limit of the heating temperature during molding is, for example, not lower than 160° C., preferably not lower than 200° C., more preferably not lower than 230° C., and still more preferably not lower than 270° C. In this temperature range, it is likely that the poly (phenylene ether ether ketone) oligomer (B) will melt and a poly (phenylene ether ether ketone) (B') can be obtained in a short time.

The upper limit of the heating temperature during molding is, for example, not higher than 450° C., preferably not higher than 400° C., more preferably not higher than 350° C., and still more preferably not higher than 300° C. When the heating temperature is not higher than this temperature range, it is likely that adverse effects of undesirable side reactions on the properties of the poly (phenylene ether ether ketone) (B') can be prevented.

Further, the molding material of the present invention is preferably molded at a temperature not higher than the melting point of the poly (phenylene ether ether ketone) (B'). This is a molding method taking advantages of crystallization polymerization of the poly (phenylene ether ether ketone) oligomer (B) in the present invention, which molding method is excellent in that thermal polymerization of the poly (phenylene ether ether ketone) oligomer (B) and crystallization of the poly (phenylene ether ether ketone) (B') proceed simultaneously during molding, whereby demolding of a molded article can be carried out with a mold-cooling process shortened, which process is necessary in molding of an ordinary thermoplastic resin prepreg.

Examples of the method here for measuring the heating temperature during molding include, in the case of a molding method in which molding is performed using a mold, measuring the surface temperature of the mold using a thermometer such as a thermocouple.

The pressure during molding is preferably in the range of 0.1 to 10 MPa, and more preferably in the range of 0.2 to 5 MPa, for example. When the pressure during molding is in this preferred range, voids will not occur in a large amount in the resulting molded article, and at the same time, the arrangement of the reinforcing fibers (A) will not be greatly disarranged.

The time for performing hot-pressing during molding is not critical, but it is in the range of 0.001 to 1,000 minutes, preferably 0.01 to 300 minutes, more preferably 0.1 to 60 minutes, still more preferably 0.3 to 30 minutes, and particularly preferably 0.5 to 10 minutes. When the impregnation time is in this preferred range, polymerization of the poly (phenylene ether ether ketone) oligomer (B) into a poly (phenylene ether ether ketone) (B') sufficiently occurs, and at the same time, the molding material can be produced efficiently.

<Method for Producing Molding Material>

In a fourth preferred embodiment, the molding material of the present invention comprises a reinforcing fiber substrate (A'), a poly (phenylene ether ether ketone) (B'), and a polymerization catalyst (D). The method for producing this molding material comprises at least the following steps.

Step [I]: Drawing and continuously feeding a reinforcing fiber substrate (A').

Step [II]: Combining the reinforcing fiber substrate (A') with a poly (phenylene ether ether ketone) oligomer (B) to form a composite.

Step [III]: Polymerizing the poly (phenylene ether ether ketone) oligomer (B) into a poly (phenylene ether ether ketone) (B').

Step [IV]: Cooling and taking up the composite of the reinforcing fiber substrate (A') and the poly (phenylene ether ether ketone) (B').

Further, the method for producing a molding material of the present invention is characterized in that the poly (phenylene ether ether ketone) oligomer (B) used in the step [II] has a melting point of not higher than 270° C.

From the standpoint of productivity, in the step [II] of the method for producing a molding material of the present invention, it is preferable to add a polymerization catalyst (D) to the poly (phenylene ether ether ketone) oligomer (B) to promote the polymerization of the poly (phenylene ether ether ketone) oligomer (B) into a poly (phenylene ether ether ketone) (B').

Although each step can be performed off-line, it is preferable to perform the steps [I] to [IV] on-line in terms of economic efficiency and productivity.

"Performing the steps [I] to [IV] on-line" means that all the steps [I] to [IV] are carried out successively or intermittently in a continuous production line (see, for example, FIGS. 13 to 15).

Description will be given for each step.

<Step [I]>

The step [I] is a step of feeding a reinforcing fiber substrate (A') to a production line. To produce a molding material with high economic efficiency and productivity, the reinforcing fiber substrate (A') is preferably fed continuously. "Continuous" means that the reinforcing fiber substrate (A') which is a raw material is fed unceasingly without a complete break. The feed rate may be constant, or feeding and cessation may be repeated intermittently. Further, to improve the shapability of the resulting molding material, the step [I] may comprise cutting a part of the reinforcing fiber substrate (A') to provide a slit.

The step [I] is also intended to draw the reinforcing fiber substrate (A') and dispose it in a given arrangement. Namely, the reinforcing fiber substrate (A') to be fed may be in the form of a yarn, unidirectionally align sheet, or preform which is preliminarily shaped. Specifically, for example, a plurality of reinforcing fiber bundles is unidirectionally arranged in the form of a sheet, further passed through a roll bar, and fed to the production line; alternatively, a reinforcing fiber substrate (A') preliminarily rolled up in the form a fabric, nonwoven fabric, or mat is mounted on a creel, drawn, passed through a roller, and fed to the production line. Methods using a roll are preferably used because a large amount of molding material can be produced at a time. Alternatively, for example, the reinforcing fiber substrate (A') is passed through a plurality of roll bars arranged so as to form a given shape and fed to the production line. Further, when the reinforcing fiber substrate (A') is processed in a planar form, it may be fed directly to the production line from, for example, a twisted and wound state. Further, providing rollers or roll bars with a drive allows, for example, adjustment of feed rate, which is more preferred in terms of production control.

Further, in terms of productivity, the step [I] preferably comprises heating the reinforcing fiber substrate (A') at 50 to 500° C., preferably 80 to 400° C., and more preferably 100 to 300° C. Heating the reinforcing fiber substrate (A') improves fixation of a poly (phenylene ether ether ketone) oligomer (B) to the reinforcing fiber substrate (A') in the step [II]. Also, a sizing agent or the like applied to the reinforcing fiber substrate (A') can be softened for opening. Examples of the heating method include, but are not limited to, noncontact heating with hot air or an infrared heater and contact heating with a pipe heater or by electromagnetic induction.

Further, the step [I] more preferably comprises opening operation, for example, when the reinforcing fiber substrate (A') is a unidirectionally arranged substrate. "Opening" refers to an operation for separating a bundled reinforcing fiber bundle, which can further enhance the impregnation properties of the poly (phenylene ether ether ketone) oligomer (B). The opening reduces the thickness of the reinforcing fiber substrate (A'), and the opening ratio $(w_2/t_2)/(w_1/t_1)$ is preferably 2.0 or more, and more preferably 2.5 or more, wherein $w_1$ is the width (mm) and $t_1$ is the thickness (μm) of a reinforcing fiber bundle before opening, and $w_2$ is the width (mm) and $t_2$ is the thickness (μm) of the reinforcing fiber bundle after opening.

Examples of the method for opening the reinforcing fiber substrate (A') that can be used include, but are not limited to, passing the reinforcing fiber substrate (A') alternately through a concave roll and a convex roll, using a drum-type roll, applying tension fluctuation to an axial oscillation, fluctuating the tension of the reinforcing fiber substrate (A') using two friction bodies that vertically reciprocate, and blowing air to the reinforcing fiber substrate (A').

<Step [II]>

The step [II] is a step of combining the reinforcing fiber substrate (A') with a poly (phenylene ether ether ketone) oligomer (B). The method for combination is not particularly limited, and in accordance with the form of the poly (phenylene ether ether ketone) oligomer (B), the following three methods [C1] to [C3] are preferred, for example.

[C1] A method for combination by applying a poly (phenylene ether ether ketone) oligomer (B) in at least one form selected from the group consisting of particles, fibers, and flakes to a reinforcing fiber substrate (A'). When combination is performed by this method, the poly (phenylene ether ether ketone) oligomer (B) is preferably dispersed in a gas phase or liquid phase.

The method using a poly (phenylene ether ether ketone) oligomer (B) dispersed in a gas phase is, in other words, a method in which a poly (phenylene ether ether ketone) oligomer (B) in at least one form selected from the group consisting of particles, fibers, and flakes is scattered into a gas phase, and a reinforcing fiber substrate (A') is passed through the gas phase. Specific examples thereof include passing a reinforcing fiber substrate (A') through a poly (phenylene ether ether ketone) oligomer (B) scattered, for example, in a fluidized bed, scattering a poly (phenylene ether ether ketone) oligomer (B) directly on a reinforcing fiber substrate (A'), and charging a poly (phenylene ether ether ketone) oligomer (B) to electrostatically attach to a reinforcing fiber substrate (A').

The method using a poly (phenylene ether ether ketone) oligomer (B) dispersed in a liquid phase is, in other words, a method in which a poly (phenylene ether ether ketone) oligomer (B) in at least one form selected from the group consisting of particles, fibers, and flakes is dispersed or dissolved in a liquid phase, and a reinforcing fiber substrate (A') is passed through the liquid phase. "Dispersed (dispersing)" means that the poly (phenylene ether ether ketone) oligomer (B) will not form a macroaggregate of 1 mm or larger via reaggregation and maintains its size in a preferred range in each form mentioned below. Examples of such methods for dispersing or dissolving a poly (phenylene ether ether ketone) oligomer (B) in a liquid phase include, but are not limited to, a method using a stirring apparatus, a method using a vibratory apparatus, a method using an ultrasonic generator, and a method using a jet apparatus. To maintain the dispersed state or dissolved state, it is more preferable to use these methods also in the liquid phase through which the reinforcing fiber substrate (A') is passed.

Examples of the liquid phase used here include water and organic solvents, and using pure water or industrial water is more preferred from the standpoint of economic efficiency and productivity. To aid dispersion of the poly (phenylene ether ether ketone) oligomer (B), various surfactants such as anionic, cationic, and nonionic surfactants may be used in combination. The amount of surfactant used is not critical, but it is preferably in the range of 0.01 to 5 wt %, for example.

In the method for combination using a liquid phase, a particularly preferred form of the poly (phenylene ether ether ketone) oligomer (B) is an emulsion or dispersion. In this case, from the standpoint of dispersibility, the average particle size is preferably 0.01 to 100 µm, more preferably 0.05 to 50 µm, and still more preferably 0.1 to 20 µm.

When the poly (phenylene ether ether ketone) oligomer (B) is particulate, the average particle size is preferably 50 to 300 µm, more preferably 80 to 250 µm, and still more preferably 100 to 200 µm from the standpoint of processability and handleability of particles. When the poly (phenylene ether ether ketone) oligomer (B) is fibrous, the average fiber diameter is preferably 0.5 to 50 µm, more preferably 1 to 30 µm, and still more preferably 5 to 20 µm for the same reason. The average fiber length is not critical, but it is preferably in the range of 1 to 10 mm, for example. When the poly (phenylene ether ether ketone) oligomer (B) is flaky, it preferably has the same thickness as in the case of particles and a length 5 to 100 times the thickness.

The average particle size can be measured using, for example, a laser diffraction/scattering-type particle size distribution analyzer. The average fiber diameter, the average fiber length, and the thickness and length of flakes can be measured using a light microscope. When measuring the average fiber diameter, the average fiber length, and the thickness and length of flakes using a light microscope, the average value of the measurements at randomly selected 400 points observed at 20 to 100× magnification may be used.

When an organic solvent is used as a liquid phase, any solvent may be used as long as it does not substantially cause undesirable side reactions such as inhibition of polymerization due to heating of the poly (phenylene ether ether ketone) oligomer (B) and decomposition or crosslinking of the poly (phenylene ether ether ketone) (B') formed. Examples thereof include N-methyl-2-pyrrolidone, dimethylformamide, dimethyl sulfoxide, acetone, methyl ethyl ketone, diethyl ketone, dimethyl ether, dipropyl ether, tetrahydrofuran, chloroform, methylene chloride, trichloroethylene, ethylene dichloride, dichloroethane, tetrachloroethane, chlorobenzene, methanol, ethanol, propanol, butanol, pentanol, ethylene glycol, propylene glycol, phenol, cresol, polyethylene glycol, benzene, toluene, and xylenes. Inorganic compounds such as carbon dioxide, nitrogen, and water can also be used as a solvent in the form of supercritical fluid. These solvents can be used alone or in combination of two or more thereof Examples of specific methods include feeding an emulsion or dispersion of a poly (phenylene ether ether ketone) oligomer (B) into a water tank and passing a reinforcing fiber substrate (A') through the water tank, further passing the reinforcing fiber substrate (A') through the water tank with the use of a jet flow, and spraying an emulsion or dispersion of a poly (phenylene ether ether ketone) oligomer (B) directly on a reinforcing fiber substrate (A').

Further, in the method for combination using a liquid phase, the water or organic solvent used is more preferably removed (deliquored) after the passage through the reinforcing fiber substrate (A') in terms of productivity. Examples of the removal method include air blowing, hot air drying, and suction filtration. In such a case, the rate of deliquoring the water or organic solvent from the composite is not critical, but it is preferably 50 to 100%, more preferably 70 to 100%, and still more preferably 90 to 100%. Further, the liquid phase after deliquoring is particularly preferably recovered, circulated, and reused in terms of productivity and environment. The deliquoring rate can be readily determined from the difference in composite mass before and after deliquoring operation.

[C2] A method for combination by applying a poly (phenylene ether ether ketone) oligomer (B) in at least one form selected from the group consisting of a film, a sheet, and a nonwoven fabric to a reinforcing fiber substrate (A'). "Film" as used herein refers to a poly (phenylene ether ether ketone) oligomer (B) having an average thickness of not more than 200 µm, and "sheet" refers to one having an average thickness of more than 200 µm. "Nonwoven fabric" refers to one in the form of a fiber sheet or web in which fibers are unidirectionally or randomly oriented, and the fibers are bonded together via interlacing, fusion, or adhesion. The average thickness can be determined in such a manner that a plurality of sheets or films is laminated; measurements are made using calipers at randomly selected 10 points; and the thickness obtained is divided by the number of lamination.

Examples of specific methods include transferring a reinforcing fiber substrate (A') to a conveyor and laminating a poly (phenylene ether ether ketone) oligomer(s) (B) in the form of a film on one or both surfaces of the reinforcing fiber substrate (A') using a hot roller, fixing a poly (phenylene ether ether ketone) oligomer (B) in the form of a nonwoven fabric by punching, and entangling a reinforcing fiber substrate (A') with a poly (phenylene ether ether ketone) oligomer (B) in the form of a nonwoven fabric using an air jet.

From the standpoint of economic efficiency and productivity, the poly (phenylene ether ether ketone) oligomer (B) in any form of a film, a sheet, and a nonwoven fabric is preferably rolled. When it is difficult to roll the poly (phenylene ether ether ketone) oligomer (B) alone, one preferred method is processing the poly (phenylene ether ether ketone) oligomer (B) into a relevant form, and then applying it on release paper for rolling.

[C3] A method for combination by applying a heat-melted poly (phenylene ether ether ketone) oligomer (B) to a reinforcing fiber substrate (A'). In the heat-melting here, an apparatus such as an extruder or a molten bath can be used, which apparatus preferably has a function to transfer the melted poly (phenylene ether ether ketone) oligomer (B), such as a screw, a gear pump, or a plunger.

Examples of specific methods include feeding a poly (phenylene ether ether ketone) oligomer (B) to a mold die such as a T-die or a slit die while melting it using an extruder and passing a reinforcing fiber substrate (A') through the mold die, feeding a poly (phenylene ether ether ketone) oligomer (B) to a molten bath with a gear pump and passing a reinforcing fiber substrate (A') through the molten bath with drawing, feeding a melted poly (phenylene ether ether ketone) oligomer (B) to a kiss coater with a plunger pump and applying the melt of the poly (phenylene ether ether ketone) oligomer (B) to a reinforcing fiber substrate (A'), and feeding a melted poly (phenylene ether ether ketone) oligomer (B) onto a heated rotating roll and passing a reinforcing fiber substrate (A') over the roll surface.

In the step of melting the poly (phenylene ether ether ketone) oligomer (B), it is preferable to set the temperature such that thermal polymerization of the poly (phenylene ether ether ketone) oligomer (B) occurs as little as possible. The temperature in the step of producing a molten mixture and the step of impregnating the molten mixture is 160 to 340° C., preferably 180 to 320° C., more preferably 200 to 300° C., and particularly preferably 230 to 270° C. When the temperature is in this preferred range, the poly (phenylene ether ether ketone) oligomer (B) can be melted in a short time, and at the same time, viscosity increase due to formation of poly (phenylene ether ether ketone)s (B') is unlikely to occur.

Further, the step [II] preferably comprises heating a composite of a reinforcing fiber substrate (A') and a poly (phenylene ether ether ketone) oligomer (B) to 160 to 340° C., preferably 180 to 320° C., more preferably 200 to 300° C., and particularly preferably 230 to 270° C. Through this heating, the poly (phenylene ether ether ketone) oligomer (B) softens or melts and can be fixed more firmly to the reinforcing fiber substrate (A'), which is advantageous for increasing productivity. When the heating temperature is in this preferred range, the poly (phenylene ether ether ketone) oligomer (B) can be melted in a short time, and at the same time, viscosity increase due to formation of poly (phenylene ether ether ketone)s (B') is unlikely to occur.

Further, applying pressure simultaneously with or immediately after the heating promotes impregnation of the poly (phenylene ether ether ketone) oligomer (B) into the reinforcing fiber substrate (A'), which is particularly preferred. The pressure in this case is preferably 0.1 to 5 MPa, more preferably 0.3 to 4 MPa, and still more preferably 0.5 to 3 MPa from the standpoint of productivity.

Examples of specific methods include passing a composite through a heated chamber in which a plurality of pressure rollers is provided, passing a composite through a heated chamber in which calender rolls are provided one above the other, and simultaneously performing heating and pressurization using a hot roller.

When a polymerization catalyst (D) is used, the polymerization catalyst (D) is preferably added in the step [II] from the standpoint of dispersibility in a poly (phenylene ether ether ketone) oligomer (B). In this case, a mixture of a poly (phenylene ether ether ketone) oligomer (B) and a polymerization catalyst (D) may be used as processed into the form of particles, fibers, flakes, a film, a sheet, a nonwoven fabric, or a heated melt described above.

The mixture of a poly (phenylene ether ether ketone) oligomer (B) and a polymerization catalyst (D) may be obtained by any method, but it is preferable to add the polymerization catalyst (D) to the poly (phenylene ether ether ketone) oligomer (B) and then disperse the polymerization catalyst (D) uniformly. Examples of the method for uniform dispersion include mechanical dispersion. Specific examples of the mechanical dispersion include methods using a grinder, stirrer, mixer, shaker, or mortar. In dispersing the polymerization catalyst (D), the polymerization catalyst (D) preferably has an average particle size of 1 mm or smaller to allow more uniform dispersion.

<Step [III]>

The step [III] is a step of heating the composite of a reinforcing fiber substrate (A') and a poly (phenylene ether ether ketone) oligomer (B) obtained in the step [II] to polymerize the poly (phenylene ether ether ketone) oligomer (B) into a poly (phenylene ether ether ketone) (B'). The poly (phenylene ether ether ketone) oligomer (B) is particularly preferably thermally polymerized in the presence of the polymerization catalyst (D) to convert into a poly (phenylene ether ether ketone) (B').

The lower limit of the temperature during thermal polymerization is, for example, not lower than 160° C., preferably not lower than 200° C., more preferably not lower than 230° C., and still more preferably not lower than 270° C. In this temperature range, it is likely that the poly (phenylene ether ether ketone) oligomer (B) will melt and a poly (phenylene ether ether ketone) (B') can be obtained in a short time.

The upper limit of the temperature during thermal polymerization is, for example, not higher than 450° C., preferably not higher than 400° C., more preferably not higher than 350° C., and still more preferably not higher than 300° C. When the heating temperature is not higher than this temperature range, it is likely that adverse effects of undesirable side reactions on the properties of the poly (phenylene ether ether ketone) (B') can be prevented.

Further, the poly (phenylene ether ether ketone) oligomer (B) in the present invention can also be polymerized at a temperature not higher than the melting point of the poly (phenylene ether ether ketone) (B') obtained by polymerization. In such a temperature range, the poly (phenylene ether ether ketone) oligomer (B) undergoes crystallization polymerization, which results in a molding material comprising as a matrix resin a poly (phenylene ether ether ketone) (B') with crystallinity higher than usual and, in turn, melting enthalpy higher than usual.

The reaction time until completion of the polymerization in the step [III] is preferably as short as possible because productivity and economic efficiency increase: e.g., process length can be shortened, or take-up speed can be increased. The reaction time is preferably 60 minutes or less, and more preferably 10 minutes or less, for example. The lower limit of the reaction time is not particularly limited, but it is not less than 0.05 minutes, for example.

In the polymerization of the poly (phenylene ether ether ketone) oligomer (B) in the step [III], heating is preferably performed in a non-oxidizing atmosphere in order to inhibit the occurrence of undesirable side reactions such as cross-linking reaction and decomposition reaction. Here, "non-oxidizing atmosphere" refers to an atmosphere with an oxygen concentration of 5% by volume or less, preferably 2% by volume or less, and more preferably free of oxygen, i.e., an atmosphere of inert gas such as nitrogen, helium, and argon. Among them, a nitrogen atmosphere is preferred particularly in terms of economic efficiency and handleability.

Also in the step [III], heating is preferably performed under reduced pressure. In this case, it is more preferred that the atmosphere in the reaction system be once replaced with a non-oxidizing atmosphere before adjusting to reduced-pressure conditions. "Under reduced pressure" as used herein refers to a condition where the pressure in the reaction system is lower than atmospheric pressure, and the pressure is preferably 0.1 to 50 kPa, more preferably 0.1 to 10 kPa.

Further, the step [III] preferably comprises applying pressure simultaneously with or after heating. It is preferred because impregnation of the reinforcing fiber substrate (A') with a poly (phenylene ether ether ketone) oligomer (B) and a poly (phenylene ether ether ketone) (B') can be further improved. The pressure in this case is preferably 0.1 to 10 MPa, more preferably 0.2 to 5 MPa, and still more preferably 2 to 6 MPa from the standpoint of the balance between impregnation properties and productivity. When the pressure is in this preferred range, voids will not occur in a large amount in the molding material and, in turn, in the resulting molded article, and at the same time, the arrangement of the reinforcing fiber substrate (A') will not be greatly disarranged.

Examples of specific methods include passing a composite through a nitrogen-substituted system while applying pressure from above and beneath with a double belt press; passing a composite through a plurality of calender rolls while applying pressure in a nitrogen-substituted heating furnace; and placing a composite between press molds at high temperature, sealing the space between the press molds, substituting the atmosphere in the molds with nitrogen upon pressurization, and opening the press molds after completion of polymerization under reduced-pressure conditions to pull out the composite. To improve impregnation properties, these apparatuses may be used in combination; the line may be wound in order to increase the length; or the composite that has passed through the apparatus may be repeatedly used to loop through the same apparatus more than once.

<Step [IV]>

The step [IV] is a step of cooling and taking up the composite obtained in the step [III]. Examples of the method for cooling that can be used include, but are not limited to, cooling by blowing air, spraying cooling water, passing through a cooling bath, and passing over a cooling plate.

When the molding material is produced on-line, the take-up speed is preferably as high as possible because it directly influences economic efficiency and productivity. The take-up speed is preferably 1 to 100 m/min, more preferably 5 to 100 m/min, and still more preferably 10 to 100 m/min.

Examples of specific methods include drawing with a nip roller, taking up with a drum winder, and gripping a substrate with a fixture and taking up the substrate together with the fixture. When taking up a substrate, the substrate may be cut partially with a slitter, may be processed into a sheet of a given length with a guillotine cutter or the like, may be cut to a certain length with a strand cutter or the like, or may be kept in the form of a roll.

The method for producing a molding material of the present invention can comprise other processes as long as the effects of the present invention are not inhibited. Examples of the process include electron beam irradiation, plasma treatment, strong magnetic field application, surface material lamination, protective film application, and after curing.

The molding material obtained by the method for producing a molding material of the present invention comprises a reinforcing fiber substrate (A') and a poly (phenylene ether ether ketone) oligomer (B).

Among them, the content of the reinforcing fiber substrate (A') is preferably 10 wt % or more, more preferably 30 wt % or more, still more preferably 60 wt % or more, and particularly preferably 70 wt % or more, based on 100 wt % of the total of the reinforcing fiber substrate (A') and the poly (phenylene ether ether ketone) oligomer (B). When the content of the reinforcing fiber substrate (A') is less than 10 wt %, the resulting molded article may have poor dynamic properties. The upper limit of the content of the reinforcing fiber substrate (A') is not limited, but it is preferably not more than 90 wt %, more preferably not more than 80 wt %, and still more preferably not more than 70 wt %. When the content of the reinforcing fiber substrate (A') is more than 90 wt %, it can be difficult to impregnate the poly (phenylene ether ether ketone) oligomer (B) into the reinforcing fiber substrate (A'). The content of the reinforcing fiber substrate (A') in the molding material of the present invention can be adjusted by controlling the supply of the reinforcing fiber substrate (A') and the poly (phenylene ether ether ketone) oligomer (B).

Further, when a polymerization catalyst (D) is contained, the content thereof is 0.001 to 20 mol %, preferably 0.005 to 15 mol %, and more preferably 0.01 to 10 mol %, based on 1 mol of the repeating unit represented by the following formula, which is a main structural unit of the poly (phenylene ether ether ketone) oligomer (B).

[Chemical formula 7]

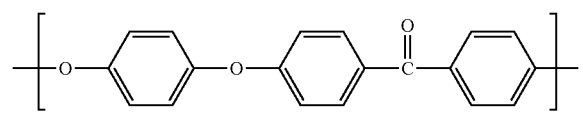

Such percentages can be readily achieved by controlling the supply of the reinforcing fiber substrate (A') and the poly (phenylene ether ether ketone) oligomer (B). For example, the supply of the reinforcing fiber substrate (A') can be controlled by the take-up speed in the step [IV], and the supply of the poly (phenylene ether ether ketone) oligomer (B) can be controlled in the step [II] using a metering feeder or the like. For the supply of the polymerization catalyst (D), the amount in the molding material can be controlled by controlling the amount added to the poly (phenylene ether ether ketone) oligomer (B).

Further, according to the production method of the present invention, molding materials having different impregnation rates can be produced depending on the application and purpose of the molding material. Examples thereof include a prepreg with higher impregnation properties, a semi-impregnated semipreg, and a fabric with low impregnation properties. In general, a molding material with higher impregnation properties tends to provide a molded article having excellent dynamic properties by molding in a shorter time. In contrast, a molding material with relatively low impregnation properties tends to be excellent in drape property and shaping into, for example, a curved shape.

Thus, in the molding material obtained according to the present invention, a first preferred aspect of the impregnation rate of the poly (phenylene ether ether ketone) (B') is a molding material having an impregnation rate of 80% to 100%. This is advantageous in terms of production of a molded article of simpler planar shape with high productivity.

Further, in the molding material obtained according to the present invention, a second preferred aspect of the impregnation rate of the poly (phenylene ether ether ketone) (B') is a molding material having an impregnation rate of 20% to less than 80%. This is a molding material having excellent drape property, and the molding material can be shaped in advance to a mold, which is advantageous in terms of production of a molded article of relatively complex shape such as curved shape with high productivity.

"Impregnation rate of the poly (phenylene ether ether ketone) (B')" as used herein is expressed as a percentage (%) obtained by observing a cross-section of the molding material using a light microscope and dividing the area of impregnation of the poly (phenylene ether ether ketone) (B') by the total of such area and the area of voids.

When measuring the areas using a light microscope, the average value of the measurements of randomly selected 20 images observed at 20 to 100× magnification may be used.

Examples of means for controlling the impregnation rate include temperature and pressure in combining the poly (phenylene ether ether ketone) oligomer (B) in the step [II], and temperature and pressure in polymerizing the poly (phenylene ether ether ketone) oligomer (B) into a poly (phenylene ether ether ketone) (B') in the step [III]. In general, the higher the temperature and the pressure are, the greater the effect of increasing the impregnation rate is. The finer the form of the poly (phenylene ether ether ketone) oligomer (B) is, the more the impregnation properties can be enhanced.

<Method for Molding Molding Material>

The molding material obtained by the present invention can be molded into a molded article in such a manner that at least one layer of the molding material is laminated in any configuration and then molded while applying heat and pressure.

Examples of methods of applying heat and pressure that can be used include the press molding method in which the molding material laminated in any configuration is placed in a mold or on a pressing plate, and then the mold or the pressing plate is closed and pressurized; the autoclave molding method in which the molding material laminated in any configuration is charged into an autoclave, and pressurized and heated; the bag-molding method in which the molding material laminated in any configuration is wrapped with a film or the like and, with the internal pressure reduced, heated in an oven while being pressurized at atmospheric pressure; the wrapping tape method in which the molding material laminated in any configuration is wrapped with tape under tension and heated in an oven; and the internal pressure molding method in which the molding material laminated in any configuration is placed in a mold, and a core that is also placed in the mold is charged with gas or liquid and pressurized. In particular, molding methods in which pressing is performed using a mold are preferred because a molded article with low void and excellent appearance quality can be obtained.

The heating temperature during molding is, for example, in the range of 160 to 450° C., more preferably 230 to 430° C., and still more preferably 270 to 400° C. When the heating temperature during molding in this preferred range, the poly (phenylene ether ether ketone) (B') easily melts, and at the same time, the poly (phenylene ether ether ketone) (B') is unlikely to be thermally degraded.

Examples of the method here for measuring the heating temperature during molding include, in the case of a molding method in which molding is performed using a mold, measuring the surface temperature of the mold using a thermometer such as a thermocouple.

The pressure during molding is preferably in the range of 0.1 to 10 MPa, and more preferably in the range of 0.2 to 5 MPa, for example. When the pressure during molding is in this preferred range, voids will not occur in a large amount in the molding material and, in turn, in the resulting molded article, and at the same time, the arrangement of the reinforcing fiber substrate (A') will not be greatly disarranged.

Time for performing hot-pressing during molding is not critical, but it is in the range of 0.001 to 1,000 minutes, preferably 0.01 to 300 minutes, more preferably 0.1 to 60 minutes, still more preferably 0.3 to 30 minutes, and particularly preferably 0.5 to 10 minutes. When the impregnation time is in this preferred range, the poly (phenylene ether ether ketone) (B') melts sufficiently, and at the same time, the molding material can be produced efficiently.

The molding material obtained by the present invention can be easily molded also by integrally molding such as insert molding or outsert molding. Further, highly productive adhesion techniques can be employed after molding, such as reformation by heating, heat welding, vibration welding, and ultrasonic welding.

<Molded Article>

The molded article using the molding material obtained by the present invention is excellent in heat resistance, mechanical properties, flame resistance, chemical resistance, and the like. Further, since the matrix resin in the molded article is a thermoplastic resin, the resin can be plasticized, for example, by heating, and thus the molded article can be easily recycled or repaired. Examples of the molded article include industrial machine parts (e.g., automotive parts such as thrust washers, oil filters, seals, bearings, gears, cylinder head covers, bearing retainers, intake manifolds, and pedals; semiconductor/liquid crystal manufacturing equipment parts such as silicon wafer carriers, IC chip trays, electrolytic capacitor trays, and insulating films; compressor parts such as pumps, valves, and seals; and aircraft cabin interior parts); medical equipment parts such as sterilization devices, columns, and tubes; and food/beverage production equipment parts. Further, since the molding material of the present invention has excellent fluidity, a thin-walled molded article with a thickness of 0.5 to 2 mm can be obtained with relative ease. Examples of products that require such thin-wall molding include housings used for personal computers, cellular phones, and the like, and members for electrical and electronic equipment as typified by a keyboard support which is a member for supporting a keyboard inside a personal computer. In such members for electrical and electronic equipment, electromagnetic shielding properties are provided when a conductive carbon fiber is used as a reinforcing fiber, which is more preferred.

<First Method for Producing Fiber-Reinforced Composite Material>

The first method for producing a fiber-reinforced composite material of the present invention is Resin Transfer Molding method (RTM), comprising the steps of (I-1) placing a reinforcing fiber substrate (A') in a mold, (II-1) heat-melting a poly (phenylene ether ether ketone) oligomer (B) to form a melt solution, (III-1) injecting the melt solution obtained in the step (II-1) into the mold of the step (I-1) to impregnate the component (B) into the component (A'), and (IV-1) thermally polymerizing the component (B) into a poly (phenylene ether ether ketone) (B'), wherein the poly (phenylene ether ether ketone) oligomer (B) used in step (II-1) has a melting point of not higher than 270° C.

The step (I-1) is a step of placing a reinforcing fiber substrate (A') in a mold. The mold used is preferably a rigid closed mold. Various existing materials such as metals (e.g., steel, aluminum, and INVAR) and fiber-reinforced composite materials are used as materials for the mold.

From the standpoint of shapability, the reinforcing fiber substrate (A') preferably used is a fabric (cloth), nonwoven fabric, mat, or knit. The shape of the reinforcing fiber substrate (A') may be planar or irregular. These shapes may be used alone or arranged in combination. In particular, when an irregular fiber-reinforced composite material is desired, preforms obtained by shaping a reinforcing fiber substrate (A') to the design surface of a mold are preferably used.

The step (II-1) is a step of heat-melting a poly (phenylene ether ether ketone) oligomer (B) to form a melt solution. In the heat-melting here, an apparatus such as a molten bath can be used, which apparatus preferably has a function to transfer the melted poly (phenylene ether ether ketone) oligomer (B), such as a screw, a gear pump, or a plunger.

The step (III-1) is a step of injecting the melt solution obtained in the step (II-1) into the mold of the step (I-1) to impregnate the poly (phenylene ether ether ketone) oligomer (B) into the reinforcing fiber substrate (A').

When a rigid closed mold is used, into a mold clamped by pressurization, a melt solution of poly (phenylene ether ether ketone) oligomer (B) is generally injected while applying pressure. In this case, in addition to an injection port, a suction port may be provided to suck the melt solution by means of a vacuum pump or the like. It is also possible to inject the solution of poly (phenylene ether ether ketone) oligomer (B) only by means of atmospheric pressure by suction without using particular pressurizing means.

The step (IV-1) is a step of thermally polymerizing the poly (phenylene ether ether ketone) oligomer (B) into a poly (phenylene ether ether ketone) (B').

The temperature during thermal polymerization preferably used is a temperature of the polymerization of the poly (phenylene ether ether ketone) oligomer (B) into a poly (phenylene ether ether ketone) (B') described above. In particular, conditions under which the crystallization polymerization described above occurs are preferably used because the process for cooling a mold can be shortened when demolding a molded article after polymerization. Examples of the method here for measuring the heating temperature include measuring the surface temperature of the mold using a thermometer such as a thermocouple.

The reaction time until completion of polymerization in the step (IV-1) is preferably as short as possible because productivity and economic efficiency increase. The reaction time is preferably 60 minutes or less, and more preferably 10 minutes or less, for example. The lower limit of the reaction time is not particularly limited, but it is not less than 0.05 minutes, for example.

It should be noted that the above description is an example of RTM methods, and the method for producing a fiber-reinforced composite material of the present invention is not limited thereto.

Further, in the first method for producing a fiber-reinforced composite material of the present invention, in addition to the reinforcing fiber substrate (A'), a foam core, a honeycomb core, metal parts, or the like can be placed in a mold to provide a fiber-reinforced composite material integrated therewith. In particular, a sandwich structure obtained by placing reinforcing fiber substrates (A') on both surfaces of a foam core or honeycomb core followed by molding is useful because it is lightweight and has excellent flexural rigidity.

Further, prior to placing a reinforcing fiber substrate (A') in a mold, a gelcoat can be applied to the surface of the mold.

<Second Method for Producing Fiber-Reinforced Composite Material>

The second method for producing a fiber-reinforced composite material of the present invention is a so-called filament winding molding method, comprising the steps of (I-2) drawing and continuously feeding a reinforcing fiber substrate (A'), (II-2) heat-melting a poly (phenylene ether ether ketone) oligomer (B) in an impregnation bath to form a melt solution, (III-2) passing the component (A') continuously through the impregnation bath of the step (II-2) to impregnate the component (B) into the component (A') and winding the resulting composite around a mandrel, and (IV-2) thermally polymerizing the component (B) into a poly (phenylene ether ether ketone) (B'), wherein the poly (phenylene ether ether ketone) (B) has a melting point of not higher than 270° C.

The step (I-2) is a step of drawing and continuously feeding a reinforcing fiber substrate (A'). "Continuous" means that the reinforcing fiber substrate (A') which is a raw material is fed unceasingly without a complete break. The feed rate may be constant, or feeding and cessation may be repeated intermittently.

From the standpoint of productivity, the reinforcing fiber substrate (A') preferably used is a reinforcing fiber bundle. Further, the reinforcing fiber substrate (A') is more preferably opened before feeding. "Opening" as used herein refers to an operation for separating a bundled reinforcing fiber substrate (A'), which can further enhance the impregnation properties of a poly (phenylene ether ether ketone) oligomer (B). Examples of the method for opening the reinforcing fiber substrate (A') that can be used include, but are not limited to, passing the reinforcing fiber substrate (A') alternately through a concave roll and a convex roll, using a drum-type roll, applying tension fluctuation to an axial oscillation, fluctuating the tension of the reinforcing fiber substrate (A') using two friction bodies that vertically reciprocate, and blowing air to the reinforcing fiber substrate (A').

The step (II-2) is a step of heat-melting a poly (phenylene ether ether ketone) oligomer (B) in an impregnation bath to form a melt solution. The impregnation bath in this step is preferably equipped with a heating source for heat-melting the poly (phenylene ether ether ketone) oligomer (B) to form a melt solution and further storing the melt solution for a predetermined time, and is preferably equipped with a mechanism by which the reinforcing fiber substrate (A') is continuously immersed in the melt solution and taken up.

The step (III-2) is a step of passing the reinforcing fiber substrate (A') continuously through the impregnation bath of the step (II-2) to impregnate the poly (phenylene ether ether ketone) oligomer (B) into the reinforcing fiber substrate (A') and winding the resulting composite around a mandrel. The composite obtained here is wound spirally around the mandrel at various angles to its axial direction. A surface material or the like may then be wound tightly around the surface to squeeze out excess resin.

The step (IV-2) is a step of thermally polymerizing the poly (phenylene ether ether ketone) oligomer (B) into a poly (phenylene ether ether ketone) (B'). An oven and the like can preferably be used as a heating apparatus, and examples of preferred methods include heating the mandrel around which the composite was wound in the step (III-2) to polymerize the poly (phenylene ether ether ketone) oligomer (B).

The temperature during thermal polymerization preferably used is a temperature of the polymerization of the poly (phenylene ether ether ketone) oligomer (B) into a poly (phenylene ether ether ketone) (B') described above. Examples of the method here for measuring the heating temperature include measuring the atmosphere temperature in the oven using a thermometer such as a thermocouple.

The reaction time until completion of polymerization in the step (IV-2) is preferably as short as possible because productivity and economic efficiency increase. The reaction time is preferably 60 minutes or less, and more preferably 10 minutes or less, for example. The lower limit of the reaction time is not particularly limited, but it is not less than 0.05 minutes, for example.

It should be noted that the above description is an example of filament winding methods, and the method for producing a fiber-reinforced composite material of the present invention is not limited thereto.

According to the second method for producing a fiber-reinforced composite material of the present invention, a cylindrical fiber-reinforced composite material can be readily obtained. Thus, the method is suitable for various industrial machine parts such as automotive propeller shafts, CNG tanks, and flywheels; and sports/leisure goods such as golf shafts and fishing rods.

<Third Method for Producing Fiber-Reinforced Composite Material>

The third method for producing a fiber-reinforced composite material of the present invention is a so-called pultrusion molding method, comprising the steps of (I-3) drawing and continuously feeding a reinforcing fiber substrate (A'), (II-3) heat-melting a poly (phenylene ether ether ketone) oligomer (B) in an impregnation bath to form a melt solution, (III-3) passing the component (A') continuously through the impregnation bath of the step (II-3) to form a composite of the component (B) and the component (A') impregnated therewith, and (IV-3) pultruding the composite obtained continuously through a mold to thermally polymerize the component (B) into a poly (phenylene ether ether ketone) (B'), wherein the poly (phenylene ether ether ketone) (B) has a melting point of not higher than 270° C.

The step (I-3) is a step of drawing and continuously feeding a reinforcing fiber substrate (A'). "Continuous" means that the reinforcing fiber substrate (A') which is a raw material is fed unceasingly without a complete break. The feed rate may be constant, or feeding and cessation may be repeated intermittently.

From the standpoint of productivity, the reinforcing fiber substrate (A') preferably used is a unidirectionally arranged substrate. Specifically, for example, a method is preferably used in which a plurality of reinforcing fiber bundles is unidirectionally arranged in the form of a sheet, further passed through a roll bar, and fed to a production line.

Further, the reinforcing fiber substrate (A') is more preferably opened before feeding. "Opening" as used herein refers to an operation for separating a bundled reinforcing fiber substrate (A'), which can further enhance the impregnation properties of a poly (phenylene ether ether ketone) oligomer (B). Examples of the method for opening the reinforcing fiber substrate (A') that can be used include, but are not limited to, passing the reinforcing fiber substrate (A') alternately through a concave roll and a convex roll, using a drum-type roll, applying tension fluctuation to an axial oscillation, fluctuating the tension of the reinforcing fiber substrate (A') using two friction bodies that vertically reciprocate, and blowing air to the reinforcing fiber substrate (A').

The step (II-3) is a step of heat-melting a poly (phenylene ether ether ketone) oligomer (B) in an impregnation bath to form a melt solution. The impregnation bath in this step is preferably equipped with a heating source for heat-melting the poly (phenylene ether ether ketone) oligomer (B) to form a melt solution and further storing the melt solution for a predetermined time, and is preferably equipped with a mechanism by which the reinforcing fiber substrate (A') is continuously immersed in the melt solution and taken up.

The step (III-3) is a step of passing the reinforcing fiber substrate (A') continuously through the impregnation bath of the step (II-3) to form a composite of the poly (phenylene ether ether ketone) oligomer (B) and the reinforcing fiber substrate (A') impregnated therewith.

Further, the composite obtained in the step (II-3) may be passed through a squeeze die before being passed through the mold of the step (III-3). "Squeeze die" as used herein refers to a fixture for scraping excess melt solution from the reinforcing fiber substrate (A') that has passed through the impregnation bath. The squeeze die may be of any shape as long as excess melt solution can be scraped off, and examples of the shape of the cross-section taken perpendicular to the pultrusion direction include a circle, rectangle, and square. The squeeze die may be of any material, and preferred examples thereof include metals, plastics, and ceramics.

The step (IV-3) is a step of pultruding the composite obtained continuously through a mold to thermally polymerize the poly (phenylene ether ether ketone) oligomer (B) into a poly (phenylene ether ether ketone) (B').

The mold used in this step may be any mold as long as it has a cross-sectional shape that corresponds to the shape of the final fiber-reinforced composite material of interest, and examples of the cross-sectional shape include a circle, oval, rectangle, square, L-shape, and U-shape. Examples of the material of the mold include steel, aluminum, and INVAR.

The temperature during thermal polymerization preferably used is a temperature of the polymerization of the poly (phenylene ether ether ketone) oligomer (B) into a poly (phenylene ether ether ketone) (B') described above. Examples of the method here for measuring the heating temperature include measuring the surface temperature of the mold using a thermometer such as a thermocouple.

The reaction time until completion of polymerization in the step (IV-3) is preferably as short as possible because productivity and economic efficiency increase. The reaction time is preferably 60 minutes or less, and more preferably 10 minutes or less, for example. The lower limit of the reaction time is not particularly limited, but it is not less than 0.05 minutes, for example.

Examples of methods for pulling out the fiber-reinforced composite material obtained in the present invention include, but are not limited to, drawing with a nip roller or a belt conveyor and taking up with a drum winder.

Prior to the pultrusion operation described above, the fiber-reinforced composite material obtained is preferably cooled. Examples of cooling methods include, but are not limited to, passing in contact with a roller equipped with a cooling unit, passing in contact with a cooling plate, and passing through a cooling bath. In particular, the method of passing in contact with a roller equipped with a cooling unit is preferably used because pressure can be applied.

It should be noted that the above description is an example of pultrusion molding methods, and the method for producing a fiber-reinforced composite material of the present invention is not limited thereto.

According to the third method for producing a fiber-reinforced composite material of the present invention, a long fiber-reinforced composite material can be readily obtained. Thus, the fiber-reinforced composite material is suitably used as a reinforcing material for buildings, vehicles, and aircrafts.

The method for producing a fiber-reinforced composite material of the present invention can comprise other processes as long as the effects of the present invention are not inhibited. Examples of the process include electron beam irradiation, plasma treatment, strong magnetic field application, surface material lamination, protective film application, and after curing.

<Forming Melt Solution of Poly (Phenylene Ether Ether Ketone) Oligomer (B)>

In the step (II-1), (II-2), or (II-3) in the method for producing a fiber-reinforced composite material of the present invention, the poly (phenylene ether ether ketone) oligomer (B) needs to be formed into a melt solution by heat-melting. The temperature for forming a melt solution by heat-melting is preferably set at such a temperature that thermal polymerization of the poly (phenylene ether ether ketone) oligomer (B) occurs as little as possible. Such a temperature is, for example, in the range of 160 to 340° C., preferably 180 to 320° C., more preferably 200 to 300° C., and particularly preferably 230 to 270° C. When the temperature is in this range, the melt viscosity of the poly (phenylene ether ether ketone) oligomer (B) can be adjusted to 10 Pa·s or lower, facilitating impregnation into a reinforcing fiber substrate (A'). When the temperature is this preferred in range, the poly (phenylene ether ether ketone) oligomer (B) can be melted in a short time, and at the same time, viscosity increase due to formation of poly (phenylene ether ether ketone)s (B') is unlikely to occur.

<Fiber-Reinforced Composite Material>

The fiber-reinforced composite material obtained in the present invention comprises a reinforcing fiber substrate (A') and a poly (phenylene ether ether ketone) oligomer (B).

Among them, the content of the reinforcing fiber substrate (A') is preferably 10 wt % or more, more preferably 30 wt % or more, still more preferably 60 wt % or more, and particularly preferably 70 wt % or more, based on 100 wt % of the total of the reinforcing fiber substrate (A') and the poly (phenylene ether ether ketone) oligomer (B). The upper limit of the content of the reinforcing fiber substrate (A') is not limited, but it is preferably not more than 90 wt %, more preferably not more than 80 wt %, and still more preferably not more than 70 wt %. When the content of the reinforcing fiber substrate (A') in this preferred range, the resulting molded article has sufficient dynamic properties, and in addition, the poly (phenylene ether ether ketone) oligomer (B) is easily impregnated into the reinforcing fiber substrate (A'). The content of the reinforcing fiber substrate (A') in the fiber-reinforced composite material obtained according to the present invention can be adjusted by controlling the supply of the reinforcing fiber substrate (A') and the poly (phenylene ether ether ketone) oligomer (B).

Further, when a polymerization catalyst (D) is contained, the content thereof is 0.001 to 20 mol %, preferably 0.005 to 15 mol %, and more preferably 0.01 to 10 mol %, based on 1 mol of the repeating unit represented by the following formula, which is a main structural unit of the poly (phenylene ether ether ketone) oligomer (B).

[Chemical formula 8]

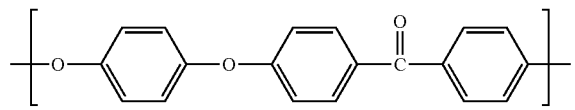

For the supply of the polymerization catalyst (D), the amount in the fiber-reinforced composite material can be controlled by controlling the amount added to the poly (phenylene ether ether ketone) oligomer (B).

The fiber-reinforced composite material obtained in the present invention is preferably has a small void fraction. A preferred range of the void fraction is, for example, 0 to 20%. When the void fraction is in such a range, a fiber-reinforced composite material having excellent dynamic properties can be obtained.

"Void fraction of the fiber-reinforced composite material" as used herein is expressed as a percentage (%) obtained by observing a cross-section of the fiber-reinforced composite material using a light microscope and dividing the area of voids by the total area observed.

When measuring the areas using a light microscope, the average value of the measurements of randomly selected 20 images observed at 20 to 100× magnification may be used.

In the step (IV-1), (IV-2), or (IV-3) in the method for producing a fiber-reinforced composite material of the present invention, performing polymerization reaction of the poly (phenylene ether ether ketone) oligomer (B) into a poly (phenylene ether ether ketone) (B') in a temperature range of 160 to 330° C., preferably 200 to 300° C., allows the crystallization polymerization mentioned above to proceed. Adjusting to such conditions is preferred in terms of productivity: e.g., the process for cooling the fiber-reinforced composite material can be shortened.

The fiber-reinforced composite material obtained in the present invention can be used for integrally molding such as insert molding or outsert molding. Further, highly productive adhesion techniques can be employed, such as reformation by heating, heat welding, vibration welding, and ultrasonic welding.

The fiber-reinforced composite material obtained in the present invention is excellent in heat resistance, mechanical properties, flame resistance, chemical resistance, and the like because the matrix resin therein is a poly (phenylene ether ether ketone). Further, since the matrix resin is a thermoplastic poly (phenylene ether ether ketone), the resin can be plasticized, for example, by heating, and thus the resulting molded article can be easily recycled or repaired.

Examples of the application thereof include industrial machine parts (e.g., automotive parts such as thrust washers, oil filters, seals, bearings, gears, cylinder head covers, bearing retainers, intake manifolds, and pedals; semiconductor/liquid crystal manufacturing equipment parts such as silicon wafer carriers, IC chip trays, electrolytic capacitor trays, and insulating films; compressor parts such as pumps, valves, and seals; and aircraft cabin interior parts); medical equipment parts such as sterilization devices, columns, and tubes; and food/beverage production equipment parts.

EXAMPLES

The present invention will now be described in more detail by way of example.

Evaluation methods used in the present invention will be described below.

(1) Quantification of Cyclic Poly (Phenylene Ether Ether Ketone)

Cyclic poly (phenylene ether ether ketone)s in a poly (phenylene ether ether ketone) oligomer (B) was quantified using high-performance liquid chromatography. Measurement conditions will be described below.

Apparatus: LC-10Avp Series manufactured by Shimadzu Corporation
Column: Mightysil RP-18GP150-4.6
Detector: Photodiode array detector (UV=270 nm)
Column temperature: 40° C.
Sample: 0.1 wt % THF solution
Mobile phase: THF/0.1w % aqueous trifluoroacetic acid solution (2) Differential Scanning Calorimeter In accordance with JIS K 7121 (1987), measurements were made using a differential scanning calorimeter, DSC system TA3000 (available from METTLER), at a temperature rise rate of 10° C./min. The melting peak temperature was employed as a melting point, and a melting enthalpy was determined from the melting peak area.

(3) Infrared Spectroscopy Analyzer

Absorption spectra were measured by infrared spectroscopy under the following conditions.

Apparatus: Perkin Elmer System 2000 FT-IR
Sample preparation: KBr method (4) Viscosity Measurement Reduced viscosities were measured under the following conditions.

Viscometer: Ostwald viscosimeter
Solvent: 98 wt % sulfuric acid
Sample concentration: 0.1 g/dL (sample weight/solvent volume)
Measurement temperature: 25° C.
Equation of reduced viscosity: $\eta = \{(t/t_0)-1\}/C$
t: Transit time of sample solution in seconds
$t_0$: Transit time of solvent in seconds
C: Concentration of solution (5) Evaluation of Productivity of Molding Material The shape of the molding material obtained was visually observed to check for defective products (resin cracks, reinforcing fiber dropout). From the molding material obtained, 20 g of samples were randomly extracted. Using as a criterion a defective rate which corresponds to the total number of defective products in the samples, evaluation was carried out on the following 3-point scale, and "good" and "fair" were evaluated as acceptable.

Good: The defective rate is less than 1/20 g. Productivity of the molding material is particularly excellent.
Fair: The defective rate is 1/20 g to less than 5/20 g. Productivity of the molding material is excellent.
Bad: The defective rate is not less than 5/20 g. Productivity of the molding material is poor.

(6) Average Fiber Length of Reinforcing Fibers Contained in Molded Article Obtained Using Molding Material A portion of a molded article was cut out and hot-pressed at 400° C. to obtain a 30-μm-thick film. The film obtained was observed under a light microscope at 150× magnification to observe fibers dispersed in the film. The length of the fibers was measured in micrometers, and the weight average fiber length (Lw) and the number average fiber length (Ln) were determined by the following equation.

Weight average fiber length$(Lw) = \Sigma(Li \times Wi/100)$

Number average fiber length$(Ln) = (\Sigma Li)/N_{total}$ $Li$: Measured fiber length (i=1, 2, 3, ..., n)

$Wi$: Weight fraction of fibers with a fiber length of $Li$ (i=1, 2, 3, ..., n)

$N_{total}$: Total number of fibers subjected to fiber length measurement (7) Densitie of Molded Article Obtained Using Molding Material Measurements were made in accordance with the method A (water displacement method) described in JIS K 7112 (1999) 5. A test piece of 1 cm×1 cm was cut out from a molded article and loaded into a heat-resistant glass container. The container was vacuum-dried at a temperature of 80° C. for 12 hours, and cooled to room temperature in a desiccator so that the test piece does not absorb moisture. Ethanol was used as an immersion liquid.

(8) Appearance Evaluation of Molded Article Obtained Using Molding Material

The surface of a thin planar molded article of 150 mm (width)×150 mm (length)×1.2 mm (thickness) obtained by injection molding was visually observed, and the number of dispersion defects (e.g., swelling and blistering) of reinforcing fibers was measured. Measurements were made on 20 samples, and using as a criterion the average number of defects obtained by dividing the total number of dispersion defects by the number of samples, evaluation was carried out on the following 4-point scale. "Excellent" and "good" were evaluated as acceptable.

Excellent: No dispersion defects are observed in all the molded articles. Surface appearance is particularly excellent.
Good: The average number of defects is more than 0 and less than 0.1/sample. Surface appearance is excellent.
Fair: The average number of defects is 0.1/sample to less than 0.5/sample. Surface appearance is somewhat poor.
Bad: The average number of defects is not less than 0.5/sample. Surface appearance is poor.

(9) Measurement of the Content of Reinforcing Fiber Substrate (A') in Molding Material A molding material was cut into 20-mm-square pieces, and poly (phenylene ether ether ketone) oligomers (B) were extracted by Soxhlet extraction using 100 g of chloroform at 80° C. over 5 hours. The residue was dried, and the fiber weight content was calculated from the weight difference before and after extraction. The number of measurements n was 3.

(10) Evaluation of Impregnation Rate of Poly (Phenylene Ether Ether Ketone) Oligomer (B) or Poly (Phenylene Ether Ether Ketone) (B') in Molding Material The cross-section through the thickness of a molding material was observed for measurement as described below. A molding material was embedded in epoxy resin to prepare a sample, which was polished until the cross-section through the thickness of the molding material was able to be satisfactorily observed. Using the sample obtained here, the area of 500 μm (thickness×width) of the molding material was photographed at 400× magnification using an ultra-deep color 3D profile measuring microscope VK-9500 (controller unit)/VK-9510 (measuring unit) (manufactured by KEYENCE CORPORATION.). In the photographed image, the area of parts occupied by the resin and the area of void parts were determined, and the impregnation rate was calculated by the following equation.

Impregnation rate (%)=100×(total area of parts occupied by resin)/{(total area of parts occupied by resin)+(total area of void parts)}

The impregnation rate of a poly (phenylene ether ether ketone) oligomer (B) or poly (phenylene ether ether ketone) (B') was evaluated on the following 3-point scale using the impregnation rate as a criterion, and "good" and "fair" were evaluated as acceptable.

Good: Impregnation rate is 80% to 100%.
Fair: Impregnation rate is 20% to less than 80%.
Bad: Impregnation rate is less than 20%.

(11) Evaluation of Drape Property of Molding Material

The drape property in the present invention refers to the extent to which a molding material flexibly follows a mold without causing breakage of the molding material or fibers when the molding material is deformed along the mold. In the present invention, an evaluation fixture 5 shown in FIG. 12 was used for evaluation. The fixture 5 had a length (a) of 100 mm, a height (b) of 100 mm, and a block corner angle (d) of 90°. The prepreg obtained was cut into 100 mm (length)×10 mm (width) to prepare a test sample 6. In this case, the longitudinal direction of the sample is made to agree with the longitudinal direction of a reinforcing fiber substrate (A'). As shown in FIG. 12, 200 g of a heavy bob 7 was attached to one end of the sample, and the other end and the midpoint were fastened to the fixture 12 with clamps 8 (length of fastened part (c): 50 mm). The molding material is observed when the heavy bob 7 is stationary. The drape property of each sample was evaluated on a 4-point scale according to the following criteria.

Excellent: The sample is substantially in contact with the block face forming an angle of 90° without breakage of the molding material or reinforcing fibers. (Drape property is particularly excellent.)

Good: The sample is bent at the block corner forming an angle of 90° without breakage of the molding material or reinforcing fibers. When another force is applied, the sample can be forcibly in contact with the block face without breakage of the prepreg or reinforcing fibers. (Drape property is excellent.)

Fair: The sample is bent at the block corner forming an angle of 90° without breakage of the molding material or reinforcing fibers. Even when another force is applied, the sample cannot be forcibly in contact with the block face, or breakage of the molding material and reinforcing fibers occurs. (Drape property is somewhat poor.)

Bad: The sample is bent at the block corner forming an angle of 90°, but breakage of the prepreg and reinforcing fibers occurs; or the sample is not bent at the block corner forming an angle of 90°. (Drape property is poor.)

(12) Void Fraction Evaluation of Molded Article Obtained Using Molding Material or Fiber-Reinforced Composite Material The cross-section through the thickness of a molded article or fiber-reinforced composite material was observed for measurement as described below. A molded article or fiber-reinforced composite material was embedded in epoxy resin to prepare a sample, which was polished until the cross-section through the thickness of the molded article or fiber-reinforced composite material was able to be satisfactorily observed. Using the sample obtained here, the area of 500 μm (thickness×width) of the molded article or fiber-reinforced composite material was photographed at 400× magnification using an ultra-deep color 3D profile measuring microscope VK-9500 (controller unit)/VK-9510 (measuring unit) (manufactured by KEYENCE CORPORATION.). In the photographed image, the area of void parts was determined, and the impregnation rate was calculated by the following equation.

Void fraction (%)=100×(total area of void parts)/(total area of observation sites of molded article or fiber-reinforced composite material)

The void fraction of a molded article was evaluated on the following 3-point scale using the void fraction as a criterion. For molded articles obtained using a molding material, "good" and "fair" were evaluated as acceptable, and for fiber-reinforced composite materials, "good" was evaluated as acceptable.

Good: Void fraction is 0% to 20%. Variation in physical properties is very little.
Fair: Void fraction is more than 20% and not more than 40%. Variation in physical properties is little.
Bad: Void fraction is more than 40%. Variation in physical properties is large.

(13) Melt Viscosity Measurement

Melt viscosities were measured with a dynamic viscoelasticity measuring apparatus under the following conditions.
Apparatus: ARES manufactured by TA Instruments
Plate: Parallel plate, diameter 40 mm

(14) Content of Reinforcing Fiber Substrate (A') in Fiber-Reinforced Composite Material The content of a reinforcing fiber substrate (A') in a fiber-reinforced composite material was determined from the weight of the reinforcing fiber substrate (A') used to produce the fiber-reinforced composite material and the weight of the fiber-reinforced composite material obtained using the following equation.

Content of reinforcing fiber substrate($A'$) (wt %)=100×(weight of reinforcing fiber substrate ($A'$) used)/(weight of fiber-reinforced composite material obtained)

Preparation of Poly (Phenylene Ether Ether Ketone) Oligomer (B)

Reference Example 1

Method for Producing Poly (Phenylene Ether Ether Ketone) Oligomer (B) [B1]

To a four-necked flask equipped with a stirrer, nitrogen inlet tube, Dean-Stark apparatus, condenser tube, and thermometer, 2.40 g (11 mmol) of 4,4'-difluoro benzophenone, 1.10 g (10 mmol) of hydroquinone, 1.52 g (11 mmol) of anhydrous potassium carbonate, 100 mL of dimethyl sulfoxide, and 10 mL of toluene were loaded. The amount of dimethyl sulfoxide per 1.0 mol of the benzene ring component in the resulting mixture is 3.13 liters. The temperature was raised to 140° C. under nitrogen flow and maintained at 140° C. for 1 hour. The temperature was then raised to 160° C. and maintained at 160° C. for 4 hours to allow the mixture to react. After completion of the reaction, the temperature was cooled to room temperature to prepare a reaction mixture.

About 0.2 g of the reaction mixture obtained was weighed and diluted with about 4.5 g of THF. THF-insoluble matter was separated and removed by filtration to prepare a sample for high-performance liquid chromatography analysis. The reaction mixture was analyzed to show that consecutive five types of cyclic poly (phenylene ether ether ketone)s having a number of repeating units (m) of 2 to 6 were formed, and the yield of poly (phenylene ether ether ketone) oligomers (B) from hydroquinone was 15.3%.

Fifty grams of the reaction mixture thus obtained was collected, and 150 g of 1 wt % aqueous acetic acid solution was added thereto. After stirring the resulting mixture into a slurry, the slurry was heated to 70° C., and stirring was continued for 30 minutes. The slurry was filtered through a glass filter (average pore size: 10 to 16 μm) to obtain solid matter. The solid matter obtained was dispersed in 50 g of deionized water, maintained at 70° C. for 30 minutes, and filtered to obtain solid matter. This procedure was repeated three times. The solid matter obtained was subjected to vacuum drying at 70° C. overnight to obtain about 1.24 g of dry solid.

Further, 1.0 g of the dry solid obtained above was subjected to Soxhlet extraction at a bath temperature of 80° C. for 5 hours using 100 g of chloroform. The chloroform was removed from the resulting extract using an evaporator to obtain solid matter. Two grams of chloroform was added to the solid matter, and then the resulting mixture was made into a dispersion using an ultrasonic washer, which dispersion was added dropwise to 30 g of methanol. The resulting precipitate was separated by filtration using a filter paper with an average pore size of 1 μm, and then subjected to vacuum drying at 70° C. for 3 hours to obtain a white solid. The weight of the white solid obtained was 0.14 g, and the yield from hydroquinone used in the reaction was 14.0%.

This white powder was confirmed to be a compound composed of phenylene ether ketone units by the absorption spectrum obtained by infrared spectroscopic analysis. Mass spectrometric analysis (apparatus; M-1200H manufactured by Hitachi) of the components fractionated by high-performance liquid chromatography and the molecular weight information obtained by MALDI-TOF-MS showed that this white powder was a poly (phenylene ether ether ketone) oligomer (B) mainly composed of a mixture of consecutive five types of cyclic poly (phenylene ether ether ketone)s having a number of repeating units (m) of 2 to 6. Further, the weight fraction of the cyclic poly (phenylene ether ether ketone) mixture in the poly (phenylene ether ether ketone) oligomer (B) was 81%. The component other than the cyclic poly (phenylene ether ether ketone) in the poly (phenylene ether ether ketone) oligomer (B) was a linear poly (phenylene ether ether ketone) oligomer.

The melting point of such a poly (phenylene ether ether ketone) oligomer (B) was measured to be 163° C. The reduced viscosity of the poly (phenylene ether ether ketone) oligomer (B) was measured to be less than 0.02 dL/g.

Further, the chloroform insoluble solid matter, which was obtained in the recovery of the poly (phenylene ether ether ketone) oligomer (B) by Soxhlet extraction described above, was subjected to vacuum drying at 70° C. overnight to obtain about 0.85 g of off-white solid matter. The solid matter was analyzed, and it was confirmed to be a linear poly (phenylene ether ether ketone) by the absorption spectrum obtained by infrared spectroscopic analysis. Further, the reduced viscosity of this linear poly (phenylene ether ether ketone) was measured to be 0.45 dL/g.

Further, the melt viscosity was measured, and the melt viscosity at 230° C. of the poly (phenylene ether ether ketone) oligomer (B) was 0.034 Pa·s.

Reference Example 2

Method for Producing Poly (Phenylene Ether Ether Ketone) Oligomer (B) [B2]

Here, a method for producing a poly (phenylene ether ether ketone) oligomer (B) will be described, which method uses the linear poly (phenylene ether ether ketone) produced as a by-product in the method for producing a poly (phenylene ether ether ketone) oligomer (B).

To a 100-mL autoclave equipped with a stirrer, 0.22 g (1 mmol) of 4,4'-difluoro benzophenone, 0.11 g (1 mmol) of hydroquinone, 0.14 g (1 mmol) of anhydrous potassium carbonate, 1.15 g (4 mmol) of the linear poly (phenylene ether ether ketone) obtained by the method described in Reference Example 1 (reduced viscosity; 0.45 dL/g), and 50 mL of N-methyl-2-pyrrolidone were loaded. The amount of N-methyl-2-pyrrolidone per 1.0 mol of the benzene ring component in the resulting mixture is 3.33 liters.

At room temperature and under normal pressure, the reaction vessel was hermetically sealed under nitrogen gas. Thereafter, with stirring at 400 rpm, the temperature was raised from room temperature to 140° C. and maintained at 140° C. for 1 hour. The temperature was then raised to 180° C. and maintained at 180° C. for 3 hours, and then the temperature was raised to 230° C. and maintained at 230° C. for 5 hours to allow the mixture to react.

About 0.2 g of the reaction mixture obtained was weighed and diluted with about 4.5 g of THF. THF-insoluble matter was separated and removed by filtration to prepare a sample for high-performance liquid chromatography analysis. The reaction mixture was analyzed to show that consecutive seven types of cyclic poly (phenylene ether ether ketone)s having a number of repeating units (m) of 2 to 8 were formed, and the yield of the cyclic poly (phenylene ether ether ketone) mixture was 8.3%.

Further, recovery of poly (phenylene ether ether ketone) oligomer (B) from the reaction mixture was performed according to the method described in Reference Example 1 to obtain a poly (phenylene ether ether ketone) oligomer (B) in 8.0% yield. The poly (phenylene ether ether ketone) oligomer (B) obtained was analyzed, and it was found that the weight fraction of the cyclic poly (phenylene ether ether ketone) mixture in the poly (phenylene ether ether ketone) oligomer (B) was 77%, and the poly (phenylene ether ether ketone) oligomer (B) had a melting point of 165° C. Further, it was also found that the poly (phenylene ether ether ketone) oligomer (B) had a reduced viscosity of less than 0.02 dL/g.

Further, the melt viscosity was measured, and the melt viscosity at 230° C. of the poly (phenylene ether ether ketone) oligomer (B) was 0.030 Pa·s.

Reference Example 3

Here, synthesis in accordance with the common method for producing a poly (phenylene ether ether ketone) described in Examples of JP 2007-506833 A will be described.

To a four-necked flask equipped with a stirrer, nitrogen inlet tube, Dean-Stark apparatus, condenser tube, and thermometer, 22.5 g (103 mmol) of 4,4'-difluoro benzophenone, 11.0 g (100 mmol) of hydroquinone, and 49 g of diphenyl sulfone were loaded. The amount of diphenyl sulfone per 1.0 mol of the benzene ring component in the resulting mixture is about 0.16 liters. The temperature was raised to 140° C. under nitrogen flow to form a substantially colorless solution. At this temperature, 10.6 g (100 mmol) of anhydrous sodium carbonate and 0.28 g (2 mmol) of anhydrous potassium carbonate were added thereto. The temperature was raised to 200° C. and maintained there for 1 hour, raised to 250° C. and maintained there for 1 hour, and then raised to 315° C. and maintained there for 3 hours.

The reaction mixture obtained was analyzed by high-performance liquid chromatography to show that the yield of the cyclic poly (phenylene ether ether ketone) mixture from hydroquinone was a trace amount of less than 1%.

The reaction mixture was allowed to cool and pulverized, and the resultant was washed with water and acetone to remove by-product salts and diphenyl sulfone. The polymer obtained was dried in a hot-air dryer at 120° C. to obtain powder.

About 1.0 g of the powder obtained was subjected to Soxhlet extraction at a bath temperature of 80° C. for 5 hours using 100 g of chloroform. The chloroform was removed from the resulting extract using an evaporator to obtain a small amount of chloroform soluble matter. The yield of the recovered chloroform soluble matter from hydroquinone used in the reaction was 1.2%. The recovered chloroform soluble matter was analyzed by high-performance liquid chromatography, and it was found that the chloroform soluble matter contained a cyclic poly (phenylene ether ether ketone) and a linear poly (phenylene ether ether ketone) oligomer. This linear poly (phenylene ether ether ketone) oligomer is a compound that is difficult to separate from the cyclic poly (phenylene ether ether ketone) because it is similar to the cyclic poly (phenylene ether ether ketone) in terms of properties such as solvent solubility. Further, the cyclic poly (phenylene ether ether ketone) mixture contained in the recovered chloroform soluble matter described above was composed of cyclic poly (phenylene ether ether ketone)s having a number of repeating units (m) of 4 and 5, and, furthermore, the weight fraction of cyclic poly (phenylene ether ether ketone) having a number of repeating units (m) of 4 was 80% or more. Further, the melting point of the recovered chloroform soluble matter was about 320° C. This is presumably due to the high content of the tetrameric cyclic poly (phenylene ether ether ketone) (m=4) in the chloroform soluble matter obtained by this method.

Further, in the Soxhlet extraction described above, the chloroform insoluble solid matter was subjected to vacuum drying at 70° C. overnight to obtain about 0.98 g of off-white solid matter. The solid matter was analyzed, and it was confirmed to be a linear poly (phenylene ether ether ketone) by the absorption spectrum obtained by infrared spectroscopic analysis. Further, the reduced viscosity of this linear poly (phenylene ether ether ketone) was measured to be 0.75 dL/g.

Further, the melt viscosity was measured, and the melt viscosity at 350° C. of the poly (phenylene ether ether ketone) oligomer (B) was 0.15 Pa·s.

Reference Example 4

Method for Producing Poly (Phenylene Ether Ether Ketone) Oligomer (B) [B3]

Here, a method for producing a cyclic poly (phenylene ether ether ketone) using the linear poly (phenylene ether ether ketone) (reduced viscosity; 0.75 dL/g) obtained by the method of Reference Example 3 will be described.

To a 1-L autoclave equipped with a stirrer, 14.4 g (50 mmol) of the poly (phenylene ether ether ketone) obtained by the method described in Reference Example 3, 1.52 g (10 mmol) of cesium fluoride, and 500 mL of N-methyl-2-pyrrolidone were loaded. The amount of N-methyl-2-pyrrolidone per 1.0 mol of the benzene ring component in the resulting mixture is 3.33 liters.

At room temperature and under normal pressure, the reaction vessel was hermetically sealed under nitrogen gas. Thereafter, with stirring at 400 rpm, the temperature was raised from room temperature to 140° C. and maintained at 140° C. for 1 hour. The temperature was then raised to 180° C. and maintained at 180° C. for 3 hours, and then the temperature was raised to 230° C. and maintained at 230° C. for 5 hours to allow the mixture to react.

About 0.2 g of the reaction mixture obtained was weighed and diluted with about 4.5 g of THF. THF-insoluble matter was separated and removed by filtration to prepare a sample for high-performance liquid chromatography analysis. The reaction mixture was analyzed to show that consecutive seven types of cyclic poly (phenylene ether ether ketone) mixture having a number of repeating units (m) of 2 to 8 were formed, and the yield of the cyclic poly (phenylene ether ether ketone) mixture was 13.7%. (The yield of the cyclic poly (phenylene ether ether ketone) mixture was calculated by comparing the amount of cyclic poly (phenylene ether ether ketone) formed with the amount of poly (phenylene ether ether ketone) used in the reaction.)

Further, recovery of poly (phenylene ether ether ketone) oligomer (B) from the reaction mixture was performed according to the method described in Reference Example 1 to obtain a poly (phenylene ether ether ketone) oligomer (B) in 13.7% yield. It was found that the weight fraction of the cyclic poly (phenylene ether ether ketone) mixture in the poly (phenylene ether ether ketone) oligomer (B) obtained was 79%, and the poly (phenylene ether ether ketone) oligomer (B) had a melting point of 165° C. Further, it was also found that the poly (phenylene ether ether ketone) oligomer (B) was less than 0.02 dL/g.

Further, the melt viscosity was measured, and the melt viscosity at 230° C. of the poly (phenylene ether ether ketone) oligomer (B) was 0.036 Pa·s.

<Molding Material>

Example 1

The poly (phenylene ether ether ketone) oligomer (B) prepared in Reference Example 1 was melted in a molten bath at 230° C. and fed to a kiss coater with a gear pump. The poly (phenylene ether ether ketone) oligomer (B) was applied from the kiss coater onto a roll heated to 230° C. to form a coating.

Carbon fibers "TORAYCA" (registered trademark) T700S-24K (available from TORAY INDUSTRIES, INC.) were passed in contact with the roll to deposit the poly (phenylene ether ether ketone) oligomer (B) thereon in a given amount per unit length of a reinforcing fiber bundle (A).

The carbon fiber with the poly (phenylene ether ether ketone) oligomer (B) deposited thereon was passed through 10 rolls heated to 230° C. (c): 50 mm) which are arranged alternately above and below on a straight line and freely rotate with the aid of bearings, whereby the poly (phenylene ether ether ketone) oligomer (B) was thoroughly impregnated into the reinforcing fiber bundle (A).

Next, VICTREX "PEEK" (registered trademark) 151G (polyether ether ketone) resin available from Victrex-MC, Inc., melting point: 343° C.) used as a thermoplastic resin (C) was melted in a single-screw extruder at 400° C. The melted thermoplastic resin (C) was extruded into a crosshead die mounted at the end of the extruder, and simultaneously therewith, the composite obtained was continuously fed into the crosshead die, whereby the composite was coated with the melted thermoplastic resin (C). In this process, the discharge rate of the thermoplastic resin (C) was adjusted to adjust the content of the reinforcing fiber bundle (A) to a predetermined value.

The strand obtained by the method described above was cooled and then cut with a cutter to a length of 7 mm to obtain columnar pellets (long-fiber pellets) having a core-sheath structure. The long-fiber pellets obtained did not have fuzz due to transportation and exhibited good handleability.

The long-fiber pellets obtained were dried under vacuum at 150° C. for 5 hours or more. The dried long-fiber pellets were subjected to molding using molds for various test pieces using an injection molding machine Model J150EII-P manufactured by Japan Steel Works, LTD. Conditions were as follows: injection molding temperature: 400° C., mold temperature: 160° C., and cooling time: 30 seconds. After molding, the resulting molded article was dried under vacuum at 80° C. for 12 hours and stored in a desiccator at room temperature for 3 hours, and the resulting dried test piece was evaluated. The flexural test of the molded article obtained was carried out in accordance with ASTM D790 (1997) to measure the flexural strength and flexural modulus under test conditions of a support span of 100 mm, which was set using a 3-point bend fixture (indenter: 10 mm, fulcrum: 4 mm), and a crosshead speed of 2.8 mm/min. "INSTRON" (registered trademark) universal tester Model 4201 (manufactured by INSTRON) was used as a tester. For Izod impact test of the molded article obtained, a mold notched Izod impact test was performed in accordance with ASTM D256 (1993). The test piece with a thickness of 3.2 mm and a moisture content of 0.1 wt % or less was used to measure the Izod impact strength (J/m). Evaluation results are shown in Table 1.

Example 2

Columnar pellets (long-fiber pellets) having a core-sheath structure were prepared in the same manner as in Example 1 except that the poly (phenylene ether ether ketone) oligomer (B) prepared in Reference Example 2 was used. Injection molding was carried out in the same manner as in Example 1 using the long-fiber pellets obtained, and evaluations were carried out. The process conditions and the evaluation results are shown in Table 1.

Comparative Example 1

Columnar pellets (long-fiber pellets) having a core-sheath structure were prepared in the same manner as in Example 1 except that the poly (phenylene ether ether ketone) oligomer (B) prepared in Reference Example 3 was used and that the molten bath temperature, the roll temperature, and the bearing temperature were changed to 340° C. Injection molding was carried out in the same manner as in Example 1 using the long-fiber pellets obtained, and evaluations were carried out. The process conditions and the evaluation results are shown in Table 1.

Example 3

Columnar pellets (long-fiber pellets) having a core-sheath structure were prepared in the same manner as in Example 1 except that the poly (phenylene ether ether ketone) oligomer (B) prepared in Reference Example 4 was used. Injection molding was carried out in the same manner as in Example 1 using the long-fiber pellets obtained, and evaluations were carried out. The process conditions and the evaluation results are shown in Table 1.

It is clear from the results of Examples 1 to 3 that regardless of the method for producing a poly (phenylene ether ether ketone) oligomer (B), by using a poly (phenylene ether ether ketone) oligomer (B) having a melting point of not higher than 270° C., the poly (phenylene ether ether ketone) oligomer (B) excellently impregnates into a continuous reinforcing fiber bundle (A), and a molding material can be easily produced. The molded article obtained by using the resulting molding material had excellent dynamic properties and appearance quality.

It is clear from Comparative Example 1 that when a poly (phenylene ether ether ketone) composition having a melting point of higher than 270° C. is used, the poly (phenylene ether ether ketone) composition is difficult to melt, resulting in poor impregnation into a continuous reinforcing fiber bundle (A). Moreover, this molding material is also poor in fiber dispersibility during molding, and the molded article obtained by using this molding material was observed to have defects in appearance.

Example 4

Columnar pellets (long-fiber pellets) having a core-sheath structure were prepared in the same manner as in Example 1 except that the amount of the poly (phenylene ether ether ketone) oligomer (B) prepared in Reference Example 1 was changed to 18 wt % and that the amount of the thermoplastic resin (C) was changed to 62 wt %. Injection molding was carried out in the same manner as in Example 1 using the long-fiber pellets obtained, and evaluations were carried out. The process conditions and the evaluation results are shown in Table 1.

Comparative Example 2

Production of columnar pellets (long-fiber pellets) having a core-sheath structure was attempted in the same manner as in Example 1 except that the poly (phenylene ether ether ketone) oligomer (B) and a molten bath were not used and that the amount of the thermoplastic resin (C) was changed to 80 wt %, but a large number of molding materials were defective products. Injection molding was attempted in the same manner as in Example 1 using the long-fiber pellets obtained, but the molding could not be achieved because of a poor bite into a screw. The process conditions are shown in Table 1.

Comparative Example 3

Columnar pellets (long-fiber pellets) having a core-sheath structure were prepared in the same manner as in Example 1 except that the amount of the poly (phenylene ether ether ketone) oligomer (B) prepared in Reference Example 1 was changed to 30 wt % and that the amount of the thermoplastic resin (C) was changed to 50 wt %. Injection molding was carried out in the same manner as in Example 1 using the long-fiber pellets obtained, and evaluations were carried out. The process conditions and the evaluation results are shown in Table 1.

It is clear from Example 4 that even when the amount of the poly (phenylene ether ether ketone) oligomer (B) is 18 wt %, the poly (phenylene ether ether ketone) oligomer (B) excellently impregnates into a continuous reinforcing fiber bundle (A), and a molding material is easily produced. The molded article obtained by using the resulting molding material had excellent appearance quality.

It is clear from Comparative Example 2 that when the poly (phenylene ether ether ketone) oligomer (B) is not used, the productivity and moldability of the molding material are very poor because the continuous reinforcing fiber bundle (A) is poorly impregnated only with the high-viscosity thermoplastic resin (C).

It is clear from Comparative Example 3 that when the amount of the poly (phenylene ether ether ketone) oligomer (B) is 30 wt %, the productivity of the molding material is excellent, but the molded article obtained by using the resulting molding material has very poor dynamic properties.

Example 5

Columnar pellets (long-fiber pellets) having a core-sheath structure were prepared in the same manner as in Example 1 except that the amount of the poly (phenylene ether ether ketone) oligomer (B) prepared in Reference Example 1 was changed to 3 wt %; the amount of the thermoplastic resin (C) was changed to 87 wt %; and the amount of the reinforcing fiber bundle (A) was changed to 10 wt %. Injection molding was carried out in the same manner as in Example 1 using the long-fiber pellets obtained, and evaluations were carried out. The process conditions and the evaluation results are shown in Table 1.

Example 6

Columnar pellets (long-fiber pellets) having a core-sheath structure were prepared in the same manner as in Example 1 except that the amount of the poly (phenylene ether ether ketone) oligomer (B) prepared in Reference Example 1 was changed to 15 wt %; the amount of the thermoplastic resin (C) was changed to 55 wt %; and the amount of the reinforcing fiber bundle (A) was changed to 30 wt %. Injection molding was carried out in the same manner as in Example 1 using the long-fiber pellets obtained, and evaluations were carried out. The process conditions and the evaluation results are shown in Table 1.

It is clear from Examples 5 and 6 that by using a poly (phenylene ether ether ketone) oligomer (B) having a melting point of not higher than 270° C., even when the fiber contents of the molding materials are 10 wt % and 30 wt %, the poly (phenylene ether ether ketone) oligomer (B) excellently impregnates into a continuous reinforcing fiber bundle (A); the productivity of the molding material is excellent; and a molding material can be easily produced. The molded article obtained by using the resulting molding material had excellent dynamic properties and appearance quality.

Example 7

Columnar pellets (long-fiber pellets) having a core-sheath structure were prepared in the same manner as in Example 1 except that "AMILAN" (registered trademark) CM3001 (nylon 66 resin available from TORAY INDUSTRIES, INC., melting point: 265° C.) was used as a thermoplastic resin (C) in place of poly (phenylene ether ether ketone) and that the extrusion temperature of the thermoplastic resin (C) during the production of a molding material was 280° C. Injection molding was carried out in the same manner as in Example 1 except that using the long-fiber pellets obtained, the injection molding temperature and the mold temperature were changed to 300° C. and 80° C., respectively, and evaluations were carried out. The process conditions and the evaluation results are shown in Table 1.

Example 8

Columnar pellets (long-fiber pellets) having a core-sheath structure were prepared in the same manner as in Example 1 except that "TORELINA" (registered trademark) A900 (polyphenylene sulfide resin available from TORAY INDUSTRIES, INC., melting point: 278° C.) was used as a thermoplastic resin (C) in place of poly (phenylene ether ether ketone) and that the extrusion temperature of the thermoplastic resin (C) during the production of a molding material was 330° C. Injection molding was carried out in the same manner as in Example 1 except that using the long-fiber pellets obtained, the injection molding temperature and the mold temperature were changed to 320° C. and 150° C., respectively, and evaluations were carried out. The process conditions and the evaluation results are shown in Table 1.

It is clear from Examples 7 and 8 that by using a poly (phenylene ether ether ketone) oligomer (B) having a melting point of not higher than 270° C., the molding temperature of the resulting molding material can be lowered, which allows resins other than poly (phenylene ether ether ketone) resin, such as nylon 66 resin and PPS resin, to be selected as a thermoplastic resin (C). The molding material obtained was excellent in fiber dispersibility during molding and had excellent dynamic properties and appearance quality.

Example 9

Columnar pellets (long-fiber pellets) having a core-sheath structure were prepared in the same manner as in Example 1 except that cesium fluoride was added as a polymerization catalyst (D) to a molten bath in an amount of 5 mol % based on the repeating unit of the formula: —(O-Ph-O-Ph-CO-Ph)-, which is a main structural unit of the poly (phenylene ether ether ketone) oligomer (B) prepared in Reference Example 1. Injection molding was carried out in the same manner as in Example 1 using the long-fiber pellets obtained, and evaluations were carried out. The process conditions and the evaluation results are shown in Table 1.

It is clear from Example 9 that by using a poly (phenylene ether ether ketone) oligomer (B) having a melting point of not higher than 270° C. and adding a polymerization catalyst (D) to the molding material of the present invention, the molded article obtained by using the resulting molding material has excellent dynamic properties and appearance quality.

TABLE 1

| | | Example 1 | Example 2 | Comparative Example 1 | Example 3 | Example 4 | Comparative Example 2 | Comparative Example 3 | Example 5 | Example 6 | Example 7 | Example 8 | Example 9 |
|---|---|---|---|---|---|---|---|---|---|---|---|---|---|
| (Composition) | | | | | | | | | | | | | |
| Component (A): Carbon fiber | wt % | 20 | 20 | 20 | 20 | 20 | 20 | 20 | 10 | 30 | 20 | 20 | 20 |
| Component (B): Poly (phenylene ether ether ketone) oligomer | Type | Reference Example 1 | Reference Example 2 | Reference Example 3 | Reference Example 4 | Reference Example 1 | — | Reference Example 1 | Reference Example 1 | Reference Example 1 | Reference Example 1 | Reference Example 1 | Reference Example 1 |
| | wt % | 5 | 5 | 5 | 5 | 19 | — | 30 | 3 | 15 | 5 | 5 | 5 |
| Component (C): Thermoplastic resin | Type | PEEK | PEEK | PEEK | PEEK | PEEK | PEEK | PEEK | PEEK | PEEK | Nylon | PPS | PEEK |
| | wt % | 75 | 75 | 75 | 75 | 62 | 80 | 50 | 87 | 55 | 75 | 75 | 75 |
| Component (D): Polymerization catalyst | Type | — | — | — | — | — | — | — | — | — | — | — | CsF |
| | mol % | | | | | | | | | | | | 5 |
| (Process conditions) | | | | | | | | | | | | | |
| Molten bath temperature | °C | 230 | 230 | 340 | 230 | 230 | 230 | 230 | 230 | 230 | 230 | 230 | 230 |
| Roll temperature | °C | 230 | 230 | 340 | 230 | 230 | 230 | 230 | 230 | 230 | 230 | 230 | 230 |
| Bearing temperature | °C | 230 | 230 | 340 | 230 | 230 | 230 | 230 | 230 | 230 | 230 | 230 | 230 |
| Extrusion temperature | °C | 400 | 400 | 400 | 400 | 400 | 400 | 400 | 400 | 400 | 280 | 330 | 400 |
| Injection-molding temperature | °C | 400 | 400 | 400 | 400 | 400 | 400 | 400 | 400 | 400 | 300 | 320 | 400 |
| Mold temperature | °C | 160 | 160 | 160 | 160 | 160 | 160 | 160 | 160 | 160 | 80 | 150 | 160 |
| Productivity evaluation of molding material | — | good | good | bad | good | good | bad | fair | good | good | good | good | good |
| (Properties of Molded article) | | | | | | | | | | | | | |
| Number-average fiber length | mm | 0.50 | 0.45 | 0.40 | 0.45 | 0.55 | — | 0.55 | 0.60 | 0.40 | 0.50 | 0.50 | 0.45 |
| Weight-average fiber length | mm | 0.70 | 0.60 | 0.55 | 0.60 | 0.75 | — | 0.80 | 0.75 | 0.60 | 0.65 | 0.65 | 0.60 |
| Density | g/cm³ | 1.37 | 1.37 | 1.36 | 1.37 | 1.37 | — | 1.37 | 1.34 | 1.41 | 1.23 | 1.41 | 1.37 |
| Flexural modulus | G a | 15 | 15 | 15 | 15 | 15 | — | 13 | 10 | 20 | 14 | 16 | 15 |
| Flexural strength | MPa | 260 | 255 | 235 | 260 | 220 | — | 130 | 200 | 330 | 320 | 240 | 265 |
| Izod impact | J/m | 120 | 115 | 95 | 120 | 110 | — | 30 | 90 | 140 | 100 | 85 | 120 |
| Appearance evaluation | — | excellent | excellent | fair | excellent | excellent | — | excellent | excellent | excellent | good | good | excellent |

Example 10

To the poly (phenylene ether ether ketone) oligomer (B) prepared in Reference Example 1, cesium fluoride was added as a polymerization catalyst (D) in an amount of mol % based on the repeating unit of the formula: —(O-Ph-O-Ph-CO-Ph)-, which is a main structural unit of the poly (phenylene ether ether ketone) oligomer (B), and the resulting mixture was melted in a molten bath at 230° C. to obtain a molten mixture. The molten mixture obtained was fed to a kiss coater with a gear pump. The molten mixture was applied from the kiss coater onto a roll heated to 230° C. to form a coating.

Carbon fibers "TORAYCA" (registered trademark) T700S-24K (available from TORAY INDUSTRIES, INC.) were passed in contact with the roll to obtain a composite on which the molten mixture was deposited in a given amount per unit length of a reinforcing fiber bundle (A).

The composite was fed into a furnace heated at 300° C., passed through 10 rolls (φ: 50 mm) that are arranged alternately above and below on a straight line and freely rotate with the aid of bearings, and passed through 10 roll bars (φ: 200 mm) placed in the furnace in a zigzag pattern more than once in loops. In such a manner, it spended 30 minutes in total to convert the poly (phenylene ether ether ketone) oligomer (B) into a poly (phenylene ether ether ketone) (B') while being impregnated thoroughly into a reinforcing fiber bundle (A).

Next, VICTREX "PEEK" (registered trademark) 151G (polyether ether ketone resin available from Victrex-MC, Inc., melting point: 343° C.) used as a thermoplastic resin (C) was melted in a single-screw extruder at 400° C. The melted thermoplastic resin (C) was extruded into a crosshead die mounted at the end of the extruder, and simultaneously therewith, the composite obtained was continuously fed into the crosshead die, whereby the composite was coated with the melted thermoplastic resin (C). In this process, the discharge rate of the thermoplastic resin (C) was adjusted to adjust the content of the reinforcing fiber bundle (A) to a predetermined value.

The strand obtained by the method described above was cooled and then cut with a cutter to a length of 7 mm to obtain columnar pellets (long-fiber pellets) having a core-sheath structure. The long-fiber pellets obtained did not have fuzz due to transportation and exhibited good handleability.

From the long-fiber pellets obtained, the coating of the thermoplastic resin (C) was peeled off, and further the reinforcing fibers (A) were removed, thereby separating the poly (phenylene ether ether ketone) (B'). The poly (phenylene ether ether ketone) (B') obtained here was subjected to melting point measurement and viscosity measurement.

The long-fiber pellets obtained were dried under vacuum at 150° C. for 5 hours or more. The dried long-fiber pellets were subjected to molding using molds for various test pieces using an injection molding machine Model J150EII-P manufactured by Japan Steel Works, LTD. Conditions were as follows: injection molding temperature: 400° C., mold temperature: 160° C., and cooling time: 30 seconds. After molding, the resulting molded article was dried under vacuum at 80° C. for 12 hours and stored in a desiccator at room temperature for 3 hours, and the resulting dried test piece was evaluated. The flexural test of the molded article obtained was carried out in accordance with ASTM D790 (1997) to measure the flexural strength and flexural modulus under test conditions of a support span of 100 mm, which was set using a 3-point bend fixture (indenter: 10 mm, fulcrum: 4 mm), and a crosshead speed of 2.8 mm/min. "INSTRON" (registered trademark) universal tester Model 4201 (manufactured by INSTRON) was used as a tester. For Izod impact test of the molded article obtained, a mold notched Izod impact test was performed in accordance with ASTM D256 (1993). The test piece with a thickness of 3.2 mm and a moisture content of 0.1 wt % or less was used to measure the Izod impact strength (J/m). The process conditions and the evaluation results are shown in Table 2.

Example 11

Columnar pellets (long-fiber pellets) having a core-sheath structure were prepared in the same manner as in Example 10 except that the poly (phenylene ether ether ketone) oligomer (B) prepared in Reference Example 2 was used. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

Comparative Example 4

Production of columnar pellets (long-fiber pellets) having a core-sheath structure was attempted in the same manner as in Example 10 except that the poly (phenylene ether ether ketone) oligomer (B) prepared in Reference Example 3 was used and that the molten bath temperature, the roll temperature, and the furnace temperature were changed to 350° C., but a large number of molding materials were defective products. This was because polymerization of the poly (phenylene ether ether ketone) oligomer (B) into a poly (phenylene ether ether ketone) (B') proceeded in the molten bath, and impregnation into a continuous reinforcing fiber bundle (A) became difficult. Using the long-fiber pellets obtained, the poly (phenylene ether ether ketone) (B') was separated in the same manner as in Example 10 and subjected to melting point measurement and viscosity measurement. Injection molding was attempted in the same manner as in Example 10 using the long-fiber pellets obtained, but the molding could not be achieved because of a poor bite into a screw. The process conditions and the evaluation results are shown in Table 2.

Example 12

Columnar pellets (long-fiber pellets) having a core-sheath structure were prepared in the same manner as in Example 10 except that the poly (phenylene ether ether ketone) oligomer (B) prepared in Reference Example 4 was used. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

It is clear from the results of Examples 10 to 12 that regardless of the method for producing a poly (phenylene ether ether ketone) oligomer (B), by using a poly (phenylene ether ether ketone) oligomer (B) having a melting point of not higher than 270° C., the poly (phenylene ether ether ketone) oligomer (B) excellently impregnates into a continuous reinforcing fiber bundle (A), and a molding material can be easily produced. In the molding material obtained, the poly (phenylene ether ether ketone) oligomer (B) was polymerized into a poly (phenylene ether ether ketone) (B'), and the molded article obtained by using this molding material had excellent dynamic properties.

It is clear from Comparative Example 4 that when a poly (phenylene ether ether ketone) composition having a melting point of higher than 270° C. is used, it is necessary to set the process temperature high, and polymerization of the poly (phenylene ether ether ketone) composition proceeds in the molten bath, resulting in significantly reduced impregnation into the reinforcing fiber bundle (A). It is clear that this molding material is not only significantly inferior in terms of productivity and moldability but also inferior in terms of economic efficiency because it is necessary to set the process temperature high.

Example 13

Columnar pellets (long-fiber pellets) having a core-sheath structure were prepared in the same manner as in Example 10 except that the amount of the poly (phenylene ether ether ketone) oligomer (B) prepared in Reference Example 1 was changed to 18 wt % and that the amount of the thermoplastic resin (C) was changed to 62 wt %. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

Example 14

Columnar pellets (long-fiber pellets) having a core-sheath structure were prepared in the same manner as in Example 10 except that the amount of the poly (phenylene ether ether ketone) oligomer (B) prepared in Reference Example 1 was changed to 30 wt % and that the amount of the thermoplastic resin (C) was changed to 50 wt %. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

Comparative Example 5

Columnar pellets (long-fiber pellets) having a core-sheath structure were prepared in the same manner as in Example 14 except that cesium fluoride serving as a polymerization catalyst (D) was not used. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

Comparative Example 6

Production of columnar pellets (long-fiber pellets) having a core-sheath structure was attempted in the same manner as in Example 10 except that the poly (phenylene ether ether ketone) oligomer (B), cesium fluoride serving as a polymerization catalyst (D), and a molten bath were not used and that the amount of the thermoplastic resin (C) was changed to 80 wt %, but a large number of molding materials were defective products. Injection molding was attempted in the same manner as in Example 10 using the long-fiber pellets obtained, but the molding could not be achieved because of a poor bite into a screw. The process conditions are shown in Table 2.

It is clear from Examples 13 and 14 that even when the amounts of the poly (phenylene ether ether ketone) oligomer (B) is 18 wt % and 30 wt %, the poly (phenylene ether ether ketone) oligomer (B) excellently impregnates into a continuous reinforcing fiber bundle (A), and a molding material is easily produced. In the molding material obtained, the poly (phenylene ether ether ketone) oligomer (B) was polymerized into a poly (phenylene ether ether ketone) (B'), and the molded article obtained by using this molding material had excellent dynamic properties.

Comparison between Comparative Example 5 and Example 14 reveals the following. It is clear that in Comparative Example 5, the poly (phenylene ether ether ketone) oligomer (B) is not polymerized into a poly (phenylene ether ether ketone) (B') in the molding material obtained because cesium fluoride serving as a polymerization catalyst (D) is not used. Further, it is clear that Comparative Example 5 is significantly inferior to Example 14 in dynamic properties.

It is clear from Comparative Example 6 that when the poly (phenylene ether ether ketone) oligomer (B) and the polymerization catalyst (D) are not used, the productivity and moldability of the molding material are very poor because the continuous reinforcing fiber bundle (A) is poorly impregnated only with the high-viscosity thermoplastic resin (C).

Example 15

Columnar pellets (long-fiber pellets) having a core-sheath structure were prepared in the same manner as in Example 10 except that the furnace temperature was changed to 350° C. and that the furnace time was changed to 10 minutes. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

Example 16

Columnar pellets (long-fiber pellets) having a core-sheath structure were prepared in the same manner as in Example 10 except that the furnace temperature was changed to 400° C. and that the furnace time was changed to 10 minutes. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

It is clear from Examples 15 and 16 that even when the furnace temperatures are 350° C. and 400° C., the poly (phenylene ether ether ketone) oligomer (B) excellently impregnates into a continuous reinforcing fiber bundle (A), and a molding material is easily produced. In the molding material obtained, the poly (phenylene ether ether ketone) oligomer (B) was polymerized into a poly (phenylene ether ether ketone) (B'), and the molded article obtained by using this molding material had excellent dynamic properties. Further, the poly (phenylene ether ether ketone) (B') in the molding material produced under these conditions had a melting enthalpy of less than 40 kJ/g, which was equivalent to that of known poly (phenylene ether ether ketone).

Example 17

Columnar pellets (long-fiber pellets) having a core-sheath structure were prepared in the same manner as in Example 10 except that the amount of the poly (phenylene ether ether ketone) oligomer (B) prepared in Reference Example 1 was changed to 3 wt %; the amount of the thermoplastic resin (C) was changed to 87 wt %; and the amount of the reinforcing fiber bundle (A) was changed to 10 wt %. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

Example 18

Columnar pellets (long-fiber pellets) having a core-sheath structure were prepared in the same manner as in Example 10 except that the amount of the poly (phenylene ether ether ketone) oligomer (B) prepared in Reference Example 1 was changed to 15 wt %; the amount of the thermoplastic resin (C) was changed to 55 wt %; and the amount of the reinforcing fiber bundle (A) was changed to 30 wt %. Using the long-fiber pellets obtained, the poly (phenylene ether ether ketone) (B') was separated in the same manner as in Example 10 and subjected to melting point measurement and viscosity measurement. Using the long-fiber pellets obtained, injection molding was carried out in the same manner as in Example 10, and evaluations were carried out. The process conditions and the evaluation results are shown in Table 2.

It is clear from Examples 17 and 18 that even when the fiber contents of the molding materials are 10 wt % and 30 wt %, the poly (phenylene ether ether ketone) oligomer (B) excellently impregnates into a continuous reinforcing fiber bundle (A), and a molding material is easily produced. In the molding material obtained, the poly (phenylene ether ether ketone) oligomer (B) was polymerized into a poly (phenylene ether ether ketone) (B'), and the molded article obtained by using this molding material had excellent dynamic properties.

TABLE 2

|  |  | Example 10 | Example 11 | Comparative Example 4 | Example 12 | Example 13 | Example 14 | Comparative Example 5 |
|---|---|---|---|---|---|---|---|---|
| (Composition) |  |  |  |  |  |  |  |  |
| Component (A): Carbon fiber | wt % | 20 | 20 | 20 | 20 | 20 | 20 | 20 |
| Component (B): Poly (phenylene ether ether ketone) oligomer | Type | Reference Example 1 | Reference Example 2 | Reference Example 3 | Reference Example 4 | Reference Example 1 | Reference Example 1 | Reference Example 1 |
|  | wt % | 5 | 5 | 5 | 5 | 18 | 30 | 30 |
| Component (C): Thermoplastic resin | Type | PEEK | PEEK | PEEK | PEEK | PEEK | PEEK | PEEK |
|  | wt % | 75 | 75 | 75 | 75 | 62 | 50 | 50 |
| Component (D): Polymerization catalyst | Type | CsF | CsF | CsF | CsF | CsF | CsF | — |
|  | mol % | 5 | 5 | 5 | 5 | 5 | 5 | — |
| (Properties of Poly (phenylene ether ether ketone) (B')) |  |  |  |  |  |  |  |  |
| Melting point | ° C. | 347 | 349 | 334 | 349 | 348 | 350 | 278 |
| Fusion enthalpy | J/g | 54 | 51 | 30 | 53 | 55 | 56 | — |
| Reduced viscosity | dL/g | 0.5 | 0.5 | 0.6 | 0.5 | 0.5 | 0.5 | — |
| (Process conditions) |  |  |  |  |  |  |  |  |
| Molten bath temperarute | ° C. | 230 | 230 | 350 | 230 | 230 | 230 | 230 |
| Roll temperature | ° C. | 230 | 230 | 350 | 230 | 230 | 230 | 230 |
| Furnace temperature | ° C. | 300 | 300 | 350 | 300 | 300 | 300 | 300 |
| Furnace residence time | min | 30 | 30 | 30 | 30 | 30 | 30 | 30 |
| Extrusion temperature | ° C. | 400 | 400 | 400 | 400 | 400 | 400 | 400 |
| Injection-molding temperature | ° C. | 400 | 400 | 400 | 400 | 400 | 400 | 400 |
| Mold temperature | ° C. | 160 | 160 | 160 | 160 | 160 | 160 | 160 |
| (Productivity of molding material) |  |  |  |  |  |  |  |  |
| Productivity evaluation of molding material | — | good | good | bad | good | good | good | good |
| (Properties of Moled article) |  |  |  |  |  |  |  |  |
| Number-average fiber length | mm | 0.45 | 0.45 | — | 0.40 | 0.45 | 0.45 | 0.55 |
| Weight-average fiber length | mm | 0.65 | 0.60 | — | 0.65 | 0.65 | 0.65 | 0.75 |
| Density | g/cm$^3$ | 1.37 | 1.37 | — | 1.37 | 1.37 | 1.37 | 1.37 |
| Flexural modulus | GPa | 15 | 15 | — | 15 | 15 | 15 | 13 |
| Flexural strength | MPa | 270 | 270 | — | 275 | 265 | 260 | 130 |
| Izod impact | J/m | 120 | 120 | — | 115 | 110 | 110 | 30 |

TABLE 2-continued

|  |  | Comparative Example 6 | Example 15 | Example 16 | Example 17 | Example 18 |
|---|---|---|---|---|---|---|
| (Composition) | | | | | | |
| Component (A): Carbon fiber | wt % | 20 | 20 | 20 | 10 | 30 |
| Component (B): Poly (phenylene ether ether ketone) oligomer | Type | — | Reference Example 1 | Reference Example 1 | Reference Example 1 | Reference Example 1 |
| | wt % | — | 5 | 5 | 3 | 15 |
| Component (C): Thermoplastic resin | Type | PEEK | PEEK | PEEK | PEEK | PEEK |
| | wt % | 80 | 75 | 75 | 87 | 55 |
| Component (D): Polymerization catalyst | Type | — | CsF | CsF | CsF | CsF |
| | mol % | — | 5 | 5 | 5 | 5 |
| (Properties of Poly (phenylene ether ether ketone) (B')) | | | | | | |
| Melting point | ° C. | — | 332 | 330 | 347 | 347 |
| Fusion enthalpy | J/g | — | 38 | 36 | 54 | 54 |
| Reduced viscosity | dL/g | — | 0.6 | 0.7 | 0.5 | 0.5 |
| (Process conditions) | | | | | | |
| Molten bath temperarute | ° C. | — | 230 | 230 | 230 | 230 |
| Roll temperature | ° C. | 230 | 230 | 230 | 230 | 230 |
| Furnace temperature | ° C. | 230 | 350 | 400 | 300 | 300 |
| Furnace residence time | min | 30 | 10 | 10 | 30 | 30 |
| Extrusion temperature | ° C. | 400 | 400 | 400 | 400 | 400 |
| Injection-molding temperature | ° C. | 400 | 400 | 400 | 400 | 400 |
| Mold temperature | ° C. | 160 | 160 | 160 | 160 | 160 |
| (Productivity of molding material) | | | | | | |
| Productivity evaluation of molding material | — | bad | fair | fair | good | good |
| (Properties of Moled article) | | | | | | |
| Number-average fiber length | mm | — | 0.40 | 0.40 | 0.60 | 0.40 |
| Weight-average fiber length | mm | — | 0.60 | 0.55 | 0.75 | 0.55 |
| Density | g/cm$^3$ | — | 1.37 | 1.37 | 1.34 | 1.41 |
| Flexural modulus | GPa | — | 15 | 15 | 10 | 20 |
| Flexural strength | MPa | — | 275 | 280 | 210 | 335 |
| Izod impact | J/m | — | 120 | 125 | 95 | 140 |

Example 19

To the poly (phenylene ether ether ketone) oligomer (B) prepared in Reference Example 1, cesium fluoride was added as a polymerization catalyst (D) in an amount of mol % based on the repeating unit of the formula: —(O-Ph-O-Ph-CO-Ph)-, which is a main structural unit of the poly (phenylene ether ether ketone) oligomer (B), and the resulting mixture was melted in a molten bath at 230° C. to obtain a molten mixture. Using a knife coater, the molten mixture was applied to release paper to a given thickness at 230° C. to produce a resin film.

Next, two resin films were laminated on both surfaces of carbon fibers "TORAYCA" (registered trademark) T700S-24K (available from TORAY INDUSTRIES, INC.) which was unidirectionally arranged in the form of a sheet, and using rolls heated to 230° C., the carbon fibers were impregnated with the molten mixture by applying a roll pressure of 0.2 MPa to prepare a unidirectional prepreg. The unidirectional prepreg obtained was cut to a predetermined size, and evaluation of the content of the reinforcing fiber substrate (A'), evaluation of the impregnation rate of the poly (phenylene ether ether ketone) oligomer (B), and evaluation of the drape property of a molding material were carried out.

The unidirectional prepregs obtained were aligned in the fiber direction and laminated such that a molded article has a thickness of 2±0.4 mm, and then hot-pressed using a press molding machine at a mold surface temperature of 300° C. under a molding pressure of 0.5 MPa for a heating time of 30 minutes to convert the poly (phenylene ether ether ketone) oligomer (B) into a poly (phenylene ether ether ketone) (B'). Soon after the hot-pressing, the press molding machine was opened, and the molded article was demolded to obtain a laminated plate using the molding material of the present invention. The poly (phenylene ether ether ketone) (B') was physically separated from the laminated plate obtained here and subjected to melting point measurement, melting enthalpy measurement, and viscosity measurement. Further, the laminated plate obtained was cut to a predetermined size and subjected to flexural test and void fraction evaluation of the molded article. In the flexural test of the molded article, the molding materials were laminated in unidirectional alignment in the fiber direction, and a test piece having a size in accordance with JIS K 7074-1988 was cut out from the molded article having a thickness of 2±0.4 mm with the fiber axis direction as the long side. "INSTRON" (registered trademark) universal tester Model 4201 (manufactured by INSTRON) was used as a tester, and a 3-point flexural test was performed to determine the 0° flexural modulus and 0° flexural strength. The process conditions and the evaluation results are shown in Table 3.

Example 20

A unidirectional prepreg was prepared in the same manner as in Example 19 except that the poly (phenylene ether ether ketone) oligomer (B) prepared in Reference Example 2 was used. Using the unidirectional prepreg obtained, evaluations of the molding material were carried out in the same manner as in Example 19.

Using the unidirectional prepreg obtained, press molding was carried out in the same manner as in Example 19, and the laminated plate obtained was evaluated. The process conditions and the evaluation results are shown in Table 3.

Comparative Example 7

Production of a unidirectional prepreg was attempted in the same manner as in Example 19 except that the poly (phenylene ether ether ketone) oligomer (B) prepared in Reference Example 3 was used; the resin melting temperature, the film-forming temperature, and the fiber impregnation temperature were changed to 350° C.; and the roll pressure for fiber impregnation was changed to 0.5 MPa, but the resin did not impregnate into the reinforcing fiber substrate (A'). This was because due to high process temperature, polymerization of the poly (phenylene ether ether ketone) oligomer (B) into a poly (phenylene ether ether ketone) (B') proceeded, and impregnation into the reinforcing fiber substrate (A') became difficult. Using the unidirectional prepreg obtained, evaluations of the molding material were carried out in the same manner as in Example 19.

Press molding was carried out in the same manner as in Example 19 except that the unidirectional prepreg obtained was hot-pressed at a mold surface temperature of 400° C. and then the mold was cooled to 150° C. at 10° C./min before demolding a molded article. The laminated plate obtained was evaluated. The process conditions and the evaluation results are shown in Table 3.

Example 21

A unidirectional prepreg was prepared in the same manner as in Example 19 except that the poly (phenylene ether ether ketone) oligomer (B) prepared in Reference Example 4 was used. Using the unidirectional prepreg obtained, evaluations of the molding material were carried out in the same manner as in Example 19.

Using the unidirectional prepreg obtained, press molding was carried out in the same manner as in Example 19, and the laminated plate obtained was evaluated. The process conditions and the evaluation results are shown in Table 3.

It is clear from the results of Examples 19 to 21 that regardless of the method for producing a poly (phenylene ether ether ketone) oligomer (B), by using a poly (phenylene ether ether ketone) oligomer (B) having a melting point of not higher than 270° C., the poly (phenylene ether ether ketone) oligomer (B) excellently impregnates into a reinforcing fiber substrate (A'), and a molding material can be easily produced. In the molding material obtained, the poly (phenylene ether ether ketone) oligomer (B) was polymerized into a poly (phenylene ether ether ketone) (B'), and the molded article obtained by using this molding material had excellent dynamic properties.

It is clear from Comparative Example 7 that when a poly (phenylene ether ether ketone) composition having a melting point of higher than 270° C. is used, it is necessary to set the process temperature high, and polymerization of the poly (phenylene ether ether ketone) composition proceeds in the molten bath or the like, resulting in significantly reduced impregnation into the reinforcing fiber substrate (A'). Further, it is clear that since it is necessary to set the process temperature high, this molding material is inferior in terms of economic efficiency, and the resulting molded article also has poor dynamic properties.

Comparative Example 8

A unidirectional prepreg was prepared in the same manner as in Example 19 except that cesium fluoride serving as a polymerization catalyst (D) was not used. Using the unidirectional prepreg obtained, evaluations of the molding material were carried out in the same manner as in Example 19.

Press molding was carried out in the same manner as in Example 19 except that the unidirectional prepreg obtained was hot-pressed with a pressing machine and then the mold was cooled to 150° C. at 10° C./min before demolding a molded article. The laminated plate obtained was subjected to melting point measurement, and it was found that the melting point remained as low as 276° C. The process conditions and the evaluation results are shown in Table 3.

It is clear from Comparative Example 8 that in the molding material to which a polymerization catalyst (D) is not added, polymerization of the poly (phenylene ether ether ketone) oligomer (B) into a poly (phenylene ether ether ketone) (B') does not proceed during molding.

Comparative Example 9

Production of a unidirectional prepreg was attempted in the same manner as in Example 19 except that VICTREX "PEEK" (registered trademark) 151G (polyether ether ketone resin available from Victrex-MC, Inc., melting point: 343° C.) was used in place of the poly (phenylene ether ether ketone) oligomer (B); the resin melting temperature, the film-forming temperature, and the fiber impregnation temperature were changed to 400° C.; and the roll pressure for fiber impregnation was changed to 0.5 MPa, but the resin was highly viscous and did not impregnate into the reinforcing fiber substrate (A'). Using the unidirectional prepreg obtained, evaluations of the molding material were carried out in the same manner as in Example 19.

The unidirectional prepreg obtained was press-molded in the same manner as in Comparative Example 7, and the laminated plate obtained was evaluated. The process conditions and the evaluation results are shown in Table 3.

It is clear from Comparative Example 9 that when a high-molecular-weight polyether ether ketone resin is used, impregnation into a reinforcing fiber substrate (A') is difficult, and the productivity of the molding material is poor. It is clear that since it is necessary to set the process temperature high, this molding material is inferior in terms of economic efficiency, and the resulting molded article also has poor dynamic properties.

Example 22

A unidirectional prepreg was prepared in the same manner as in Example 19, and evaluations of the molding material were carried out.

Press molding was carried out in the same manner as in Example 19 except that the unidirectional prepreg obtained was hot-pressed at a mold surface temperature of 350° C. for a heating time of 10 minutes and then the mold was cooled to 150° C. at 10° C./min before demolding a molded article. The laminated plate obtained was evaluated. The process conditions and the evaluation results are shown in Table 3.

Example 23

A unidirectional prepreg was prepared in the same manner as in Example 19, and evaluations of the molding material were carried out.

Press molding was carried out in the same manner as in Example 19 except that the unidirectional prepreg obtained was hot-pressed at a mold surface temperature of 400° C. for a heating time of 10 minutes and then the mold was cooled to 150° C. at 10° C./min before demolding a molded article. The laminated plate obtained was evaluated. The process conditions and the evaluation results are shown in Table 3.

Examples 22 and 23 show that the molded articles obtained by the molding method in which molding is carried out at a mold surface temperatures of 350° C. and 400° C. and molded articles are demolded after the mold is cooled had excellent dynamic properties. Also in these molded articles, the poly (phenylene ether ether ketone) oligomer (B) was polymerized into a poly (phenylene ether ether ketone) (B'). Further, the poly (phenylene ether ether ketone) (B') in the molding material produced under these conditions had a melting enthalpy of less than 40 kJ/g, which was equivalent to that of known poly (phenylene ether ether ketone).

Example 24

A unidirectional prepreg was prepared in the same manner as in Example 19 except that the supply of raw materials was adjusted such that the content of the reinforcing fiber substrate (A') was 76 wt %. Using the unidirectional prepreg obtained, evaluations of the molding material were carried out in the same manner as in Example 19.

Using the unidirectional prepreg obtained, press molding was carried out in the same manner as in Example 19, and the laminated plate obtained was evaluated. The process conditions and the evaluation results are shown in Table 3.

It is clear from Example 24 that even when the content of the reinforcing fibers (A) is 76 wt %, the productivity of the molding material is excellent, and the resulting molded article has excellent dynamic properties.

Example 25

To the poly (phenylene ether ether ketone) oligomer (B) prepared in Reference Example 1, cesium fluoride was added as a polymerization catalyst (D) in an amount of 5 mol % based on the repeating unit of the formula: —(O-Ph-O-Ph-CO-Ph)-, which is a main structural unit of the poly (phenylene ether ether ketone) oligomer (B), and the resulting mixture was melted in a molten bath at 230° C. to obtain a molten mixture. Using a knife coater, the molten mixture was applied to release paper to a given thickness at 230° C. to produce a resin film.

Next, two resin films were laminated on both surfaces of carbon fibers "TORAYCA" (registered trademark) T700S-24K (available from TORAY INDUSTRIES, INC.) which was unidirectionally arranged in the form of a sheet, and using rolls heated to 230° C., the carbon fibers were impregnated with the molten mixture at a roll pressure of 0 MPa to prepare a unidirectional prepreg. The unidirectional prepreg obtained was cut to a predetermined size, and evaluation of the content of the reinforcing fiber substrate (A'), evaluation of the impregnation rate of the poly (phenylene ether ether ketone) oligomer (B), and evaluation of the drape property of a molding material were carried out.

The unidirectional prepregs obtained were aligned in the fiber direction and laminated such that a molded article has a thickness of 2±0.4 mm, and then hot-pressed using a press molding machine at a mold surface temperature of 300° C. under a molding pressure of 0.5 MPa for a heating time of 30 minutes to convert the poly (phenylene ether ether ketone) oligomer (B) into a poly (phenylene ether ether ketone) (B'). Soon after the hot-pressing, the press molding machine was opened, and the molded article was demolded to obtain a laminated plate using the molding material of the present invention. The poly (phenylene ether ether ketone) (B') was physically separated from the laminated plate obtained here and subjected to melting point measurement, melting enthalpy measurement, and viscosity measurement. Further, the laminated plate obtained was subjected to a flexural test in accordance with JIS K 7074-1988 and void fraction evaluation of the molded article. The process conditions and the evaluation results are shown in Table 3.

Example 26

A unidirectional prepreg was prepared in the same manner as in Example 25, and evaluations of the molding material were carried out.

Press molding was carried out in the same manner as in Example 25 except that the unidirectional prepreg obtained was hot-pressed at a mold surface temperature of 400° C. for a heating time of 10 minutes and then the mold was cooled to 150° C. at 10° C./min before demolding a molded article. The laminated plate obtained was evaluated. The process conditions and the evaluation results are shown in Table 3.

Comparative Example 10

A unidirectional prepreg was prepared in the same manner as in Example 25, and evaluations of the molding material were carried out.

The unidirectional prepreg obtained was press-molded in the same manner as in Example 25 except that the mold surface temperature was changed to 400° C. and the heating time was changed to 10 minutes. However, the lamination was peeled off at demolding, and a sound molded article could not be obtained.

Examples 25 and 26 show that the molding materials having an impregnation rate of the poly (phenylene ether ether ketone) oligomer (B) of 20% to less than 80% had excellent drape property; the poly (phenylene ether ether ketone) oligomer (B) were polymerized into a poly (phenylene ether ether ketone) (B') in the molding material obtained; and the molded article obtained by using this molding material had excellent dynamic properties.

It can be seen from Comparative Example 10 that when molding is carried out at a mold surface temperature of 400° C. and a molded article is demolded without cooling the mold, the lamination is peeled off, and a sound molded article cannot be obtained.

TABLE 3

|  |  | Example 19 | Example 20 | Comparative Example 7 | Example 21 | Comparative Example 8 | Comparative Example 9 | Example 22 |
|---|---|---|---|---|---|---|---|---|
| (Composition) |  |  |  |  |  |  |  |  |
| Component (B): Poly (phenylene ether ether ketone) oligomer | Type | Reference Example 1 | Reference Example 2 | Reference Example 3 | Reference Example 4 | Reference Example 1 | High molecular weight PEEK | Reference Example 1 |
|  | wt % | 100 | 100 | 100 | 100 | 100 | 100 | 100 |

TABLE 3-continued

| | | | | | | | | |
|---|---|---|---|---|---|---|---|---|
| Component (D): Polymerization catalyst (Producing conditions of Molding material) | Type | CsF | CsF | CsF | CsF | — | — | CsF |
| | mol % | 5 | 5 | 5 | 5 | | | 5 |
| Resin melting temperature | ° C. | 230 | 230 | 350 | 230 | 230 | 400 | 230 |
| Film formation temperature | ° C. | 230 | 230 | 350 | 230 | 230 | 400 | 230 |
| Fiber impregnation temperature | ° C. | 230 | 230 | 350 | 230 | 230 | 400 | 230 |
| Fiber impregnation roll pressure (Properties of Molding material) | MPa | 0.2 | 0.2 | 0.5 | 0.2 | 0.2 | 0.5 | 0.2 |
| Component (A') content | wt % | 64 | 64 | 64 | 64 | 64 | 64 | 64 |
| Impregnation rate of Component (B) | — | good | good | bad | good | good | bad | good |
| Drape property (Molding conditions using Molding material) | — | fair | fair | good | fair | fair | good | fair |
| Mold surface temperature | ° C. | 300 | 300 | 400 | 300 | 300 | 400 | 350 |
| Molding pressure | MPa | 0.5 | 0.5 | 0.5 | 0.5 | 0.5 | 0.5 | 0.5 |
| Heating time | min | 30 | 30 | 30 | 30 | 30 | 30 | 1.0 |
| Mold cooling time (Properties of Poly (phenylene ether ether ketone) (B')) | min | — | — | 25 | — | 15 | 25 | 20 |
| Melting point | ° C. | 347 | 346 | 335 | 344 | 276 | 343 | 330 |
| Fusion enthalpy | J/g | 33 | 52 | 32 | 53 | — | — | 36 |
| Reduced viscosity (Properties of Moled article) | dL/g | 0.5 | 0.5 | 0.6 | 0.5 | — | — | 0.6 |
| Flexural modulus at 0° | GPa | 120 | 120 | 100 | 120 | — | 95 | 120 |
| Flexural strength at 0° | MPa | 1700 | 1750 | 1100 | 1700 | — | 1000 | 1650 |
| Void ratio of Molded article | — | good | good | bad | good | — | bad | good |

| | | Example 23 | Example 24 | Example 25 | Example 26 | Comparative Example 10 |
|---|---|---|---|---|---|---|
| (Composition) | | | | | | |
| Component (B): Poly (phenylene ether ether ketone) oligomer | Type | Reference Example 1 | Reference Example 1 | Reference Example 1 | Reference Example 1 | Reference Example 1 |
| | wt % | 100 | 100 | 100 | 100 | 100 |
| Component (D): Polymerization catalyst (Producing conditions of Molding material) | Type | CsF | CsF | CsF | CsF | CsF |
| | mol % | 5 | 5 | 5 | 5 | 5 |
| Resin melting temperature | ° C. | 230 | 230 | 230 | 230 | 230 |
| Film formation temperature | ° C. | 230 | 230 | 230 | 230 | 230 |
| Fiber impregnation temperature | ° C. | 230 | 230 | 230 | 230 | 230 |
| Fiber impregnation roll pressure (Properties of Molding material) | MPa | 0.2 | 0.2 | 0 | 0 | 0 |
| Component (A') content | wt % | 64 | 76 | 64 | 64 | 64 |
| Impregnation rate of Component (B) | — | good | good | fair | fair | fair |
| Drape property (Molding conditions using Molding material | — | fair | bad | excellent | excellent | excellent |
| Mold surface temperature | ° C. | 400 | 300 | 300 | 400 | 400 |
| Molding pressure | MPa | 0.5 | 0.5 | 0.5 | 0.5 | 0.5 |
| Heating time | min | 10 | 30 | 30 | 10 | 10 |
| Mold cooling time (Properties of Poly (phenylene ether ether ketone) (B')) | min | 25 | — | — | 25 | — |
| Melting point | ° C. | 329 | 347 | 346 | 330 | 330 |
| Fusion enthalpy | J/g | 38 | 54 | 54 | 36 | 36 |
| Reduced viscosity (Properties of Moled article) | dL/g | 0.7 | 0.5 | 0.5 | 0.7 | 0.7 |
| Flexural modulus at 0° | GPa | 120 | 140 | 120 | 120 | — |
| Flexural strength at 0° | MPa | 1700 | 2000 | 1550 | 1600 | — |
| Void ratio of Molded article | — | good | good | fair | fair | — |

Example 27

A method for producing a molding material will be described with reference to the apparatus shown in FIG. 13. The apparatus configuration used in this production method is defined as (E1).

Step (I): A plurality of carbon fibers "TORAYCA" (registered trademark) T700S-12K (available from TORAY INDUSTRIES, INC.) are aligned in a width of 100 mm such that the gaps in a reinforcing fiber bundle are 1 to 5 mm and supplied to a production line. The reinforcing fiber bundle is placed on a roll bar 11, arranged in the form of a sheet, fed to an impregnation bath 12, passed through rotating rollers 13 in the impregnation bath, passed through a hot-air drying furnace 14, further passed through a double belt press 15, a heating chamber 25, and a hot roller 27 in the order mentioned, and taken up by applying a tension with a nip roller 16. The take-up speed is set at 3 m/min, and after the operation is stabilized, the reinforcing fiber bundle is heated to 150° C. with an infrared heater 17 for preheating.

Step (II): The poly (phenylene ether ether ketone) oligomer (B) prepared in Reference Example 1 with a given amount of a polymerization catalyst (D) added was made into a dispersion, which was fed to an impregnation bath via a pump 18. Through the immersion of the rotating rollers into the dispersion, the reinforcing fiber bundle is provided with the poly (phenylene ether ether ketone) oligomer (B) and the polymerization catalyst (D). For the amount of the poly (phenylene ether ether ketone) oligomer (B) and the polymerization catalyst (D) deposited through the immersion, the length of time for immersing the reinforcing fiber bundle is adjusted such that the fiber content by weight (Wf) is 64%. Further, 90% or more of moisture was removed from the reinforcing fiber bundle by adjusting the temperature in the hot-air drying furnace 14 to 140° C. to obtain a composite of the reinforcing fiber substrate (A'), the poly (phenylene ether ether ketone) oligomer (B), and the polymerization catalyst (D).

Using the double belt press having a length of 4 m in the line direction under the conditions of a temperature of 230° C. and a pressure of 3 MPa, the composite was passed therethrough while being hot-pressed to heat-impregnate the poly (phenylene ether ether ketone) oligomer (B) into the reinforcing fiber substrate (A'), thereby obtaining an impregnated body comprising the reinforcing fiber substrate (A'), the poly (phenylene ether ether ketone) oligomer (B), and the polymerization catalyst (D). At this time, nitrogen was purged through an inlet port 20 of a chamber 19 housing the double belt press to adjust the oxygen concentration in the chamber to 1% by volume or less.

Step (III): Using the heating chamber 25 having a length of 30 m in the line direction under the conditions of a temperature of 400° C., the impregnated body is passed therethrough while being heated to polymerize the poly (phenylene ether ether ketone) oligomer (B). Further, using the hot roller 27, the resultant was molded under the conditions of 400° C. and a pressure of 1 MPa to obtain a polymer comprising the reinforcing fiber substrate (A'), the poly (phenylene ether ether ketone) (B'), and the polymerization catalyst (D). At this time, nitrogen was purged through an inlet port 26 of the heating chamber 25 to adjust the oxygen concentration in the chamber to 1% by volume or less.

Step (IV): The polymer was passed over a cooling plate 21 at 50° C. to solidify the poly (phenylene ether ether ketone) (B'), taken up with a nip roll, and then cut with a guillotine cutter 22 at 1-m intervals to prepare a sheet-like molding material with a width of 100 mm.

The above steps were all performed on-line to continuously produce a molding material. The poly (phenylene ether ether ketone) (B') was physically separated from the molding material obtained and subjected to melting point measurement, melting enthalpy measurement, and viscosity measurement.

The molding materials obtained were aligned in the fiber direction and laminated such that a molded article has a thickness of 2±0.4 mm, and then hot-pressed using a press molding machine at a mold surface temperature of 400° C. under a molding pressure of 3 MPa for 3 minutes. Thereafter, the mold was cooled, and the molded article was demolded to obtain a laminated plate. A test piece having a size in accordance with JIS K 7074-1988 was cut out from the laminated plate obtained with the fiber axis direction as the long side, and a 3-point flexural test was performed using "INSTRON" (registered trademark) universal tester Model 4201 (manufactured by INSTRON) as a tester to determine the 0° flexural modulus and 0° flexural strength. The process conditions and the evaluation results are shown in Table 4.

Example 28

A molding material was produced in the same manner as in Example 27 except that the heating chamber temperature in the step (III) was changed to 300° C. and the take-up speed of the reinforcing fiber substrate (A') was changed to 1 m/min. The molding material obtained was evaluated in the same manner as in Example 27. The molding material obtained here was characterized in that the melting point of the poly (phenylene ether ether ketone) (B') and the melting enthalpy were high compared to Example 27. The process conditions and the evaluation results are shown in Table 4.

Comparative Example 11

A molding material was produced in the same manner as in Example 27 except that the poly (phenylene ether ether ketone) oligomer (B) prepared in Reference Example 3 was used. The molding material obtained was evaluated in the same manner as in Example 27. The molding material obtained here was characterized in that the impregnation rate of the poly (phenylene ether ether ketone) (B') was low; the resulting molded article had many voids; and the dynamic properties were poor, as compared to Example 27. This is probably because the poly (phenylene ether ether ketone) oligomer (B) was poorly impregnated into a reinforcing fiber substrate (A'). The process conditions and the evaluation results are shown in Table 4.

Comparative Example 12

A molding material was produced in the same manner as in Comparative Example 11 except that the temperature of the double belt press in the step (II) was changed to 350° C. The molding material obtained was evaluated in the same manner as in Example 27. Although the molding material obtained here had a relatively high impregnation rate of the poly (phenylene ether ether ketone) (B'), the high temperature in the impregnation process imposed a heavy load on the apparatus, and thus this method was not economically preferred. The process conditions and the evaluation results are shown in Table 4.

Comparative Example 13

A molding material was produced in the same manner as in Example 27 except that VICTREX "PEEK" (registered trademark) 151G (polyether ether ketone resin available from Victrex-MC, Inc., melting point: 343° C.) was used in place of the poly (phenylene ether ether ketone) oligomer (B), and the temperature of the double belt press in the step (II) was changed to 400° C. The molding material obtained was evaluated in the same manner as in Example 27. The molding material obtained here was characterized in that the impregnation rate of the poly (phenylene ether ether ketone) (B') was low; the resulting molded article had many voids; and the dynamic properties were poor, as compared to Example 27. Further, the high temperature in the impregnation process imposed a heavy load on the apparatus, and thus this method was not economically preferred. The process conditions and the evaluation results are shown in Table 4.

Comparative Examples 11 to 13 in terms of the process temperature and impregnation properties in the production of a molding material, and the molded article obtained by using this molding material has excellent dynamic properties.

Example 29

A method for producing a molding material will be described with reference to the apparatus shown in FIG. 14. The apparatus configuration used in this production method is defined as (E2).

Step (I): A plurality of carbon fibers "TORAYCA" (registered trademark) T700S-12K (available from TORAY INDUSTRIES, INC.) are aligned in a width of 100 mm such

TABLE 4

| | | Example 27 | Example 28 | Comparative Example 11 | Comparative Example 12 | Comparative Example 13 |
|---|---|---|---|---|---|---|
| (Composition) | | | | | | |
| Component (A'): Reinforcing fiber substrate | wt % | 64 | 64 | 64 | 64 | 64 |
| Component(B): Poly(phenylene ether ether ketone) oligomer | Type | Reference Example 1 | Reference Example 1 | Reference Example 3 | Reference Example 3 | High molecular weight PEEK |
| | wt % | 36 | 36 | 36 | 36 | 36 |
| Component(D): Polymerization catalyst | Type | CsF | CsF | CsF | CsF | — |
| | mol % | 5 | 5 | 5 | 5 | |
| (Producing conditions of Molding material) | | | | | | |
| Constitution of the apparatus | — | (E1) | (E1) | (E1) | (E1) | (E1) |
| <Step (I)> | | | | | | |
| Preheating temperature | ° C. | 150 | 150 | 150 | 150 | 150 |
| <Step (II)> | | | | | | |
| Heat dry oven temperature | ° C. | 140 | 140 | 140 | 140 | 140 |
| Double belt press temperature | ° C. | 230 | 230 | 230 | 350 | 400 |
| Double belt press pressure | MPa | 3 | 3 | 3 | 3 | 3 |
| <Step (III)> | | | | | | |
| Heating chamber temperature | ° C. | 400 | 300 | 400 | 400 | 400 |
| Heating time | min | 10 | 30 | 10 | 10 | 10 |
| <Step (IV)> | | | | | | |
| Taking up speed | m/min | 3 | 1 | 3 | 3 | 3 |
| (Properties of Molding material) | | | | | | |
| Impregnation rate of Component (B') | — | good | good | bad | fair | bad |
| <Properties of Poly (phenylene ether ether ketone) (B')> | | | | | | |
| Melting point | ° C. | 328 | 346 | 335 | 325 | 343 |
| Fusion enthalpy | J/g | 39 | 55 | 31 | 35 | — |
| Reduced viscosity | dL/g | 0.7 | 0.5 | 0.6 | 0.7 | — |
| (Molding conditions using Molding material) | | | | | | |
| Mold surface temperature | ° C. | 400 | 400 | 400 | 400 | 400 |
| Molding pressure | MPa | 3 | 3 | 3 | 3 | 3 |
| Heating time | min | 3 | 3 | 3 | 3 | 3 |
| (Properties of Moled article) | | | | | | |
| Flexural modulus at 0° | GPa | 120 | 120 | 90 | 110 | 95 |
| Flexural strength at 0° | MPa | 1650 | 1700 | 1000 | 1400 | 950 |
| Void ratio of Molded article | — | good | good | bad | fair | bad |

Examples and Comparative Examples in Table 4 reveal the following. It is clear that because the methods for producing a molding material in Examples 27 and 28 use the poly (phenylene ether ether ketone) oligomer (B) in the present invention, they are superior to the methods in that the gaps in a reinforcing fiber bundle are 1 to 5 mm and supplied to a production line. The reinforcing fiber bundle is placed on a roll bar 31, arranged in the form of a sheet, fed to a belt conveyor 32, further sandwiched between a pair of hot rollers 33, and taken up around a drum winder 35 by applying a tension with a nip roller 34. The take-up speed is set at 5 m/min, and after the operation is stabilized, the reinforcing fiber bundle is heated to 150° C. with an infrared heater 36 for preheating.

Step (II): The mixture of a poly (phenylene ether ether ketone) oligomer (B) and a polymerization catalyst (D) prepared in Reference Example 1 was melted at 230° C., and the melt obtained was applied to release paper to a given thickness using a knife coater to produce a film. The film was mounted on a draw winder 37, and supplied together with the release paper to a hot roller 38 under the conditions of 230° C. and 1 MPa to heat-impregnate the poly (phenylene ether ether ketone) oligomer (B) into a reinforcing fiber substrate (A'), thereby obtaining an impregnated body comprising the reinforcing fiber substrate (A'), the poly (phenylene ether ether ketone) oligomer (B), and the polymerization catalyst (D). The release paper was removed by taking it up with a take-up winder 39. The amount of the poly (phenylene ether ether ketone) oligomer (B) deposited was measured to show that the fiber content by weight (Wf) was 64%.

Step (III): The temperature in a heating chamber 40 having a length of 50 m in the line direction was set at 400° C., and the hot rollers 33 was set at a pressure of 0.1 MPa, under which conditions the impregnated body was passed therethrough, and the poly (phenylene ether ether ketone) oligomer (B) was polymerized to obtain a polymer. At this time, nitrogen was purged through an inlet port 41 of the heating chamber 40 to adjust the oxygen concentration in the heating chamber to 1% by volume or less.

Step (IV): The polymer was passed over a cooling plate 42 at 50° C. to solidify the poly (phenylene ether ether ketone) (B'), taken up with a nip roll, and then taken up around the drum winder to prepare a molding material with a width of 100 mm.

The above steps were all performed on-line to continuously produce a molding material. The poly (phenylene ether ether ketone) (B') was physically separated from the molding material obtained and subjected to melting point measurement, melting enthalpy measurement, and viscosity measurement.

The molding materials obtained were aligned in the fiber direction and laminated such that a molded article has a thickness of 2±0.4 mm, and then hot-pressed using a press molding machine at a mold surface temperature of 400° C. under a molding pressure of 3 MPa for 3 minutes. Thereafter, the mold was cooled, and the molded article was demolded to obtain a laminated plate. A test piece having a size in accordance with JIS K 7074-1988 was cut out from the laminated plate obtained with the fiber axis direction as the long side, and a 3-point flexural test was performed using "INSTRON" (registered trademark) universal tester Model 4201 (manufactured by INSTRON) as a tester to determine the 0° flexural modulus and 0° flexural strength. The process conditions and the evaluation results are shown in Table 5.

Example 30

A molding material was produced in the same manner as in Example 29 except that the heating chamber temperature in the step (III) was changed to 300° C. and the take-up speed of the reinforcing fiber substrate (A') was changed to 1.7 m/min. The molding material obtained was evaluated in the same manner as in Example 29. The molding material obtained here was characterized in that the melting point of the poly (phenylene ether ether ketone) (B') and the melting enthalpy were high compared to Example 29. The process conditions and the evaluation results are shown in Table 5.

Comparative Example 14

A molding material was produced in the same manner as in Example 29 except that the poly (phenylene ether ether ketone) oligomer (B) prepared in Reference Example 3 was used and that the film-forming temperature and hot roller temperature in the step (II) were changed to 350° C. The molding material obtained was evaluated in the same manner as in Example 29. The molding material obtained here was characterized in that the impregnation rate of the poly (phenylene ether ether ketone) (B') was low; the resulting molded article had many voids; and the dynamic properties were poor, as compared to Example 29. This is probably because the poly (phenylene ether ether ketone) oligomer (B) was polymerized at the film-formation and poorly impregnated into a reinforcing fiber substrate (A'). The process conditions and the evaluation results are shown in Table 5.

Comparative Example 15

A molding material was produced in the same manner as in Example 29 except that VICTREX "PEEK" (registered trademark) 151G (polyether ether ketone resin available from Victrex-MC, Inc., melting point: 343° C.) was used in place of the poly (phenylene ether ether ketone) oligomer (B) and that the film-forming temperature and hot roller temperature in the step (II) were changed to 400° C. The molding material obtained was evaluated in the same manner as in Example 29. The molding material obtained here was characterized in that the impregnation rate of the poly (phenylene ether ether ketone) (B') was low; the resulting molded article had many voids; and the dynamic properties were poor, as compared to Example 29. The process conditions and the evaluation results are shown in Table 5.

TABLE 5

|  |  | Example 29 | Example 30 | Comparative Example 14 | Comparative Example 15 |
|---|---|---|---|---|---|
| (Composition) |  |  |  |  |  |
| Component (A'): Reinforcing fiber substrate | wt % | 64 | 64 | 64 | 64 |
| Component (B): Poly (phenylene ether ether ketone) oligomer | Type | Reference Example 1 | Reference Example 1 | Reference Example 3 | High molecular weight PEEK |
|  | wt % | 36 | 36 | 36 | 36 |
| Component (D): Polymerization catalyst | Type | CsF | CsF | CsF | — |
|  | mol % | 5 | 5 | 5 |  |

TABLE 5-continued

|  |  | Example 29 | Example 30 | Comparative Example 14 | Comparative Example 15 |
|---|---|---|---|---|---|
| (Producing conditions of Molding material) |  |  |  |  |  |
| Constitution of the apparatus | — | (E2) | (E2) | (E2) | (E2) |
| <Step (I)> |  |  |  |  |  |
| Preheating temperature | ° C. | 150 | 150 | 150 | 150 |
| <Step (II)> |  |  |  |  |  |
| Film formation temperature | ° C. | 230 | 230 | 350 | 400 |
| Hot roller temperature | ° C. | 230 | 230 | 350 | 400 |
| Hot roller pressure | MPa | 1 | 1 | 1 | 1 |
| <Step (III)> |  |  |  |  |  |
| Heating chamber temperature | ° C. | 400 | 300 | 400 | 400 |
| Heating time | min | 10 | 30 | 10 | 10 |
| Hot roller pressure | MPa | 0.1 | 0.1 | 0.1 | 0.1 |
| <Step (IV)> |  |  |  |  |  |
| Taking up speed | m/min | 5 | 1.7 | 5 | 5 |
| (Properties of Molding material) |  |  |  |  |  |
| Impregnation rate of Component (B') | — | good | good | bad | bad |
| <Properties of Poly (phenylene ether ether ketone) (B')> |  |  |  |  |  |
| Melting point | ° C. | 329 | 347 | 335 | 343 |
| Fusion enthalpy | J/g | 38 | 52 | 32 | — |
| Reduced viscosity | dL/g | 0.7 | 0.5 | 0.6 | — |
| (Molding conditions using Molding material) |  |  |  |  |  |
| Mold surface temperature | ° C. | 400 | 400 | 400 | 400 |
| Molding pressure | MPa | 3 | 3 | 3 | 3 |
| Heating time | min | 3 | 3 | 3 | 3 |
| (Properties of Moled article) |  |  |  |  |  |
| Flexural modulus at 0° | GPa | 120 | 120 | 100 | 95 |
| Flexural strength at 0° | MPa | 1600 | 1650 | 1050 | 1000 |
| Void ratio of Molded article | — | good | good | bad | bad |

Examples and Comparative Examples in Table 5 reveal the following. It is clear that because the methods for producing a molding material in Examples 29 and 30 use the poly (phenylene ether ether ketone) oligomer (B) in the present invention, they are superior to the methods in Comparative Examples 14 and 15 in terms of the process temperature and impregnation properties in the production of a molding material, and the molded article obtained by using this molding material has excellent dynamic properties.

Example 31

A method for producing a molding material will be described with reference to the apparatus shown in FIG. 15. The apparatus configuration used in this production method is defined as (E3).

Step (I): A plurality of carbon fibers "TORAYCA" (registered trademark) T700S-12K (available from TORAY INDUSTRIES, INC.) are aligned in a width of 100 mm such that the gaps in a reinforcing fiber bundle are 1 to 5 mm and supplied to a production line. The reinforcing fiber bundle is placed on a roll bar 51, arranged in the form of a sheet, further fed to a calender roll 52, and taken up around a drum winder 54 by applying a tension with a nip roller 53. The take-up speed is set at 10 m/min, and after the operation is stabilized, the reinforcing fiber bundle is heated to 150° C. with an infrared heater 55 for preheating.

Step (II): The poly (phenylene ether ether ketone) oligomer (B) prepared in Reference Example 1 with a given amount of a polymerization catalyst (D) added was pulverized into particles. The particles were sprinkled from a metering powder feeder 56 over the reinforcing fiber bundle such that the fiber content by weight (Wf) was 64%, and further heated to a temperature of 230° C. with an infrared heater 62, thereby obtaining a composite in which the poly (phenylene ether ether ketone) oligomer (B) and the polymerization catalyst (D) were fused to a reinforcing fiber substrate (A').

Step (III): Setting the temperature in a heating chamber 57 at 400° C., the composite was passed through a distance of 100 m in the line direction while applying a tension with a calender roller 52 to obtain a polymer of the poly (phenylene ether ether ketone) oligomer (B). At this time, nitrogen was purged through an inlet port 58 of the heating chamber 57 to adjust the oxygen concentration in the heating chamber to 1% by volume or less.

Step (IV): The polymer was passed over a cooling plate 59 at 50° C. to solidify the poly (phenylene ether ether ketone) (B'), taken up with a nip roll, and then taken up around the drum winder to prepare a molding material with a width of 100 mm.

The above steps were all performed on-line to continuously produce a molding material. The poly (phenylene ether ether ketone) (B') was physically separated from the molding material obtained and subjected to melting point measurement, melting enthalpy measurement, and viscosity measurement.

The molding materials obtained were aligned in the fiber direction and laminated such that a molded article has a thickness of 2±0.4 mm, and then hot-pressed using a press molding machine at a mold surface temperature of 400° C. under a molding pressure of 3 MPa for 3 minutes. Thereafter, the mold was cooled, and the molded article was demolded to obtain a laminated plate. A test piece having a size in accordance with JIS K 7074-1988 was cut out from the laminated plate obtained with the fiber axis direction as the long side, and a 3-point flexural test was performed using "INSTRON" (registered trademark) universal tester Model 4201 (manufactured by INSTRON) as a tester to determine the 0° flexural modulus and 0° flexural strength. The process conditions and the evaluation results are shown in Table 6.

Example 32

A molding material was produced in the same manner as in Example 31 except that the poly (phenylene ether ether ketone) oligomer (B) prepared in Reference Example 2 was used. The molding material obtained was evaluated in the same manner as in Example 31. The process conditions and the evaluation results are shown in Table 6.

Comparative Example 16

A molding material was produced in the same manner as in Example 31 except that the poly (phenylene ether ether ketone) oligomer (B) prepared in Reference Example 3 was used and that the fusion temperature in the step (II) was changed to 350° C. The molding material obtained was evaluated in the same manner as in Example 31. The molding material obtained here was characterized in that the impregnation rate of the poly (phenylene ether ether ketone) (B') was low; the resulting molded article had many voids; and the dynamic properties were poor, as compared to Example 31. This is probably because the poly (phenylene ether ether ketone) oligomer (B) was polymerized at the fusion and poorly impregnated into a reinforcing fiber substrate (A'). The process conditions and the evaluation results are shown in Table 6.

Example 33

A molding material was produced in the same manner as in Example 31 except that the poly (phenylene ether ether ketone) oligomer (B) prepared in Reference Example 4 was used. The molding material obtained was evaluated in the same manner as in Example 31. The process conditions and the evaluation results are shown in Table 6.

Comparative Example 17

A molding material was produced in the same manner as in Example 31 except that VICTREX "PEEK" (registered trademark) 151G (polyether ether ketone resin available from Victrex-MC, Inc., melting point: 343° C.) was used in place of the poly (phenylene ether ether ketone) oligomer (B) and that the fusion temperature in the step (II) was changed to 400° C. The molding material obtained was evaluated in the same manner as in Example 31. The molding material obtained here was characterized in that the impregnation rate of the poly (phenylene ether ether ketone) (B') was low; the resulting molded article had many voids; and the dynamic properties were poor, as compared to Examples 31 to 33. The process conditions and the evaluation results are shown in Table 6.

Example 34

A molding material was produced in the same manner as in Example 31 except that the heating chamber temperature in the step (III) was changed to 350° C. The molding material obtained was evaluated in the same manner as in Example 31. The process conditions and the evaluation results are shown in Table 6.

Example 35

A molding material was produced in the same manner as in Example 31 except that the heating chamber temperature in the step (III) was changed to 300° C. and the take-up speed of the reinforcing fiber substrate (A') was changed to 3.3 m/min. The molding material obtained was evaluated in the same manner as in Example 31. The molding material obtained here was characterized in that the melting point of the poly (phenylene ether ether ketone) (B') and the melting enthalpy were high compared to Example 31. The process conditions and the evaluation results are shown in Table 6.

Example 36

A molding material was produced in the same manner as in Example 31 except that the content of the reinforcing fiber substrate (A') was changed to 76 wt % and the content of the poly (phenylene ether ether ketone) oligomer (B) of Reference Example 1 was changed to 24 wt %. The molding material obtained was evaluated in the same manner as in Example 31. The process conditions and the evaluation results are shown in Table 6.

TABLE 6

|  |  | Example 31 | Example 32 | Comparative Example 16 | Example 33 | Comparative Example 17 | Example 34 | Example 35 | Example 36 |
|---|---|---|---|---|---|---|---|---|---|
| (Composition) | | | | | | | | | |
| Component (A'): Reinforcing fiber substrate | wt % | 64 | 64 | 64 | 64 | 64 | 64 | 64 | 76 |
| Component (B): Poly (phenylene ether ether ketone) oligomer | Type | Reference Example 1 | Reference Example 2 | Reference Example 3 | Reference Example 4 | High molecular weight PEEK | Reference Example 1 | Reference Example 1 | Reference Example 1 |
| | wt % | 36 | 36 | 36 | 36 | 36 | 36 | 36 | 24 |

TABLE 6-continued

| | | Example 31 | Example 32 | Comparative Example 16 | Example 33 | Comparative Example 17 | Example 34 | Example 35 | Example 36 |
|---|---|---|---|---|---|---|---|---|---|
| Component (D): Polymerization catalyst (Producing conditions of Molding material) | Type<br>mol % | CsF<br>5 | CsF<br>5 | CsF<br>5 | CsF<br>5 | —<br> | CsF<br>5 | CsF<br>5 | CsF<br>5 |
| Constitution of the apparatus <Step (I)> | — | (E3) | (E3) | (E3) | (E3) | (E3) | (E3) | (E3) | (E3) |
| Preheating temperature <Step (II)> | ° C. | 150 | 150 | 150 | 150 | 150 | 150 | 150 | 150 |
| Fusion step temperature <Step (III)> | ° C. | 230 | 230 | 350 | 230 | 400 | 230 | 230 | 230 |
| Heating chamber temperature | ° C. | 400 | 400 | 400 | 400 | 400 | 350 | 300 | 400 |
| Heating time <Step (IV)> | min | 10 | 10 | 10 | 10 | 10 | 10 | 30 | 10 |
| Taking up speed (Properties of Molding material) | m/min | 10 | 10 | 10 | 10 | 10 | 10 | 3.3 | 10 |
| Impregnation rate of Component (B') <Properties of Poly (phenylene ether ether ketone) (B')> | — | good | good | bad | good | bad | good | good | good |
| Melting point | ° C. | 330 | 331 | 327 | 332 | 343 | 330 | 347 | 329 |
| Fusion enthalpy | J/g | 38 | 34 | 32 | 36 | — | 36 | 53 | 36 |
| Reduced viscosity (Molding conditions using Molding material) | dL/g | 07 | 0.7 | 0.6 | 0.7 | — | 0.6 | 0.5 | 0.7 |
| Mold surface temperature | ° C. | 400 | 400 | 400 | 400 | 400 | 400 | 400 | 400 |
| Molding pressure | MPa | 3 | 3 | 3 | 3 | 3 | 3 | 3 | 3 |
| Heating time (Properties of Moled article) | min | 3 | 3 | 3 | 3 | 3 | 3 | 3 | 3 |
| Flexural modulus at 0° | GPa | 120 | 120 | 100 | 120 | 90 | 120 | 120 | 140 |
| Flexural strength at 0° | MPa | 1600 | 1650 | 1050 | 1650 | 900 | 1650 | 1650 | 2050 |
| Void ratio of Molded article | — | good | good | bad | good | bad | good | good | good |

Examples and Comparative Examples in Table 6 reveal the following. It is clear from the results of Examples 31 to 33 that regardless of the production method, the poly (phenylene ether ether ketone) oligomer (B) in the present invention, as compared to Comparative Examples 16 and 17, is excellent in the process temperature and impregnation properties in the production of a molding material, and the molded article obtained by using this molding material has excellent dynamic properties.

It is clear from Examples 34 and 35 that the poly (phenylene ether ether ketone) oligomer (B) in the present invention can be satisfactorily polymerized even at 350° C. and 300° C., and these methods are excellent in process temperature in the production of a molding material.

It is clear from Example 36 that even when the content of the reinforcing fiber substrate (A') is 76 wt %, the method for producing a molding material of the present invention is excellent in the process temperature and impregnation properties in the production of a molding material, and the molded article obtained by using this molding material has excellent dynamic properties.

<Method for Producing Fiber-Reinforced Composite Material by RTM Method>

Example 37

Step (I-1): Eight plies of "TORAYCA" (registered trademark) BT70-30 (carbon fiber fabric available from TORAY INDUSTRIES, INC., T700S-12K, texture: plain, basis weight: 300 g/m²) used as a reinforcing fiber substrates (A') were laminated in a mold having a plate-like cavity 300 mm long×300 mm wide×2 mm thick, and clamped with a pressing device.

Step (II-1): The poly (phenylene ether ether ketone) oligomer (B) obtained in Reference Example 1 was melted by heating at 230° C. for 30 minutes to form a melt solution. A given amount of polymerization catalyst (D) was further added to the melt solution and kneaded for dispersion.

Step (III-1): The surface temperature of the mold was maintained at 300° C., and the pressure in the mold was reduced with a vacuum pump to a pressure 0.1 MPa lower than the atmospheric pressure. The melt solution was injected into the mold using a resin injector to impregnate the poly (phenylene ether ether ketone) oligomer (B) into the reinforcing fiber substrate (A').

Step (IV-1): After completion of the injection of the melt solution, while still maintaining the surface temperature of the mold at 300° C., heating was continued for 30 minutes to polymerize the poly (phenylene ether ether ketone) oligomer (B) into a poly (phenylene ether ether ketone) (B').

After completion of the steps (I-1) to (IV-1), the mold was opened and demolded to obtain a fiber-reinforced composite material.

Resin flash was removed to measure the weight of the fiber-reinforced composite material obtained. The content of the reinforcing fiber substrate (A') was calculated from the weight of the fiber-reinforced composite material and the weight of the reinforcing fiber substrate (A') used.

The poly (phenylene ether ether ketone) (B') was physically separated from the fiber-reinforced composite material obtained and subjected to melting point measurement, melting enthalpy measurement, and viscosity measurement.

From the fiber-reinforced composite material obtained, a test piece having a size in accordance with JIS K 7074-1988 was cut out with the warp direction of the reinforcing fiber substrate (A') used as the long side. A 3-point flexural test was performed using "INSTRON" (registered trademark) universal tester Model 4201 (manufactured by INSTRON) as a tester to determine the flexural strength. The process conditions and the evaluation results are shown in Table 7.

Example 38

A fiber-reinforced composite material was produced in the same manner as in Example 37 except that the poly (phenylene ether ether ketone) oligomer (B) prepared in Reference Example 2 was used. The fiber-reinforced composite material obtained was evaluated in the same manner as in Example 37. The process conditions and the evaluation results are shown in Table 7.

Comparative Example 18

A fiber-reinforced composite material was produced in the same manner as in Example 37 except that the poly (phenylene ether ether ketone) oligomer (B) prepared in Reference Example 3 was used; the heat-melting temperature in the step (II-1) was changed to 350° C.; the surface temperature of the mold in the steps (III-1) and (IV-1) was changed to 400° C.; the heating time in the step (IV-1) was changed to 10 minutes; and, further, the surface temperature of the mold was decreased from 400° C. to 150° C. over 25 minutes before demolding a fiber-reinforced composite material. The fiber-reinforced composite material obtained was evaluated in the same manner as in Example 37. The fiber-reinforced composite material obtained here had many voids compared to Example 37, and the fiber-reinforced composite material obtained was very fragile. This is probably because the polymerization of the poly (phenylene ether ether ketone) oligomer (B) occurred before impregnation into a reinforcing fiber substrate (A'). The process conditions and the evaluation results are shown in Table 7.

Example 39

A fiber-reinforced composite material was produced in the same manner as in Example 37 except that the poly (phenylene ether ether ketone) oligomer (B) prepared in Reference Example 4 was used. The fiber-reinforced composite material obtained was evaluated in the same manner as in Example 37. The process conditions and the evaluation results are shown in Table 7.

Comparative Example 19

A fiber-reinforced composite material was produced in the same manner as in Example 37 except that VICTREX "PEEK" (registered trademark) 151G (polyether ether ketone resin available from Victrex-MC, Inc., melting point: 343° C., melt viscosity at 400° C.: 150 Pa·s) was used in place of the poly (phenylene ether ether ketone) oligomer (B); the heat-melting temperature in the step (II-1) was changed to 400° C.; the surface temperature of the mold in the steps (III-1) and (IV-1) was changed to 400° C.; the heating time in the step (IV-1) was changed to 10 minutes; and, further, the surface temperature of the mold was decreased from 400° C. to 150° C. over 25 minutes before demolding a fiber-reinforced composite material. The fiber-reinforced composite material obtained was evaluated in the same manner as in Example 37. The fiber-reinforced composite material obtained here had many voids compared to Example 37, and the fiber-reinforced composite material obtained was very fragile. This is probably because the polymerization of the poly (phenylene ether ether ketone) oligomer (B) occurred before impregnation into a reinforcing fiber substrate (A'). The process conditions and the evaluation results are shown in Table 7.

Example 40

A fiber-reinforced composite material was produced in the same manner as in Example 7 except that the surface temperature of the mold in the steps (III-1) and (IV-1) was changed to 350° C.; the heating time in the step (IV-1) was changed to 10 minutes; and, further, the surface temperature of the mold was decreased from 350° C. to 150° C. over 20 minutes before demolding a fiber-reinforced composite material. The fiber-reinforced composite material obtained was evaluated in the same manner as in Example 37. The process conditions and the evaluation results are shown in Table 7.

Example 41

A fiber-reinforced composite material was produced in the same manner as in Example 37 except that the surface temperature of the mold in the steps (III-1) and (IV-1) was changed to 400° C.; the heating time in the step (IV-1) was changed to 10 minutes; and, further, the surface temperature of the mold was decreased from 400° C. to 150° C. over 25 minutes before demolding a fiber-reinforced composite material. The fiber-reinforced composite material obtained was evaluated in the same manner as in Example 37. The process conditions and the evaluation results are shown in Table 7.

TABLE 7

|  |  | Example 37 | Example 38 | Comparative Example 18 | Example 39 | Comparative Example 19 | Example 40 | Example 41 |
|---|---|---|---|---|---|---|---|---|
| (Composition) | | | | | | | | |
| Component (B): Poly (phenylene ether ether ketone) oligomer | Type | Reference Example 1 | Reference Example 2 | Reference Example 3 | Reference Example 4 | High molecular weight PEEK | Reference Example 1 | Reference Example 1 |
| | wt % | 100 | 100 | 100 | 100 | 100 | 100 | 100 |
| Component (D): | Type | CsF | CsF | CsF | CsF | — | CsF | CsF |
| Polymerization catalyst | mol % | 5 | 5 | 5 | 5 | | 5 | 5 |
| (Producing conditions of Fiber-reinforced composite material) <Step (II-1)> | | | | | | | | |
| Heat melting temperature | ° C. | 230 | 230 | 350 | 230 | 400 | 230 | 230 |
| Melt viscosity of Component (B) | Pa · s | 0.034 | 0.030 | 0.15 | 0.036 | 150 | 0.034 | 0.034 |
| <Step (III-1)> | | | | | | | | |
| Mold surface temperature | ° C. | 300 | 300 | 400 | 300 | 400 | 350 | 400 |
| <Step (IV-1)> | | | | | | | | |
| Mold surface temperature | ° C. | 300 | 300 | 400 | 300 | 400 | 350 | 400 |
| Heating time | min | 30 | 30 | 10 | 30 | 10 | 10 | 1.0 |
| Mold cooling time | min | — | — | 25 | — | 25 | 20 | 25 |
| (Properties of Poly (phenylene ether ether ketone) (B')) | | | | | | | | |
| Melting point | ° C. | 347 | 346 | 335 | 344 | 343 | 330 | 329 |
| Fusion enthalpy | J/g | 53 | 52 | 32 | 53 | — | 36 | 38 |
| Reduced viscosity | dL/g | 0.5 | 0.5 | 0.6 | 0.5 | — | 0.6 | 0.7 |
| (Properties of Fiber-reinforced composite material | | | | | | | | |
| Flexural strength | MPa | 850 | 800 | — | 800 | — | 800 | 850 |
| Component (A') content | wt % | 58 | 58 | — | 58 | — | 58 | 58 |
| Void ratio of Fiber-reinforced composite material | — | good | good | fair | good | bad | good | good |

Examples and Comparative Examples in Table 7 reveal the following. It is clear from the results of Examples 37 to 39 that regardless of the production method, the poly (phenylene ether ether ketone) oligomer (B) in the present invention, as compared to Comparative Examples 18 and 19, can decrease the process temperature in the production of a fiber-reinforced composite material, is excellent in impregnation into the reinforcing fiber substrate (A'), and can reduce voids in the resulting fiber-reinforced composite material. Further, it is clear that the resulting fiber-reinforced composite material has excellent dynamic properties.

It is clear from Examples 40 and 41 that the poly (phenylene ether ether ketone) oligomer (B) in the present invention can be satisfactorily polymerized even at 350° C. and 400° C., and these methods are excellent in polymerization rate.

<Method for Producing Fiber-Reinforced Composite Material by Filament Winding Method>

Example 42

Description will be given with reference to FIGS. 16 and 17.

Step (I-2): "TORAYCA" (registered trademark) T700S-24K (carbon fiber available from TORAY INDUSTRIES, INC.) used as a reinforcing fiber substrate (A') was continuously drawn, and three of them were aligned.

Step (II-2): The poly (phenylene ether ether ketone) oligomer (B) obtained in Reference Example 1 and a polymerization catalyst (D) were fed to an impregnation bath and melted by heating at 230° C. to form a melt solution.

Step (III-2): The reinforcing fiber substrate (A') aligned in the step (I-2) was fed to the impregnation bath of the step (II-2) to obtain a composite of the melt solution and the reinforcing fiber substrate (A') impregnated therewith. Using the filament winding method, the composite obtained was spirally wound around a mandrel (φ: 70 mm) to form as an inner layer a 0.2-mm spirally wound layer 72a at 85° to the axial direction; next, the composite was spirally wound as a main layer 72b at ±12° with a thickness of 1 mm, at ±45° with a thickness of 0.5 mm, and at ±12° with a thickness of 1 mm; and then a spirally wound layer 72c at 85° with a thickness of 0.2 mm was formed as an outermost layer. The main layer has a thickness of 2.9 mm in total. At a part corresponding to a 110-mm-long region at both ends of a cylindrical body, which part is a part for mounting a joint, a reinforcing layer 72d at ±83° to the axial direction with a thickness of 2.5 mm was formed in order to enhance the connection strength to the joint. The reinforcing layer 72d is composed of a straight part 2.5 mm thick and 60 mm long in the axial direction and a 50-mm-long tapering part tapering toward the axial center.

Step (IV-2): The mandrel around which the composite was wound in the step (III-2) is heated in an oven at 300° C. for 30 minutes to polymerize the poly (phenylene ether ether ketone) oligomer (B).

Further, the mandrel after the step (IV-2) was taken out of the oven and air-cooled to obtain a cylindrical body 72 made of a fiber-reinforced composite material. Further, metal joints 73 were press-fit connected to both ends of the cylindrical body 72 to form a propeller shaft 71.

The content of the reinforcing fiber substrate (A') was calculated from the weight of the obtained cylindrical body 72 made of a fiber-reinforced composite material excluding the mandrel and the weight of the reinforcing fiber substrate (A') used.

The poly (phenylene ether ether ketone) (B') was physically separated from the fiber-reinforced composite material obtained and subjected to melting point measurement, melting enthalpy measurement, and viscosity measurement. The process conditions and the evaluation results are shown in Table 8.

Example 43

A fiber-reinforced composite material was produced in the same manner as in Example 42 except that the conditions of heating in an oven in the step (IV-2) were changed to 400° C. for 10 minutes. The fiber-reinforced composite material obtained was evaluated in the same manner as in Example 42. The process conditions and the evaluation results are shown in Table 8.

Comparative Example 20

A fiber-reinforced composite material was produced in the same manner as in Example 42 except that the poly (phenylene ether ether ketone) oligomer (B) prepared in Reference Example 3 was used; the heat-melting temperature in the step (II-2) was changed to 350° C.; and the conditions of heating in an oven in the step (IV-2) were changed to 400° C. for 10 minutes. The fiber-reinforced composite material obtained was evaluated in the same manner as in Example 42. The fiber-reinforced composite material obtained here had many voids compared to Example 42. This is probably because the polymerization of the poly (phenylene ether ether ketone) oligomer (B) occurred before impregnation into a reinforcing fiber substrate (A'). The process conditions and the evaluation results are shown in Table 8.

Comparative Example 21

A fiber-reinforced composite material was produced in the same manner as in Example 42 except that VICTREX "PEEK" (registered trademark) 151G (polyether ether ketone resin available from Victrex-MC, Inc., melting point: 343° C., melt viscosity at 400° C.: 150 Pa·s) was used in place of the poly (phenylene ether ether ketone) oligomer (B); the heat-melting temperature in the step (II-2) was changed to 400° C.; and the conditions of heating in an oven in the step (IV-2) were changed to 400° C. for 10 minutes. The fiber-reinforced composite material obtained was evaluated in the same manner as in Example 42. The fiber-reinforced composite material obtained here had many voids compared to Example 42. This is probably because the polymerization of the poly (phenylene ether ether ketone) oligomer (B) occurred before impregnation into a reinforcing fiber substrate (A'). The process conditions and the evaluation results are shown in Table 8.

TABLE 8

|  |  | Example 42 | Example 43 | Comparative Example 20 | Comparative Example 21 |
|---|---|---|---|---|---|
| (Composition) |  |  |  |  |  |
| Component (B): Poly (phenylene ether ether ketone) oligomer | Type | Reference Example 1 | Reference Example 1 | Reference Example 3 | High molecular weight PEEK |
|  | wt % | 100 | 100 | 100 | 100 |
| Component (D): Polymerization catalyst | Type | CsF | CsF | CsF | — |
|  | mol % | 5 | 5 | 5 |  |
| (Producing conditions of Fiber-reinforced composite material) |  |  |  |  |  |
| <Step (II-2)> |  |  |  |  |  |
| Heat melting temperature | ° C. | 230 | 230 | 350 | 400 |
| Melt viscosity of Component (B) | Pa · s | 0.034 | 0.034 | 0.15 | 150 |
| <Step (IV-2)> |  |  |  |  |  |
| Oven temperature | ° C. | 300 | 400 | 400 | 400 |
| Heating time | min | 30 | 10 | 10 | 10 |
| (Properties of Poly (phenylene ether ether ketone) (B')) |  |  |  |  |  |
| Melting point | ° C. | 346 | 331 | 333 | 343 |
| Fusion enthalpy | J/g | 51 | 37 | 31 | — |
| Reduced viscosity | dL/g | 0.5 | 0.7 | 0.6 | — |
| (Properties of Fiber-reinforced composite material) |  |  |  |  |  |
| Component (A') content | wt % | 73 | 74 | — | — |
| Void ratio of Fiber-reinforced composite material | — | good | good | fair | bad |

Examples and Comparative Examples in Table 8 reveal the following. It is clear from the comparison between Example 42 and Comparative Examples 20 and 21 that by using the poly (phenylene ether ether ketone) oligomer (B) in the present invention, the process temperature in the production of a fiber-reinforced composite material can be decreased; the impregnation into the reinforcing fiber substrate (A') is excellent; and voids in the resulting fiber-reinforced composite material can be reduced.

It is clear from Example 43 that the poly (phenylene ether ether ketone) oligomer (B) in the present invention can be satisfactorily polymerized even at 400° C., and this method is excellent in polymerization rate.

<Method for Producing Fiber-Reinforced Composite Material by Pultrusion Molding Method>

Example 44

Step (I-3): One hundred and twelve pieces of "TORAYCA" (registered trademark) T700S-24K (carbon fiber available from TORAY INDUSTRIES, INC.) used as a reinforcing fiber substrate (A') were continuously drawn.

Step (II-3): The poly (phenylene ether ether ketone) oligomer (B) obtained in Reference Example 1 and a polymerization catalyst (D) were fed to an impregnation bath and melted by heating at 230° C. to form a melt solution.

Step (III-3): The reinforcing fiber substrate (A') drawn in the step (I-3) was fed to the impregnation bath of the step (II-3) to impregnate the melt solution into the reinforcing fiber substrate (A') and further passed through a squeeze die to obtain a composite from which excess melt solution was removed.

Step (IV-3): The composite obtained in the step (III-3) was fed to a mold having such an opening that provides a fiber-reinforced composite material 100 mm wide and 1.4 mm thick, and heated in the mold at 300° C. for 30 minutes to polymerize the poly (phenylene ether ether ketone) oligomer (B).

The composite after the step (IV-3) was solidified in contact with a cooling roll at 150° C. and further drawn with a belt conveyor to continuously obtain a fiber-reinforced composite material.

The content of the reinforcing fiber substrate (A') was calculated from the weight of the fiber-reinforced composite material obtained and the weight of the reinforcing fiber substrate (A') used.

The poly (phenylene ether ether ketone) (B') was physically separated from the fiber-reinforced composite material obtained and subjected to melting point measurement, melting enthalpy measurement, and viscosity measurement. The process conditions and the evaluation results are shown in Table 9.

Example 45

A fiber-reinforced composite material was produced in the same manner as in Example 44 except that the conditions of heating in a mold in the step (IV-3) were changed to 400° C. for 10 minutes. The fiber-reinforced composite material obtained was evaluated in the same manner as in Example 44. The process conditions and the evaluation results are shown in Table 9.

Comparative Example 22

A fiber-reinforced composite material was produced in the same manner as in Example 44 except that the poly (phenylene ether ether ketone) oligomer (B) prepared in Reference Example 3 was used; the heat-melting temperature in the step (II-3) was changed to 350° C.; and the conditions of heating in a mold in the step (IV-3) were changed to 400° C. for 10 minutes. The fiber-reinforced composite material obtained was evaluated in the same manner as in Example 44. The fiber-reinforced composite material obtained here had many voids compared to Example 44. This is probably because the polymerization of the poly (phenylene ether ether ketone) oligomer (B) occurred before impregnation into a reinforcing fiber substrate (A'). The process conditions and the evaluation results are shown in Table 9.

Comparative Example 23

A fiber-reinforced composite material was produced in the same manner as in Example 44 except that VICTREX "PEEK" (registered trademark) 151G (polyether ether ketone resin available from Victrex-MC, Inc., melting point: 343° C., melt viscosity at 400° C.: 150 Pa·s) was used in place of the poly (phenylene ether ether ketone) oligomer (B); the heat-melting temperature in the step (II-3) was changed to 400° C.; and the conditions of heating in a mold in the step (IV-3) were changed to 400° C. for 10 minutes. The fiber-reinforced composite material obtained was evaluated in the same manner as in Example 44. The fiber-reinforced composite material obtained here had many voids compared to Example 44. This is probably because the polymerization of the poly (phenylene ether ether ketone) oligomer (B) occurred before impregnation into a reinforcing fiber substrate (A'). The process conditions and the evaluation results are shown in Table 9.

TABLE 9

|  |  | Example 44 | Example 45 | Comparative Example 22 | Comparative Example 23 |
|---|---|---|---|---|---|
| (Composition) | | | | | |
| Component (B): Poly (phenylene ether ether ketone) oligomer | Type | Reference Example 1 | Reference Example 1 | Reference Example 3 | High molecular weight PEEK |
|  | wt % | 100 | 100 | 100 | 100 |
| Component (D): Polymerization catalyst | Type | CsF | CsF | CsF | — |
|  | mol % | 5 | 5 | 5 |  |
| (Producing conditions of Fiber-reinforced composite material) | | | | | |
| <Step (II-3)> | | | | | |
| Heat melting temperature | ° C. | 230 | 230 | 350 | 400 |
| Melt viscosity of Component (B) | Pa · s | 0.034 | 0.034 | 0.15 | 150 |
| <Step (IV-3)> | | | | | |
| Mold surface temperature | ° C. | 300 | 400 | 400 | 400 |
| Heating time | min | 30 | 10 | 10 | 10 |

TABLE 9-continued

|  |  | Example 44 | Example 45 | Comparative Example 22 | Comparative Example 23 |
|---|---|---|---|---|---|
| (Properties of Poly (phenylene ether ether ketone) (B')) | | | | | |
| Melting point | ° C. | 345 | 329 | 332 | 343 |
| Fusion enthalpy | J/g | 52 | 38 | 35 | — |
| Reduced viscosity | dL/g | 0.5 | 0.7 | 0.6 | — |
| (Properties of Fiber-reinforced composite material) | | | | | |
| Component (A') content | wt % | 76 | 76 | — | — |
| Void ratio of Fiber-reinforced composite material | — | good | good | fair | bad |

Examples and Comparative Examples in Table 9 reveal the following. It is clear from the comparison between Example 44 and Comparative Examples 22 and 23 that by using the poly (phenylene ether ether ketone) oligomer (B) in the present invention, the process temperature in the production of a fiber-reinforced composite material can be decreased; the impregnation into the reinforcing fiber substrate (A') is excellent; and voids in the resulting fiber-reinforced composite material can be reduced.

It is clear from Example 45 that the poly (phenylene ether ether ketone) oligomer (B) in the present invention can be satisfactorily polymerized even at 400° C., and this method is excellent in polymerization rate.

The molding material of the present invention in the first preferred embodiment comprises a poly (phenylene ether ether ketone) oligomer (B), and thus by using the molding material excellent in economic efficiency and productivity, a molded article having excellent dynamic properties can be easily produced.

The molding material of the present invention in the second preferred embodiment comprises a poly (phenylene ether ether ketone) (B'), and thus a molded article having excellent dynamic properties and heat resistance can be easily produced.

The molding material of the present invention in the third preferred embodiment can be molded into a fiber-reinforced composite material by heating the molding material at a low temperature for a short time, and thus it is excellent in economic efficiency, productivity, and handleability.

The method for producing a molding material of the present invention enables easy combination of a reinforcing fiber substrate with a poly (phenylene ether ether ketone) and, therefore, can increase economic efficiency and productivity. Thus the method is useful for producing a molding material.

The method for producing a fiber-reinforced composite material of the present invention enables easy combination of a reinforcing fiber substrate with a poly (phenylene ether ether ketone) and, therefore, can increase economic efficiency and productivity. Thus the method is useful for producing a fiber-reinforced composite material.

DESCRIPTION OF SYMBOLS

1: Reinforcing fiber bundle (A)
2: Poly (phenylene ether ether ketone) oligomer (B), or poly (phenylene ether ether ketone) oligomer (B) or poly (phenylene ether ether ketone) (B') and polymerization catalyst (D)
3: Composite of reinforcing fiber bundle (A) and poly (phenylene ether ether ketone) oligomer (B), or of reinforcing fiber bundle (A), poly (phenylene ether ether ketone) oligomer (B) or poly (phenylene ether ether ketone) (B'), and polymerization catalyst (D)
4: Thermoplastic resin (C)
5: Fixture for evaluating drape property
6: Sample for evaluating drape property
7: Heavy bob
8: Clamp for fixing sample
11, 31, 51: Roll bar
12: Impregnation bath
13: Rotating roller
14: Hot-air drying furnace
15: Double belt press
16, 34, 53: Nip roller
17, 36, 55, 62: Infrared heater
18: Pump
19: Chamber
20, 26, 41, 58: Inlet port
21, 42, 59: Cooling plate
22: Guillotine cutter
23, 43, 60: Reinforcing fiber bundle
24, 44, 61: Molding material
32: Belt conveyor
35, 54: Drum winder
37: Draw winder
27, 33, 38: Hot roller
39: Take-up winder
25, 40, 57: Heating chamber
52: Calender roll
56: Metering powder feeder
71: Propeller shaft
72: Cylindrical body made of fiber-reinforced composite material
72a: Inner layer
72b: Main layer
72c: Outer layer
72d: Reinforcing layer
73: Metal joint

The invention claimed is:
1. A molding material comprising:
a composite of 1 to 50 wt % of a continuous reinforcing fiber bundle (A) and 0.1 to 20 wt % of a poly (phenylene ether ether ketone) oligomer (B); and
30 to 98.9 wt % of a thermoplastic resin (C) adhering to the composite,
wherein the component (B) has a melting point of not higher than 270° C.

2. The molding material according to claim 1, wherein the component (B) comprises a cyclic poly (phenylene ether ether ketone) in an amount of 60 wt % or more.

3. The molding material according to claim 1, wherein the component (B) is a mixture of cyclic poly (phenylene ether ether ketone)s having different numbers of repeating units (m).

4. The molding material according to claim 1, wherein the composite further comprises 0.001 to 20 mol % of a polymerization catalyst (D) per 1 mol of ether ether ketone structural unit in the component (B).

5. The molding material according to claim 1, wherein the component (A) contains at least 10,000 carbon fiber monofilaments.

6. The molding material according to claim 1, wherein the component (C) is at least one selected from polyamide resin, polyetherimide resin, polyamide-imide resin, polyether ether ketone resin, and polyphenylene sulfide resin.

7. The molding material according to claim 4, wherein the component (D) is an alkali metal salt.

8. The molding material according to claim 1, wherein the component (A) is arranged substantially parallel to the direction of the shaft center, and the length of the component (A) is substantially the same as the length of the molding material.

9. The molding material according to claim 8, wherein the composite forms a core structure, and the component (C) surrounds the composite to form a core-sheath structure.

10. The molding material according to claim 9, wherein the form of the molding material is a long-fiber pellet.

* * * * *